United States Patent [19]
Fad et al.

[11] Patent Number: 5,793,632
[45] Date of Patent: Aug. 11, 1998

[54] COST ESTIMATING SYSTEM USING PARAMETRIC ESTIMATING AND PROVIDING A SPLIT OF LABOR AND MATERIAL COSTS

[75] Inventors: Bruce Fad; Roy Summers, both of Cherry Hill; Anthony DeMarco, Voorhees; Todd Geiser; James Walter, both of Mt. Laurel; Ben Chackman, Marlton, all of N.J.; Earl King, Beavercreek, Ohio

[73] Assignee: Lockheed Martin Corporation, Orlando, Fla.

[21] Appl. No.: 624,717

[22] Filed: Mar. 26, 1996

[51] Int. Cl.⁶ .................................................. G06F 17/60
[52] U.S. Cl. ....................... 364/464.1; 364/400; 395/201
[58] Field of Search .................... 364/400, 464.01, 364/464.1, 468.03; 395/201, 229

[56] References Cited

U.S. PATENT DOCUMENTS

| | | | |
|---|---|---|---|
| 3,703,725 | 11/1972 | Gomersall et al. | 364/490 |
| 4,875,162 | 10/1989 | Ferriter et al. | 395/229 |
| 4,885,694 | 12/1989 | Pray et al. | 364/464.01 |
| 5,189,606 | 2/1993 | Burns et al. | 395/210 |
| 5,249,120 | 9/1993 | Foley | 395/201 |
| 5,255,207 | 10/1993 | Cornwell | 364/512 |
| 5,377,098 | 12/1994 | Sakai | 395/229 |
| 5,504,674 | 4/1996 | Chen et al. | 395/204 |
| 5,515,269 | 5/1996 | Willis et al. | 364/401 |
| 5,570,291 | 10/1996 | Dudle et al. | 364/468.01 |

OTHER PUBLICATIONS

Price S ™ Reference Manual, Third Edition, Oct. 1993, published by Price Systems, Moorsetown, New Jersey.
Price HL ™ Reference Manual, First Edition, Nov. 1993, published by Price Systems, Moorsetown, New Jersey.
Price H ™ Reference Manual, First Edition, Nov. 1993, published by Price Systems, Moorsetown, New Jersey.
Price M Reference Manual, First Edition, Oct. 1994, published by Price Systems, Moorsetown, New Jersey.

*Primary Examiner*—Edward R. Cosimano
*Attorney, Agent, or Firm*—Dressler, Rockey, Milnamow & Katz, Ltd.

[57] ABSTRACT

A parametric cost estimating model, which can be software-based, provides a capability for inputting specific labor rates and burdening or overhead information for a given installation. Other inputs are project-specific depending on whether a hardware or a software system is being estimated. The process and model provide estimating information as to costs to develop and produce specific hardware or software systems and also provide a split as to labor and material costs for such systems.

27 Claims, 59 Drawing Sheets

Financial Factors

PRICE H US Preset Acquisition Factors Table (1995)

| | Development Rates | | | | Production Rates | | | | |
|---|---|---|---|---|---|---|---|---|---|
| | Direct | O/H % | O/T % | MB % | Direct | O/H % | O/T % | MB % | |
| Draft | 24.45 | 130.00 | 0.00 | 10.00 | 24.45 | 130.00 | 0.00 | 10.00 | |
| Design | 28.05 | 130.00 | 0.00 | 10.00 | 28.05 | 130.00 | 0.00 | 10.00 | |
| System | 32.14 | 130.00 | 0.00 | 10.00 | | | | | |
| Proj. Mgmt. | 32.13 | 130.00 | 0.00 | 10.00 | 32.13 | 130.00 | 0.00 | 10.00 | |
| Data | 23.35 | 130.00 | 0.00 | 10.00 | 23.35 | 130.00 | 0.00 | 10.00 | |
| Production | | | | | 15.45 | 180.00 | 0.00 | 10.00 | |
| Prototype | 20.00 | 180.00 | 0.00 | 10.00 | | | | | |
| Tool Test Eq. | 26.40 | 130.00 | 0.00 | 10.00 | 26.40 | 130.00 | 0.00 | 10.00 | |
| Purchased | 20.00 | 180.00 | 0.00 | 0.00 | 15.45 | 180.00 | 0.00 | 0.00 | |

Buttons: OK, Cancel, Reset, Notepad, Lock, Load, Help

Cost Allocation Titles
- Mat'l
- Labor
- ODC

Rate Time Unit
- ○ Monthly
- ● Hourly

Additional Costs (%)
- G & A  0.00
- Fee / Profit  0.00
- CoM  0.00

(MMYY)
Labor Base Year  195
Hours / Month  152

FIG. 3

COST ESTIMATING SYSTEM USING PARAMETRIC ESTIMATING AND PROVIDING A SPLIT OF LABOR AND MATERIAL COSTS

FIELD OF THE INVENTION

The invention pertains to parametric cost estimating systems and methods. More particularly, the invention pertains to systems which provide a labor and material cost split in response to user specified labor rates and burdening structures.

BACKGROUND OF THE INVENTION

Computer based cost estimating models have long been used in planning design and production costs for electronic and mechanical hardware assembly and systems. They have also been used for purposes of estimating avionics and space system costs. Early successes with those types of systems resulted in such models being adapted and expanded for use in deriving cost estimates for commercial, as opposed to military and government, hardware and systems. The models have also been expanded to be useable to derive cost estimates for the development of various types of software systems.

The advantages of such computerized models include reduction of manual errors, a decrease in turn-around time as well as extended capabilities beyond those which can be carried out on a manual or a semi-automated basis. The models implement a parametric approach which is derived from earlier experience and validated on an on-going basis using empirical evidence.

Such models make it possible to generate probable cost evaluations and estimates early on when a project is still at a very preliminary planning stage. Known models take into account operational and testing requirements and make allowance for technological growth and inflation factors.

Scheduling constraints can be incorporated into the respective models. Estimated costs can be adjusted to take into account various proposed schedules.

One such parametric estimating tool, useable with hardware systems is commercially marketed under the brand name PRICE-H by Price Systems Division of Lockheed Martin Corporation. Characteristics of this product are described in the PRICE-H Reference Manual, November, 1993. This manual is hereby incorporated herein by reference. It is useful for indicating the background of the invention and for illustrating the state of the art. Related products are also marketed by the same Division for producing cost estimates of software based systems.

The PRICE-H System produces a cost matrix as one form of output. Table 1 illustrates an exemplary output cost matrix of costs for the development and production of an electronic item of the type produced by the PRICE-H System.

TABLE 1

| Electronic Item | Basic Estimate Costs in ($1000) | | |
|---|---|---|---|
| Program Cost | Development | Production | Total Cost |
| Engineering | | | |
| Drafting | 363.8 | 44.0 | 507.8 |
| Design | 1435.3 | 123.9 | 1560.2 |

TABLE 1-continued

| Electronic Item | Basic Estimate Costs in ($1000) | | |
|---|---|---|---|
| Program Cost | Development | Production | Total Cost |
| Systems | 231.1 | — | 231.1 |
| Project Mgmt. | 186.1 | 457.8 | 644.0 |
| Data | 76.2 | 142.2 | 218.4 |
| SubTotal (ENG) | 2393.5 | 768.0 | 3161.5 |
| Manufacturing | | | |
| Production | | 5295.9 | 5295.9 |
| Prototype | 549.6 | — | 549.6 |
| Tool Test Eq | 0.1 | 267.1 | 267.1 |
| SubTotal (MFG) | 549.7 | 5562.9 | 6112.6 |
| Total Cost | 2943.2 | 6330.9 | 9274.1 |
| Schedule Start | Jan 88 (13) | Jul 89 (13) | |
| First Item | Jan 89* ( 2) | Jul 90* (10) | |
| Finish | Mar 89* (15) | May 91* (23) | |
| Unit Product Cost - 105.92 | | | |
| Production Rate - 4.88 | | | |

Table 1 illustrates total costs for development and production of various stages in the production of an electronic item. Table 1 does not provide a split of labor, material, or other direct costs.

The PRICE-H System receives as inputs from a user values for various variables which specify the Equipment being modeled. One variable of particular significance which is input to such systems such as PRICE-H goes by the acronym "Platform" (PLFTM). This variable is an indicator of operational requirements in terms of specifications and testing reliability. It affects the computation of costs, indirect cost ratios and performance schedules.

Table 2 illustrates various values of the PLTFM variable for different operating environments.

TABLE 2

| Operating Environment | Typical PLTFM Values |
|---|---|
| Ground | 1.0 |
| Mobile | 1.4 |
| Airborne | |
| Commercial (FAA) | 1.7 |
| MIL Spec | 1.8 |
| Space | |
| Unmanned | 2.0 |
| Manned | 2.5 |

Other input variables include Manufacturing Complexity of the Structure (MCPLXS) as well as Manufacturing Complexity of the Electronics (MCPLXE).

Additional variables include engineering complexity (ECMPLX). Maturity year for a specific complexity of system as well as technology is establishable in known models by means of an input variable whose magnitude is indicative of this factor, and is identified by the pneumonic YRTECH. The variable WE specifies the weight of the electronics. WS specifies the weight of structure. QTY signifies the number of production units to be produced. PROTOS signifies the quantity of deliverable prototype units. RATE specifies production rate. These and other input parameters for the PRICE-H System would be known to those of skill in the art given their description in the above noted Reference Manual.

Known models of the above-described type do not provide a breakout of costs for labor and material based on specific user input labor rates as well as a user burdening structure. It would be desirable to provide a system whereby specific labor rates can be input along with specific burdening and overhead information. Further, it would be desirable to be able to use these inputs in combination with other information to provide a labor and material split for the development and/or production of a given, hardware or software system. Preferably, such additional capability could be provided without causing the user to carry out any manual operations other than entering the necessary parameter values.

SUMMARY OF THE INVENTION

A system and a process of cost estimating provides a split of labor and material expenses for a given project. An interface is provided to permit the entry of a user specific labor rates and burdening information such as direct overhead, overtime, and material burden. The entered financial information is in addition to information necessary to specify the project so as to generate an overall cost estimate thereof using a parametric modelling system generally of the type previously described.

A system in accordance with the present invention includes a programmable processor with associated read-write memory and appropriate input/output devices such as graphical displays and keyboards. Coupled to the processor is a magnetic storage unit for purposes of storing sets of instructions for carrying out a parametric modelling process, and for entering financial information such as direct labor rates, direct labor overhead rates, overtime rates, general and administrative and related expenses. Finally, the storage unit stores a set of programmed instructions, which conventionally would be linked to the instructions representative of the parametric estimating model, for purposes of producing a labor, material and direct cost break out.

A process in accordance with the present invention includes the steps of defining a system to be estimated as required by a selected parametric estimating model and entering the necessary values; the pertinent financial factors are then entered as noted above so as to implement a labor and material split; the parametric model is then executed to produce cost estimates and calculate appropriate output values, which might be usable to determine the labor cost and material cost; a determination is then made using the entered financial factors of the labor cost and the material cost; one or more output reports can be generated indicative of the labor, material, and other direct costs; finally, the parameters can be revised and the scheduling model can be reexecuted again as required.

The process can be used to determine production rate, and establish a learning curve as a function of unit production rate.

BRIEF DESCRIPTION OF THE DRAWING:

FIG. 3 is a screen illustrating various financial factors;

DETAILED DESCRIPTION OF THE PREFERRED EMBODIMENT

Figure 1:
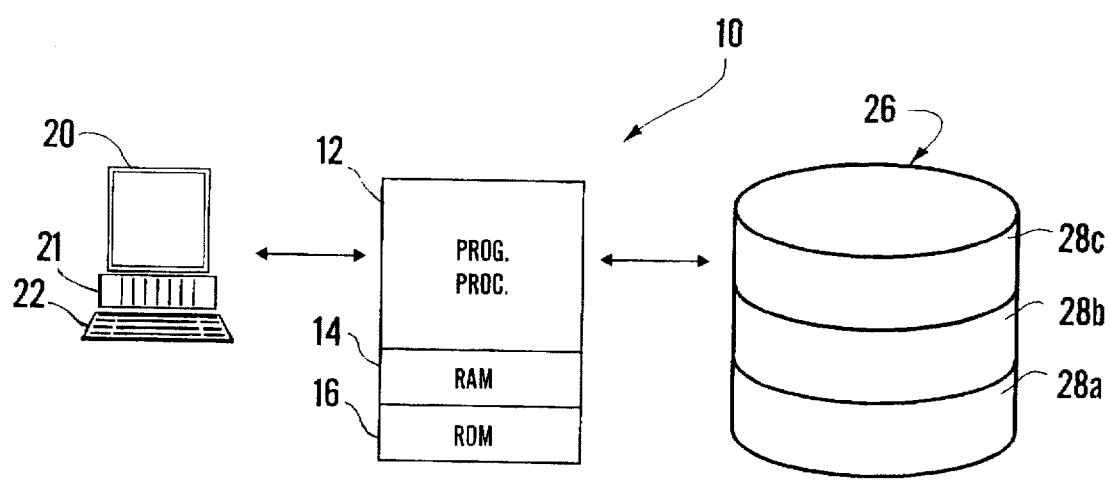
FIG. 1 is a block diagram of a system in accordance with the present invention.

While this invention is susceptible of embodiment in many different forms, there are shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 illustrates schematically a system 10 in accordance with the present invention. The system 10 includes a programmable processor 12, which could be a digital programmable processor such as a computer of a conventional variety.

The processor 12 includes read-write memory 14 which could be implemented as solid state, random access memory for the purpose of temporary storage of programs or data. The processor 12 could also include read-only memory 16 for programs or constants which are not intended to be changed.

Coupled to the processor 12 is a visual output device 20 which might include some form of a conventional display such as a monitor or a plasma panel. The input/output device 20 also includes a keyboard 22 for purposes of entry of parameter values by a user. A mouse could be used as an alternate form of an input device.

Also coupled to programmable processor 12 are one or more mass read-write storage units which might be implemented as magnetic disk drives 26. The storage unit 26 is intended to provide long-term, storage of programs and data which are loaded into the read-write memory 14 for purposes of execution or processing. The details of program storage, and execution along with data storage and processing thereof, could readily be determined by one of skill in the art in view of the present description.

Carried on the storage element 26 is a parametric cost estimating model 28a, such as the commercially available PRICE-H System previously discussed. Coupled to that model appropriately, and also stored on the unit 26 is an input/output processing system 28b which provides user-friendly functionality whereby a user can enter one or more parameters via keyboard 22, and receive feedback via the display 20, in connection with specific user-related labor rates and burdening information.

Further, stored on unit 26 is a set of instructions 28c. This set of instructions interacts with the prestored PRICE-H parametric model, output values generated thereby as well as parameters input via the keyboard 22. As a result, it is possible to produce as an output not only cost estimates for various aspects of system design and production, (as in Table 1), but also a labor and material split for a particular system or subassembly being estimated.

Figure 2:
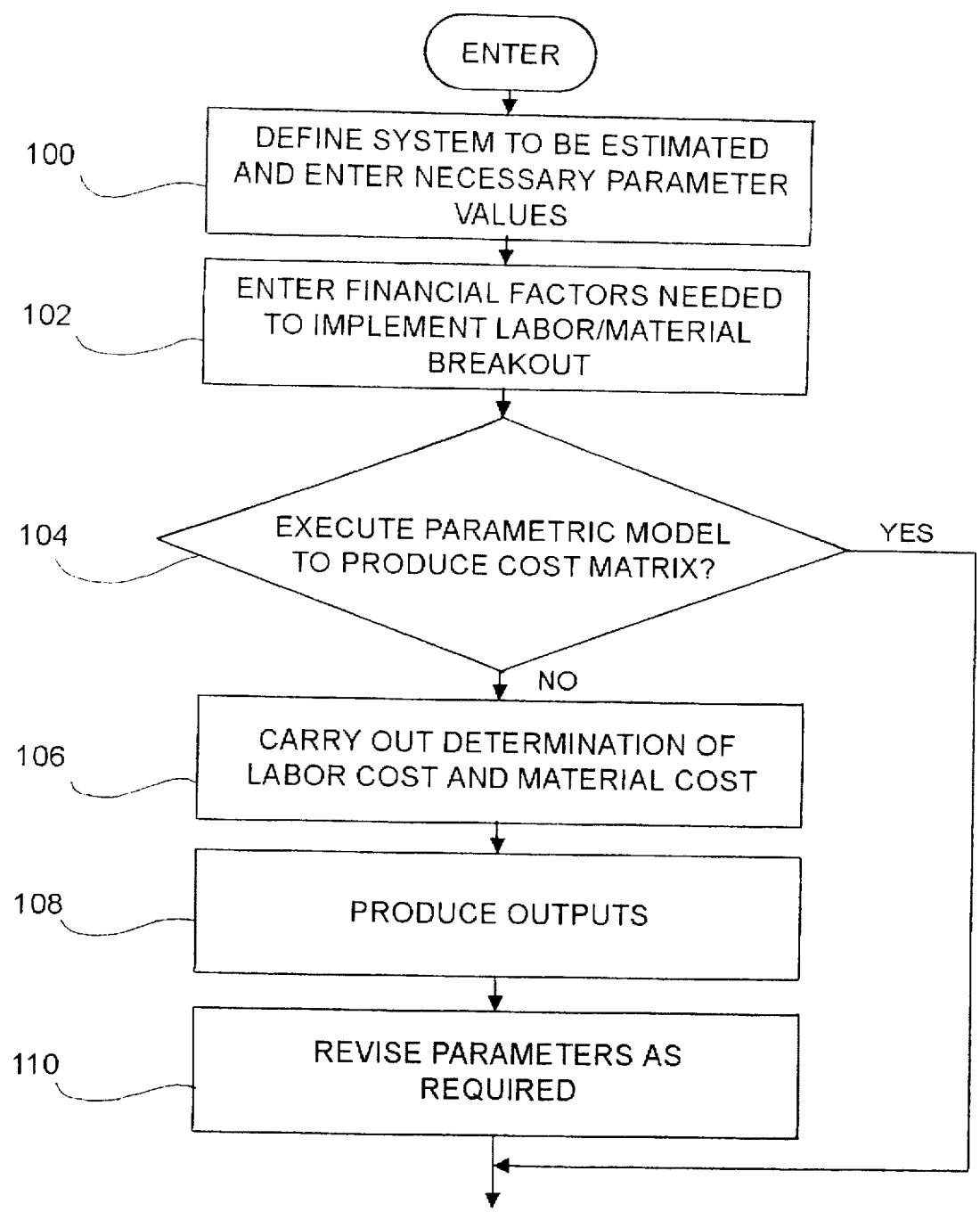
FIG. 2 is an over-all flow diagram of a method in accordance with the present invention.

FIG. 2 illustrates in an overall sense the process being carried out by the system 10. In an initial step 100, a user enters the necessary parametric information, via keyboard 22, to define a project for which cost estimates are required. In a step 102, financial factors are entered which are required to implement the labor and material cost split hereof. The particular financial factors of interest are discussed in more detail subsequently.

In a step 104 the parametric cost estimating model such as the PRICE-H System is executed to produce an overall cost matrix, such as Table 1, and to calculate various intermediate parameter values. In a step 106, a determination is then made (based on entered financial factors as well as the calculated cost matrix, prestored tabular values, and any necessary results of the execution of the parametric model) of the labor cost and material cost of the system defined in the step 100.

In a step 108 one or more output reports can be either displayed visually on the unit 20 or printed in the form of hard copy for subsequent review. In a step 110, one or more of the parameters can be adjusted for purposes of examining sensitivity of cost to various alternate parameter values or to determine the effect on cost of scheduling revisions. The parametric model is then re-executed in the step 104 to produce updated cost estimates and updated calculated parameter values. Subsequently, the labor costs and material costs are again updated.

The above process can be carried out repeatedly with variations in parameter values in an attempt to explore consequences of parameter alteration.

Table 3 identifies various input fields of a financial factors screen, of a type illustrated in FIG. 3. This table contains direct labor rates, overheads to the direct rates, overtime percentages, material burden percentages, designation of the direct rate time units, number of hours in the standard work month, additional cost percentages and the economic base year to which these rates apply. A user can alter any of these inputs from this screen and alter the preset values, by use of the reset button. This thus provides a user an ability to provide actual data for labor rate values per month or per hour. Additionally, as illustrated in Table 3, general and administrative expenses can be specified by using the screen of FIG. 3.

Financial Factors Input Fields

TABLE 3

| Field | Description | Default Value |
|---|---|---|
| Title | User definable title for this table | Blank |
| Phase Titles | User definable Phase titles | Development and Production |
| Colt Element Titles (Column Titles) | User definable titles that describe a cost element | Direct, O/H % (Over Head), O/T % (Over Time), MB % (Material Burden %) |
| Cost Category Titles (Row Titles) | User definable titles that describe a cost category | Draft, Design, System, Proj. Mgt. (Project Management), Data, Production, Prototype, Tool-test |
| Labor Rate Values | Actual Data | Default data will reflect 194 rates |
| Cost Allocation Titles | User Definable titles that describe cost allocation categories | Mat'l, Labor, ODC |
| Rate Time Unit | Indicates that the labor rates are per month or per hour | Hourly |
| Gen. & Admin. | G & A (General and Administrative) | 0.0 |
| Fee/Profit | Fee and/or Profit | 0.0 |
| Cost of Money | The cost of borrowing money | 0.0 |
| Hours/Month | The number of working hours in a month | 152 |
| Base Year Labor Rate | The year to which these labor rates apply | current economic year (194) |
| Reset Button | Resets all the input fields to defaults | |
| Lock | Prevents the table from update without password | |
| Load | Used to load pre-defined values from the default. hpr file | |
| Notepad | Used to keep node specific annotations | empty |

Figure 4:
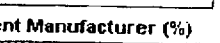
FIG. 4 is a screen illustrating the results of a labor/materials split in accordance with the present invention.

FIG. 4 is an output screen showing a labor and a material breakdown for an exemplary antenna structure. Columns are provided for percentages of other direct costs (ODC %), material costs (Mat'l %) and labor costs (Lab %). The following values can be automatically determined:

Development
  OCD%—Project Management
  Material %—Data
  Prototype
  T & TE
Production
  ODC%—Project Management
  Material %—Data
  Production
  T & TE Development and production allocation factors are used for allocating labor, material and other direct costs. The user can change any of the inputs from the screen of FIG. 4, or select preset values by using the reset button. Some of the values as those noted above, can be calculated by the system and are indicated by a check box immediately to the left of the corresponding element. Once a calculation has been made which results in a value, an X appears in the check box and the displayed value becomes gray on the screen. Additionally, the displayed calculated value may not be altered by the user.

In the lower or right-hand corner of the screen of FIG. 4 are two lines specifying percentages for an after-market supplier (AMS) as well as an original equipment manufacturer (OEM). The sum of these two values adds up to 100%.

These settings help define the material content of the production and prototype production of cost elements. Hence, the relative values as a percentage of material to be supplied by the user versus that which is supplied by someone else can be established or varied to determine what the effect of various splits might be in these two values.

Figure 5:
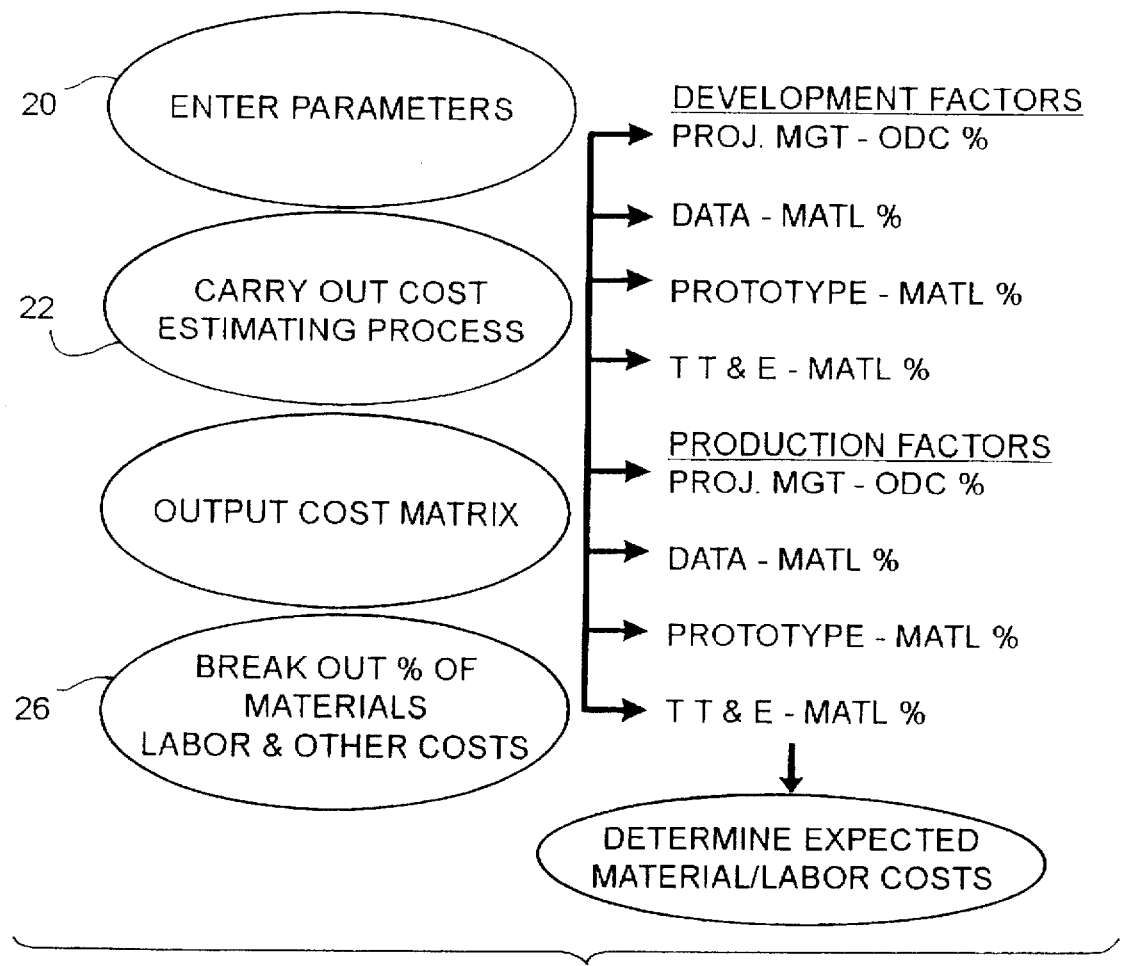
FIG. 5 is a flow diagram illustrating a determination of labor and material percentages in accordance with the present invention.

FIG. 5 illustrates in more detail the process of producing on a percentage basis, the calculatable development factors and production factors illustrated in the screen of FIG. 4. In a Step 120, an appropriate set of parameters is entered to specify a project to be estimated. In a Step 122, a parametric modeling process is carried out, for example, by using the PRICE-H parametric modeling system discussed previously. An output from the Step 122 is a cost matrix, of the type illustrated in Table 1, which specifies development and production costs. In a Step 126, the information from the cost matrix, along with other parametric information from the modeling process is used to determine those developmental factors and production factors described above. The equations specifying this process are presented subsequently.

Figure 6:
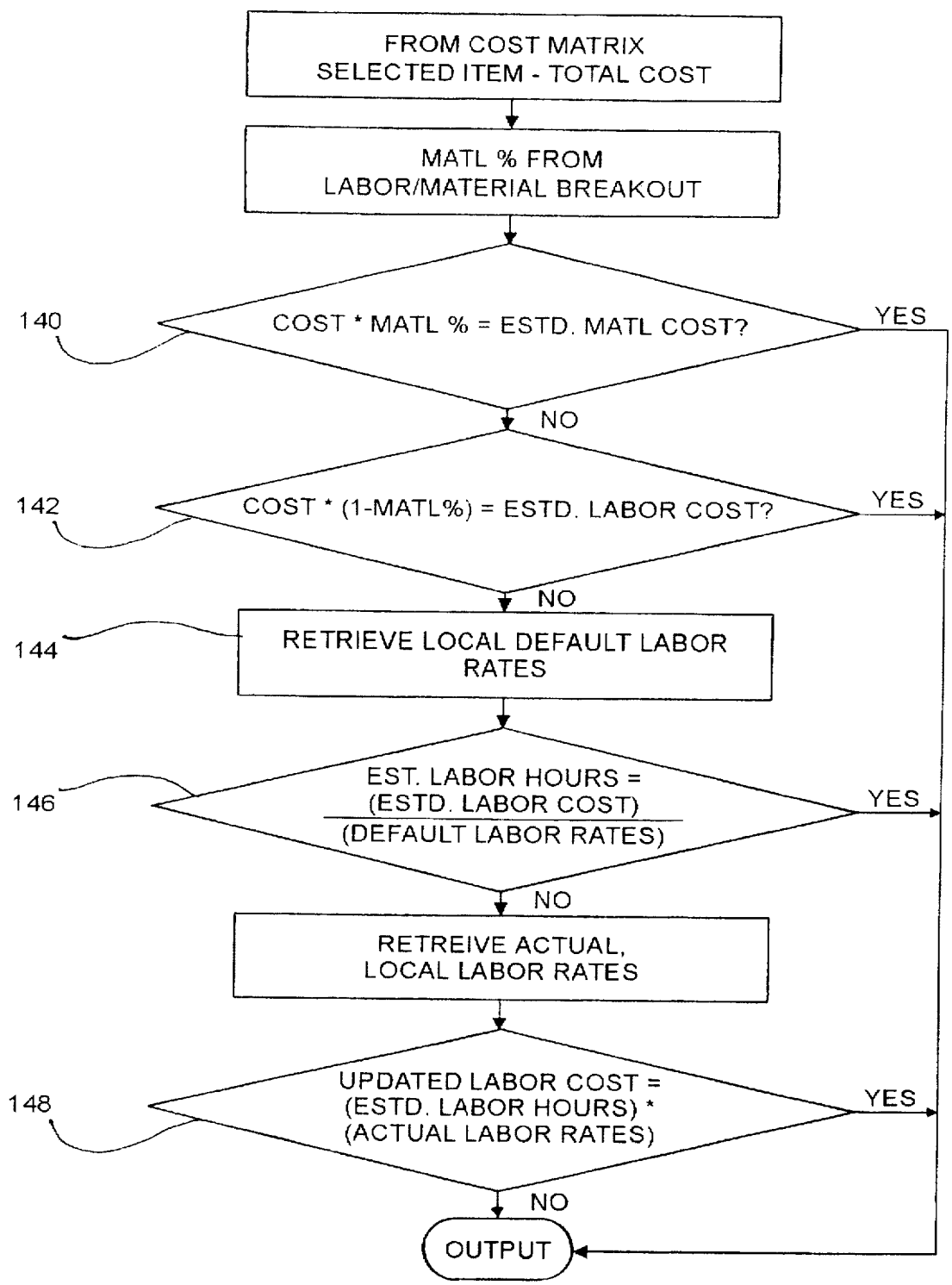
FIG. 6 is a flow diagram illustrating a determination of labor and material costs in accordance herewith.

FIG. 6 illustrates the further steps of taking the total cost of a selected item, combining that cost with a material index percent from the labor and material break out, as illustrated in FIG. 4, and in a Step 140, producing an estimated material cost for the selected line item. To determine an estimated labor cost, in a Step 142, a labor percentage is multiplied by the line item cost to produce an estimated labor cost.

In a Step 144, local default labor rates can be used to establish estimated labor hours in a Step 146. Previously entered actual user labor rates can then be combined in a Step 148 with estimated labor hours to produce updated labor costs for the selected item. Both the estimated material cost and the updated labor cost can then be provided in the form of a report.

The process for determining the labor and material break out where those items can be calculated (Step 126) is implemented as follows. In the development phase, project management, other direct cost percentages (ODC %) can be determined. The data material percent, can then be determined. The prototype material percent can be determined. The tooling and test equipment (T & TE), material percent, can then be determined. In each of the above instances, the corresponding labor percentage is 100% minus the respective direct cost percentage or material percentage.

In the production phase, the project management, other direct cost percent (ODC %) can be established. Subsequently, a determination can be made of the data, material percent (MAT%). The production material percent (MAT%) can then be determined. Finally, the tooling and test equipment material percent (MAT%) can be determined. In each instance, the corresponding labor percentage can be established by subtracting the respective direct cost percent or material percent from 100%.

In addition, production rate can be established and a unit learning curve can be developed.

Figure 7:
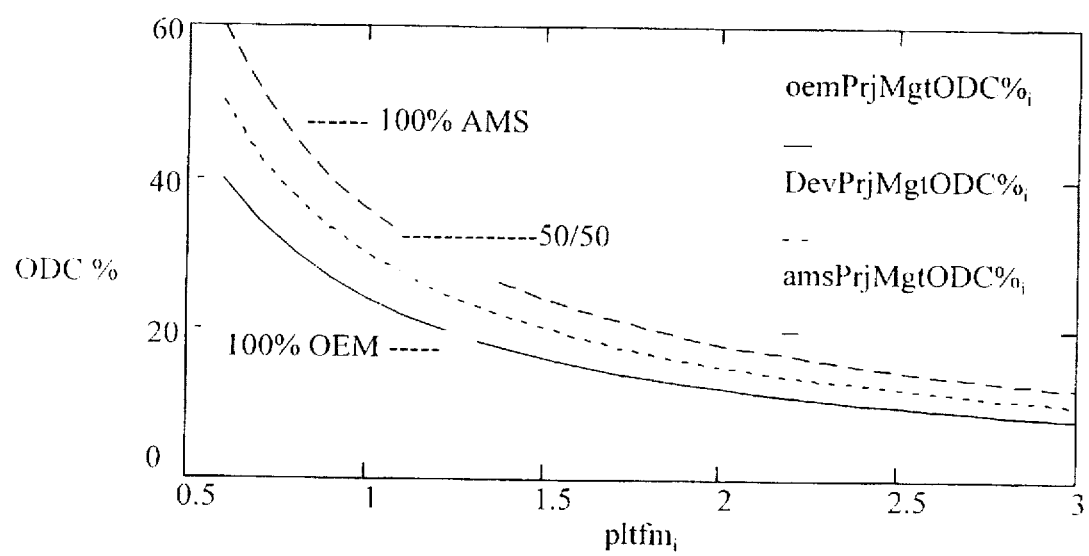
FIG. 7 is a Plot of DevelPrjMgtODC% v. PLTFM.
Figure 59:
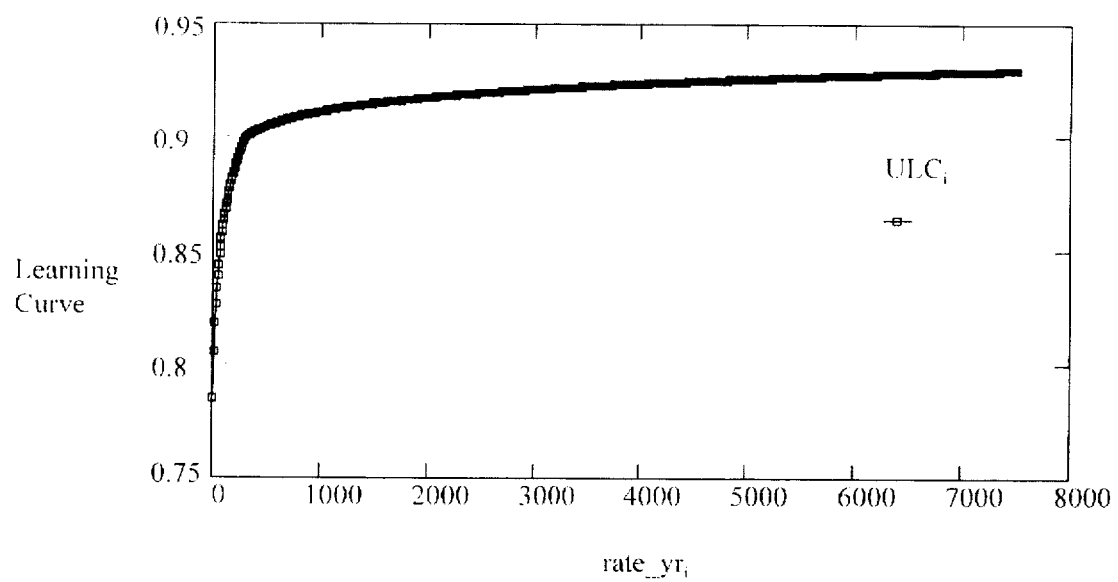
FIG. 59 is a Plot of ULC v. Rate.

The above process is carried out by the subsequently disclosed set of equations which are illustrated in FIGS. 7-59. The equations illustrated in FIGS. 7-59, are provided for various types of line items such as electronic and electro/mechanical systems, mechanical systems, integration and test functions, modifications, and the like. Type designations are indicated by both a textual description of the type as well as a mode number. The mode designation merely identifies the particular type of item. Additionally, in any given category, a disclosed equation may or may not be use in each instance with an indicated line item. If an equation is used with an indicated line item, that usage is shown by a note such as, #1, adjacent to a corresponding mode number. The note indicates that the mode 1 equation is to be used with the subsequent respective mode as indicated.

1.1 Phase: Development, Category: Project Management, ODC% Calculation

| Type | Mode | Calculation |
|---|---|---|
| Electronic & electro/mechanical | 1 | $DevPrjMgtODC\%_i := \left[ oem\% \cdot \left( \frac{.24}{pltfm_i} \right) \right] + \left[ (100 - oem\%) \cdot \left( \frac{.36}{pltfm_i} \right) \right]$ |
| Mechanical | 2 | #1 |
| Purchased | 3 | 0 |
| Furnished | 4 | 0 |
| Integration & Test | 5 | #1 |
| Modified | 6 | #1 |
| Calibration | 7 | #1 |
| Thruput | 8 | 0 |
| Multiple lot | 9 | 0 |
| Detailed Purchased | 33 | #1 |
| Design Integration | 51 | #1; pltfm set to 1.4 |
| HW/SW Integration & Test | 52 | #1; pltfm set to 1.4 |

| | |
|---|---|
| H Module | HMOD #1 |
| i = 6 ... 30 | $pltfm_i := \frac{i}{10}$  $oemPrjMgtODC\%_i := \frac{.24}{pltfm_i} \cdot 100$  $amsPrjMgtODC\%_i := \frac{.36}{pltfm_i} \cdot 100$ |
| oem% = 50 | $DevPrjMgtODC\%_i := \left[ oem\% \cdot \left( \frac{.24}{pltfm_i} \right) \right] - \left[ (100 - oem\%) \cdot \left( \frac{.36}{pltfm_i} \right) \right]$ |

FIG. 7 is a graph illustrating the above.

1.2 Phase: Development, Category: Data, Mat% Calculation

| Type | Mode | Calculation |
|---|---|---|
| Electronic & electro/mechanical | 1 | $DevDataMat\%_i := \left[ oem\% \cdot \left( \frac{.33}{pltfm_i} \right) \right] + \left[ (100 - oem\%) \cdot \left( \frac{.17}{pltfm_i} \right) \right]$ |
| Mechanical | 2 | #1 |
| Purchased | 3 | 0 |
| Furnished | 4 | 0 |
| Integration & Test | 5 | #1 |
| Modified | 6 | #1 |
| Calibration | 7 | #1 |
| Thruput | 8 | 0 |
| Multiple lot | 9 | 0 |
| Detailed Purchased | 33 | #1 |
| Design Integration | 51 | #1; pltfm set to 1.4 |
| HW/SW Integration & Test | 52 | #1; pltfm set to 1.4 |
| H Module | HMOD | #1 |
| i = 6 ... 30 | | $pltfm_i := \frac{i}{10}$  $oemDataMat\%_i := \frac{.33}{pltfm_i} \cdot 100$  $amsDataMat\%_i := \frac{.17}{pltfm_i} \cdot 100$ |
| oem% = 50 | | $DevDataMat\%_i := \left[ oem\% \cdot \left( \frac{.33}{pltfm_i} \right) \right] + \left[ (100 - oem\%) \cdot \left( \frac{.17}{pltfm_i} \right) \right]$ |

Figure 8:
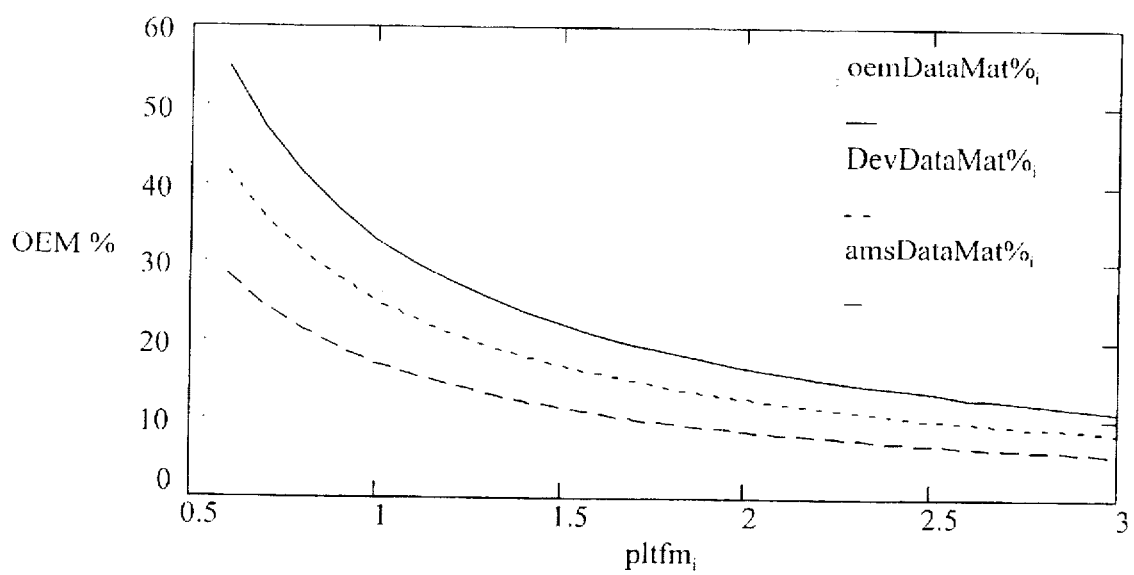
FIG. 8 is a Plot of DevDataMat% v. PLTFM.

FIG. 8 is a graph illustrating the above.

1.3 Phase: Development, Category: Prototypes, Mat% Calculation

| Type | Mode# | Calculation |
|---|---|---|
| Electronic & electro/mechanical | 1 | See 1.3.1 below |
| Mechanical | 2 | #1 |
| Purchased | 3 | 0 |
| Furnished | 4 | 0 |
| Integration & Test | 5 | See 1.3.2 below |
| Modified | 6 | #1 |
| Calibration | 7 | #1; (mcplxe, mcplxs values from current trial) |
| Thruput | 8 | 0 |
| Multiple lot | 9 | 0 |
| Detailed Purchased | 33 | #1 |
| Design Integration | 51 | 0 |
| HW/SW Integration & Test | 52 | 0 |
| H Module | HMOD | See 1.3.3 below |

1.3.1 Detail of prototype manufacturing material% (ProtoMat%) calculation for modes 1, 2, 6, 7, & 33

1. Calculate ProtoElecAMSMat%
2. Calculate ProtoElecOEMMat%
3. Calculate ProtoElecMat% by combining #1 & #2, using OEM%
4. Calculate $OPC_B$ & $MatOPC_B$ using ProtoElecMat%
5. Calculate ProtoStructAMSMat%
6. Calculate ProtoStructOEMMat%
7. Calculate ProtoStructMat% by combining #5 & #6, using OEM%
8. Calculate $OPC_S$ & $MatOPC_S$ using ProtoStructMat%
9. Calculate ProtoMat% from ratio $(MatOPC_B + MatOPC_S) / (OPC_B + OPC_S)$

Figure 9:
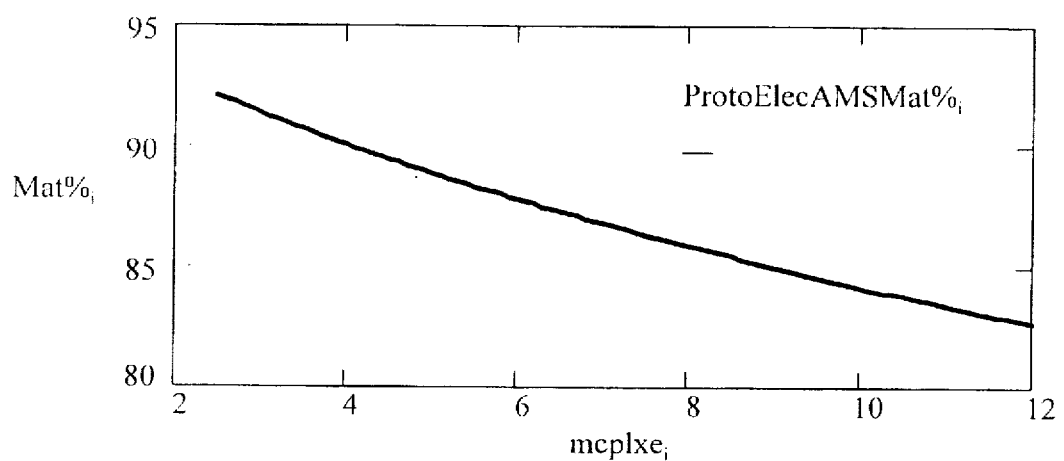
FIG. 9 is a Plot of ProtoElecAMSMat% v. MEPLXE.

1.3.1.1 Calculate ProtoElecAMSMat% i = 25 ... 120        $mcplxe_i = \frac{i}{10}$        $ProtoElecAMSMat\%_i = [1 - [.05 \cdot (mcplxe_i)^5]] \cdot 100$ FIG. 9 is a graph illustrating the above.

1.3.1.2 Calculate ProtoElecOEMMat%

1. Calculate a baseline material% as a function of pltfm
2. Calculate a baseline value for MCPLXE as a function of pltfm
3. Calculate a baseline value for RATE as a function of pltfm
4. Calculate a baseline value for WE as a function of pltfm
5. Calculate a baseline value for PROTOS as a function of pltfm
6. Calculate an adjustment to the baseline material% as a function of MCPLXE
7. Calculate an adjustment to the baseline material% as a function of RATE
8. Calculate an adjustment to the baseline material% as a function of WE -continued 9. Calculate an adjustment to the baseline material% as a function of PROTOS
10. Apply adjustments to baseline material%.
1.3.1.2.1 Calculate a baseline material% (electronics) as a function of pltfm The following algorithms and equations are used to determine the percent of material in the structure
portion of Prototypes. These are the same algorithms and equations used in the EXCEL file PT_MAT.XLS.
Graphs of the basic values are contained in MATHCAD file PT_E_BAS.MCD.
The following equations establish the basic percentage of material in the prototype as a function of PLTFM.

$i = 1 \ldots 200$  $MCPLXE_i := 5 \cdot \frac{i}{90}$   $E\_RATE_i := \frac{i}{25}$   $WE_i := \frac{i}{5}$   $PROTOS_i := \frac{i}{5}$   $pltfm_i := \frac{i}{75}$ low_%_mat$_i$ := (106.6667− 33.3333pltfm$_i$)                     if PLTFM <= 1.4
l_med_%_mat$_i$ := (130− 50·pltfm$_i$)                             if 1.4 < PLTFM <= 1.86
h_med_%_mat$_i$ = (302.05− 142.5·pltfm$_i$)                        if 1.86 < PLTFM <= 1.94
hi_%_mat$_i$ = (45− 10·pltfm$_i$)                                  if PLTFM > 1.94
%_mat$_i$ = if(pltfm$_i$>1.4,l_med_%_mat$_i$,low_%_mat$_i$)        The equations below establish high & low
%_mat$_i$ = if(pltfm$_i$>1.86,h_med_%_mat$_i$,%_mat$_i$)           limits of % material adjustment for each of
%_mat$_i$ = if(pltfm$_i$>1.94,hi_%_mat$_i$,%_mat$_i$)              the controlling parameters.

$$low\_limit_i = \frac{10 - \%\_mat_i}{4} \qquad hi\_limit_i = \frac{95 - \%\_mat_i}{4}$$

Figure 10:
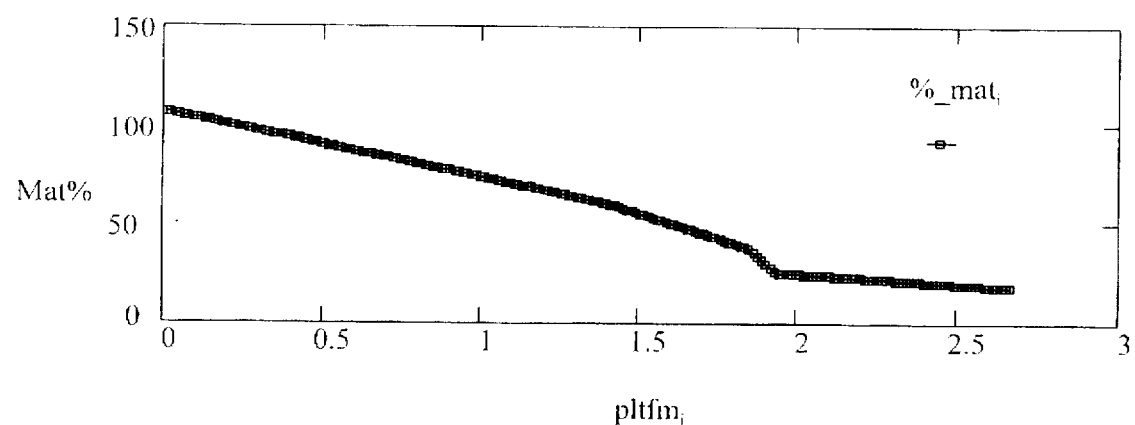
FIG. 10 is a Plot of Material% v. PLTFM.
Figure 11:
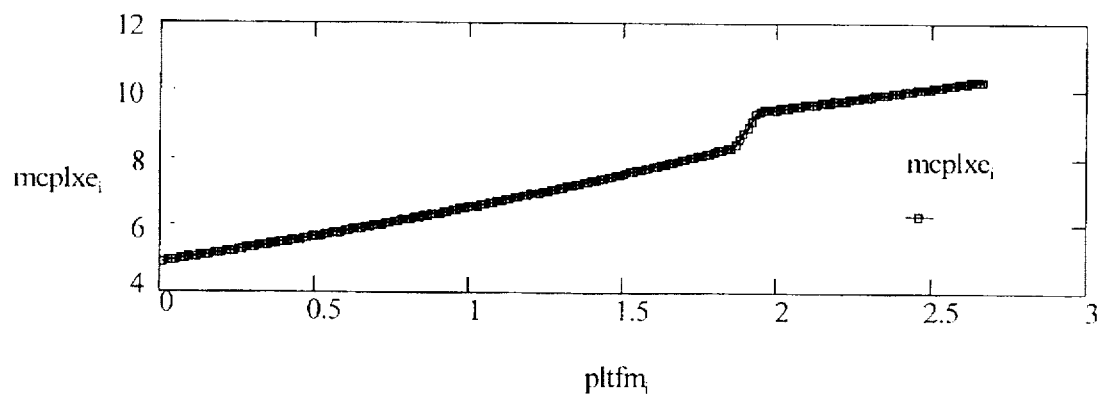
FIG. 11 is a Plot of MCPLXE v. PLTFM.
Figure 12:
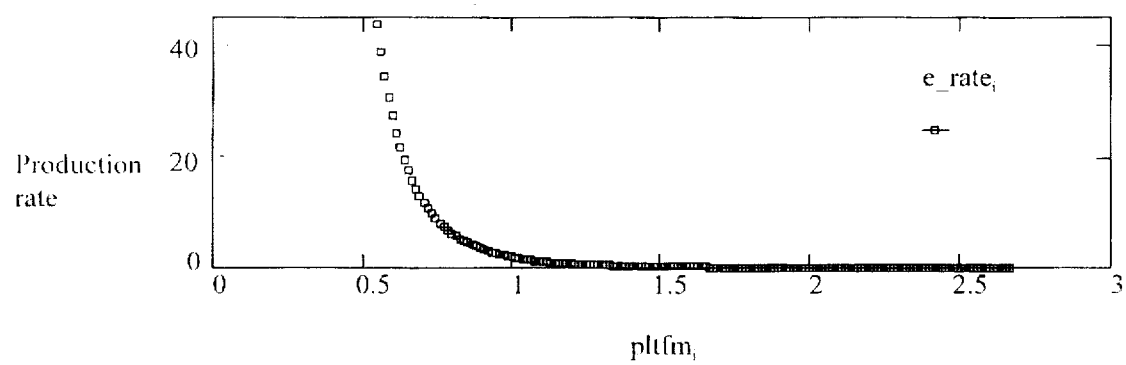
FIG. 12 is a Plot of ElectRate v. PLTFM.
Figure 13:
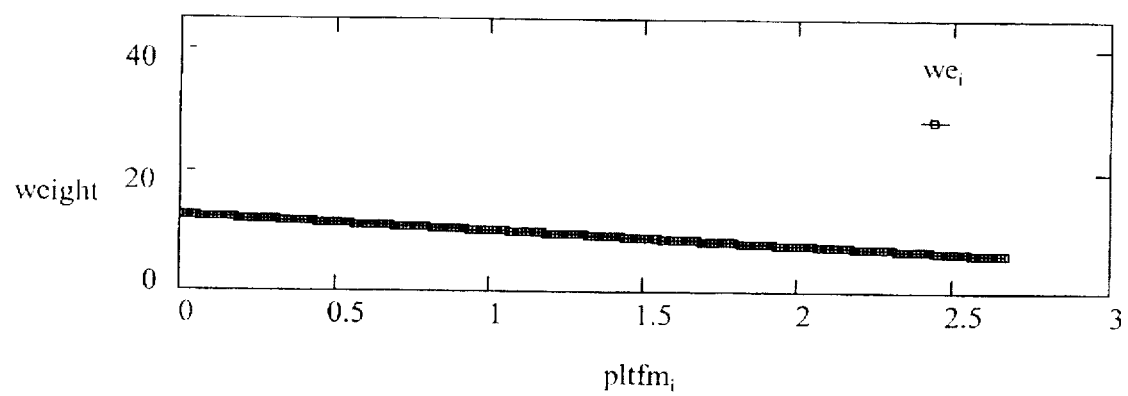
FIG. 13 is a Plot of ElectWeight v. PLTFM.
Figure 14:
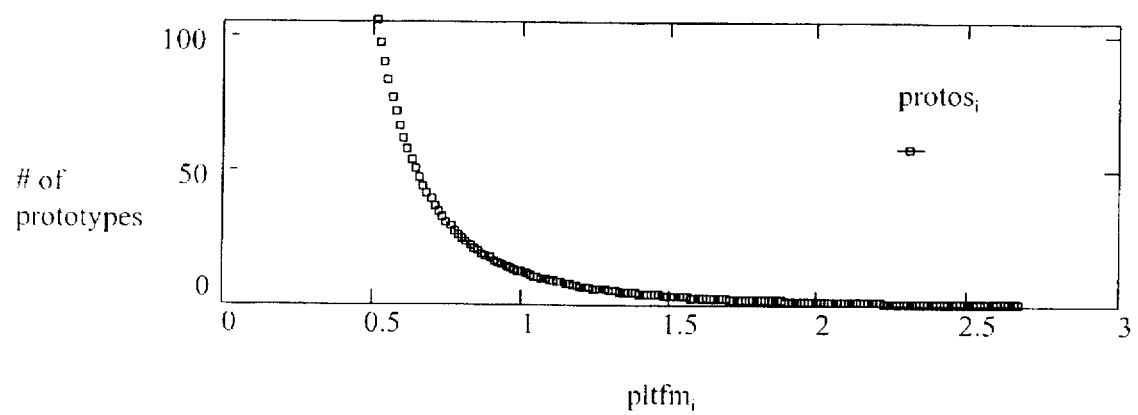
FIG. 14 is a Plot of Protos v. PLTFM.
Figure 15:
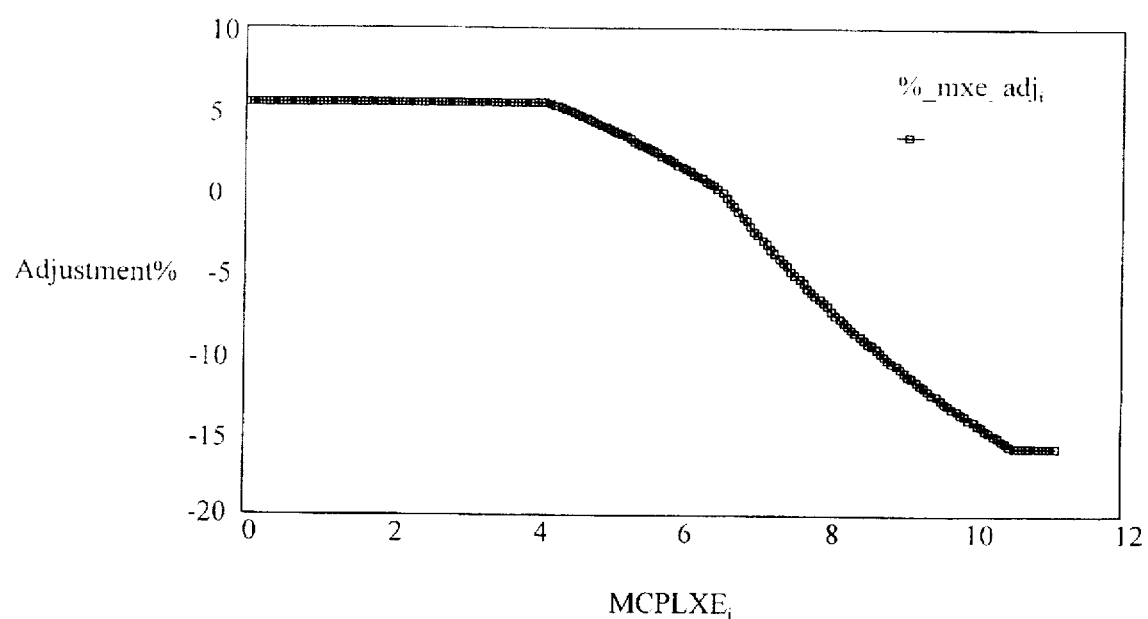
FIG. 15 is a Plot of Material% v. MCPLXE.

FIG. 10 is a graph illustrating the above.
1.3.1.2.2 Calculate a baseline MCPLXE as a function of pltfm The following equations establish the basic values of MCPLXE in the prototype as a function of PLTFM.
This reference is based on an approximate average MCPLXE when PLTFM = 1.0
l_mcplxe$_i$ := ref_mcplxe exp(−.288081+.288081·pltfm$_i$)        If PLTFM < 1.86
m_mcplxe$_i$ = ref_mcplxe exp(−2.4604242+ 1.45600753·pltfm$_i$)   If 1.86 <= PLTFM <= 1.94
h_mcplxe$_i$ = ref_mcplxe exp(.1185221+.126647·pltfm$_i$)         If PLTFM > 1.94
mcplxe$_i$ := if(pltfm$_i$<1.86,l_mcplxe$_i$,m_mcplxe$_i$)
mcplxe$_i$ := if(pltfm$_i$≦1.94,mcplxe$_i$,h_mcplxe$_i$)
FIG. 11 is a graph illustrating the above.
1.3.1.2.3 Calculate a baseline value for RATE (electronics) as a function of pltfm The following equation establishes the basic values of Elect Rate of the prototype as a function of PLTFM.
e_rate$_i$ = 2.047·(pltfm$_i$)$^{-5.076}$                        e_rate is the monthly production of prototype electronics
FIG. 12 is a graph illustrating the above.
1.3.1.2.4 Calculate a baseline value for WE as a function of pltfm The following equation establishes the basic values of Elect Weight in the prototype as a function of PLTFM.
we$_i$ = 12.4210526− 2.36842pltfm$_i$
FIG. 13 is a graph illustrating the above.
1.3.1.2.5 Calculate a baseline value for PROTOS (electronics) as a function of pltfm The following equation establishes the basic values of Prototypes as a function of PLTFM.
protos$_i$ = 12.24(pltfm$_i$)$^{-3.171}$
FIG. 14 is a graph illustrating the above.
1.3.1.2.6 Calculate adjustment to the baseline material% (electronics) as a function of MCPLXE The following equations adjust the percentage of material in the electronics portion of a prototype
Below are high & low                                          Below are high & low
calibration values                                            calibration points
hi_mxe_cal$_i$ := mcplxe$_i$·1.15                             hi_%_mxe$_i$ := if(pltfm$_i$<1.94,−.5,−3)
low_mxe_cal$_i$ := mcplxe$_i$·.85                             lo_%_mxe$_i$ := if(pltfm$_i$<1.1,2.5,5)

$$b\_mxe_i := \frac{\ln\left(\frac{\%\_mat_i}{\%\_mat_i - hi\_\%\_mxe_i}\right)}{\ln(mcplxe_i) - \ln(hi\_mxe\_cal_i)}$$   The parameters at left and below force the
equations through the calibration points at the
calibration values.

$$low\_mxe_i := \frac{lo\_\%\_mxe_i}{\left[\left[\frac{(lmcplxe_i - low\_mxe\_cal_i + mcplxe_i)^{b\_mxe_i}}{(mcplxe_i)^{b\_mxe_i}} \cdot \%\_mat_i\right] - \%\_mat_i\right]}$$

$$hi\_\%\_mxe\_adj_i := \frac{\%\_mat_i \cdot (lMCPLXE_i - mcplxe_i + mcplxe_i)^{b\_mxe_i}}{(mcplxe_i)^{b\_mxe_i}} - \%\_mat_i$$

low_%_mxe_adj$_i$ := low_mxe$_i$·hi_%_mxe_adj$_i$
%_mxe_adj$_i$ := if(MCPLXE$_i$<mcplxe$_i$,low_%_mxe_adj$_i$,hi_%_mxe_adj$_i$)
%_mxe_adj$_i$ := if(%_mxe_adj$_i$>hi_limit$_i$,hi_limit$_i$,%_mxe_adj$_i$)
%_mxe_adj$_i$ := if(%_mxe_adj$_i$<low_limit$_i$,low_limit$_i$,%_mxe_adj$_i$)
FIG. 15 is a graph illustrating the above.
1.3.1.2.7 Calculate adjustment to the baseline material% (electronics) as a function of RATE The following equations adjust the % of material in the electronic portion of a prototype as a function of E_RATE
Below are high & low
calibration points
hi_%_e_rate$_i$ := 6.17647− 1.4706pltfm$_i$ -continued lo_%_e_rate := −5

$$b\_e\_rate_i := \frac{\ln\left(\frac{\%\_mat_i - hi\_\%\_e\_rate_i}{\%\_mat_i}\right)}{\ln(hi\_e\_rate\_cal_i) - \ln(e\_rate_i)}$$

Figure 16:
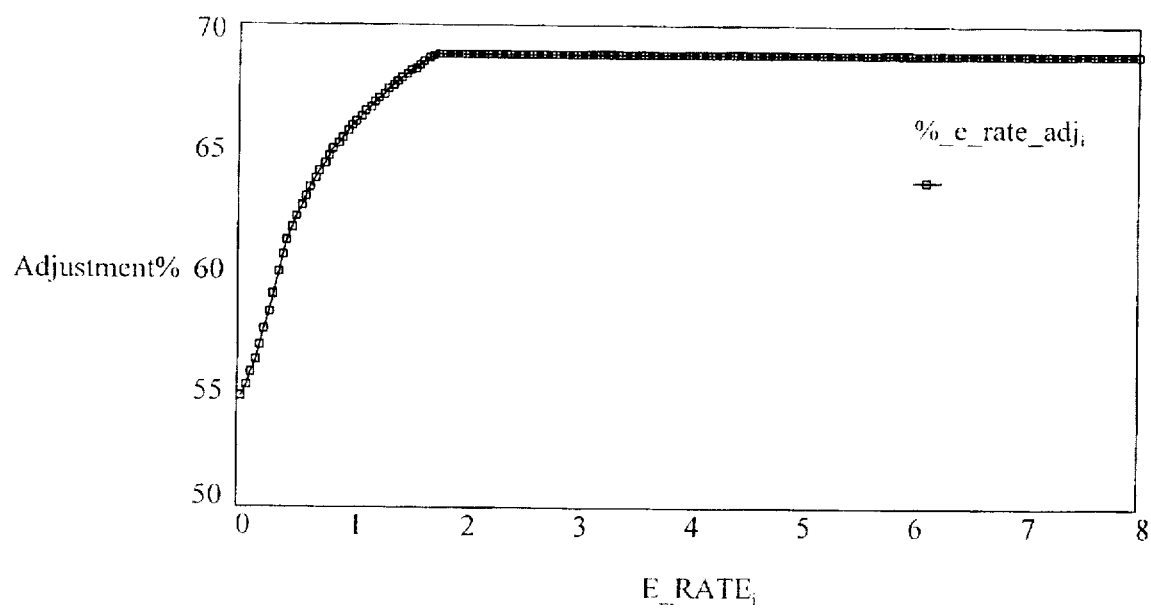
FIG. 16 is a Plot of Material% v. RATE.

The parameters at left and below force the equations through the calibration points at the calibration values.

$$low\_e\_rate_i := \frac{lo\_\%\_e\_rate}{\left[\%\_mat_i - \left[\%\_mat_i \cdot \frac{(le\_rate_i - low\_e\_rate\_cal_i + e\_rate_i)^{b\_e\_rate_i}}{(e\_rate_i)^{b\_e\_rate_i}}\right]\right]}$$

$$hi\_\%\_e\_rate\_adj_i := \%\_mat_i - \frac{\%\_mat_i \cdot (IE\_RATE_i - e\_rate_i| - e\_rate_i)^{b\_e\_rate_i}}{(e\_rate_i)^{b\_e\_rate_i}}$$

low_%_e_rate_adj$_i$ := low_e_rate$_i$·hi_%_e_rate_adj$_i$
%_e_rate_adj$_i$ = if(E_RATE$_i$<e_rate$_i$,low_%_e_rate_adj$_i$,hi_%_e_rate_adj$_i$)
%_e_rate_adj$_i$ := if(%_e_rate_adj$_i$>hi_limit$_i$,hi_limit$_i$,%_e_rate_adj$_i$)
%_e_rate_adj$_i$ := if(%_e_rate_adj$_i$<low_limit$_i$,low_limit$_i$,%_e_rate_adj$_i$) + %_mat$_i$
FIG. 16 is a graph illustrating the above.
1.3.1.2.8 Calculate adjustment to the baseline material% (electronics) as a function of WE The following equations adjust the percentage of material in the electronic portion of a prototype as a function of WE
Below are high & low                        Below are high & low
calibration values                          calibration points
hi_we_cal$_i$ = we$_i$·2                    hi_%_we$_i$ = 1.5·1.62$^{pltfm_i}$
low_we_cal$_i$ = we$_i$·.5                  lo_%_we$_i$ = −6.678·.6174$^{pltfm_i}$ $$b\_we_i := \frac{\ln\left(\frac{\%\_mat_i - hi\_\%\_we_i}{\%\_mat_i}\right)}{\ln(hi\_we\_cal_i) - \ln(we_i)}$$

Figure 17:
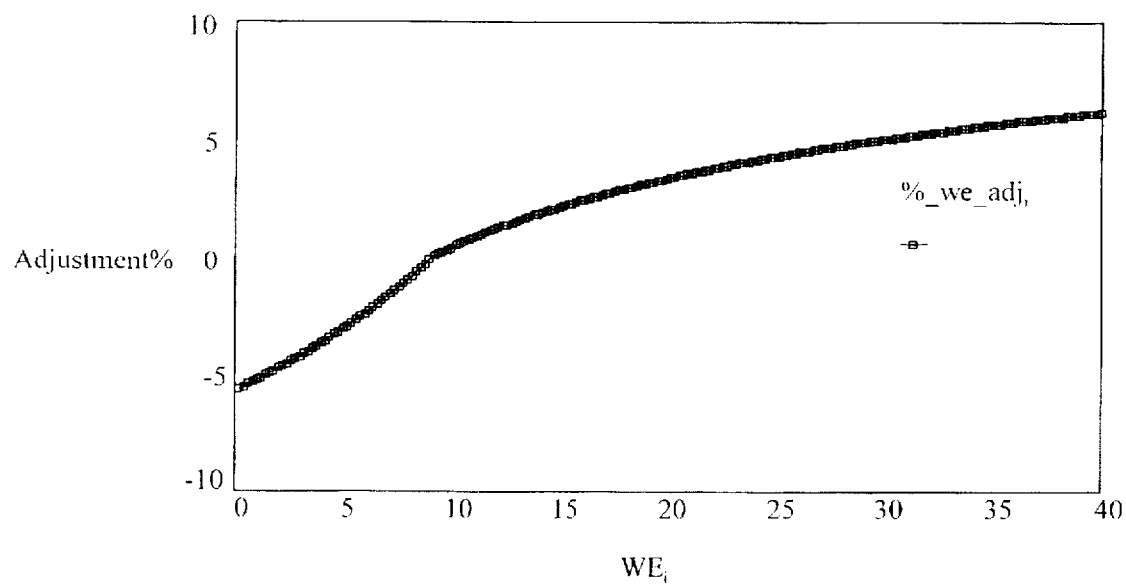
FIG. 17 is a Plot of Material% v. WE.

The parameters at left and below force the equations through the calibration points at the calibration values.

$$low\_we_i := \frac{lo\_\%\_we_i}{\left[\%\_mat_i - \left[\%\_mat_i \cdot \frac{(lwe_i - low\_we\_cal_i| + we_i)^{b\_we_i}}{(we_i)^{b\_we_i}}\right]\right]}$$

$$hi\_\%\_we\_adj_i := \%\_mat_i - \frac{\%\_mat_i \cdot (IWE_i - we_i| + we_i)^{b\_we_i}}{(we_i)^{b\_we_i}}$$

low_%_we_adj$_i$ := low_we$_i$·hi_%_we_adj$_i$
%_we_adj$_i$ = if(WE$_i$<we$_i$,low_%_we_adj$_i$,hi_%_we_adj$_i$)
%_we_adj$_i$ := if(%_we_adj$_i$>hi_limit$_i$,hi_limit$_i$,%_we_adj$_i$)
%_mxs_adj$_i$ = if(%_we_adj$_{i<low\_}$limit$_i$,low_limit$_i$,%_we_adj$_i$)
FIG. 17 is a graph illustrating the above.
1.3.1.2.9 Calculate adjustment to the baseline material% (electronics) as a function of PROTOS The following equations adjust the percentage of material in the electronics portion of a prototype as a function of PROTOS
Below are high & low                        Below are high & low
calibration values                          calibration points
hi_protos_cal$_i$ := protos$_i$·2           hi_%_protos$_i$ := 4.704− .88235pltfm$_i$
low_protos_cal$_i$ := protos$_i$·.5         lo_%_protos$_i$ := −4.4412− 1.17647·pltfm$_i$ $$b\_protos_i := \frac{\ln\left(\frac{\%\_mat_i - hi\_\%\_protos_i}{\%\_mat_i}\right)}{\ln(hi\_protos\_cal_i) - \ln(protos_i)}$$

Figure 18:
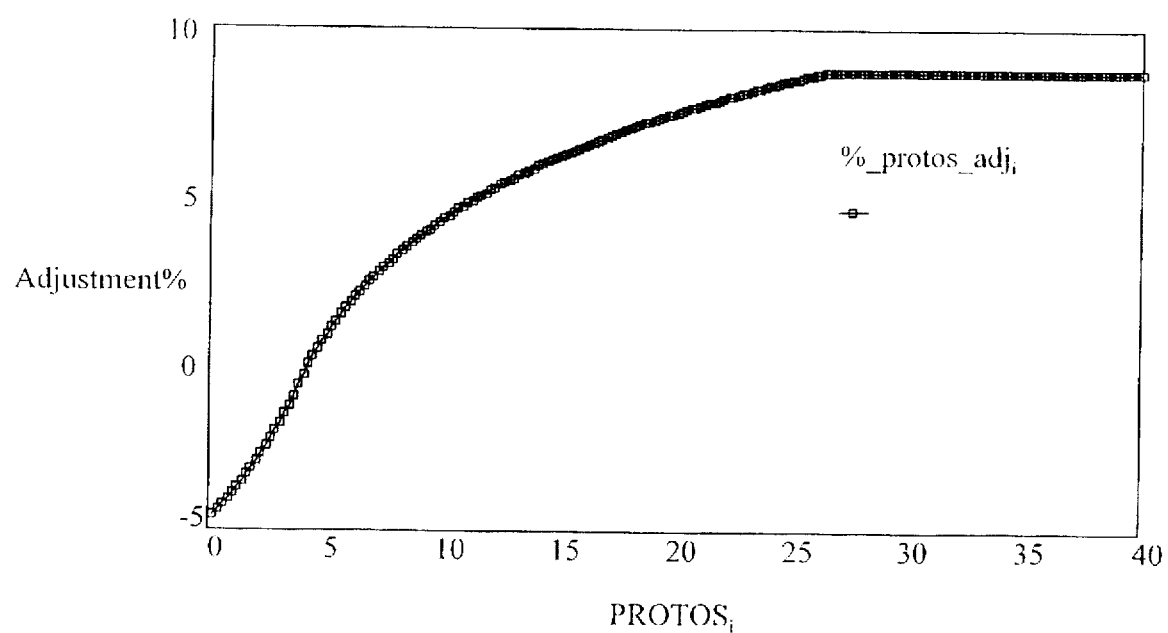
FIG. 18 is a Plot of Material% v. PROTOS.

The parameters at left and below force the equations through the calibration points at the calibration values.

$$low\_protos_i := \frac{lo\_\%\_protos_i}{\left[\%\_mat_i - \left[\%\_mat_i \cdot \frac{(lprotos_i - low\_protos\_cal_i| - protos_i)^{b\_protos_i}}{(protos_i)^{b\_protos_i}}\right]\right]}$$

$$hi\_\%\_protos\_adj_i := \%\_mat_i - \frac{\%\_mat_i \cdot (IPROTOS_i - protos_i| - protos_i)^{b\_protos_i}}{(protos_i)^{b\_protos_i}}$$

low_%_protos_adj$_i$ = low_protos$_i$·hi_%_protos_adj$_i$
%_protos_adj$_i$ = if(PROTOS$_i$<protos$_i$,low_%_protos_adj$_i$,hi_%_protos_adj$_i$)
%_protos_adj$_i$ = if(%_protos_adj$_i$>hi_limit$_i$,hi_limit$_i$,%_protos_adj$_i$)
%_protos_adj$_i$ = if(%_protos_adj$_i$<low_limit$_i$,low_limit$_i$,%_protos_adj$_i$)
FIG. 18 is a graph illustrating the above.
1.3.1.2.10 Apply adjustments to baseline material% (electronics).

protoElecOEMMat% = basicMat% + mcplxeAdj + rateAdj + weAdj + protosAdj
1.3.1.3 Calculate ProtoElecMat%, using OEM% from LM Sheet $$ProtoElecMat\% = \left(ProtoElecOEMMat\% * \frac{OEM\%}{100}\right) + \left(\left(1 - \frac{OEM\%}{100}\right) * ProtoElecAMSMat\%\right)$$

1.3.1.4 Calculate $OPC_E$ & $MatOPC_E$ using ProtoElecMat%

$OPC_E$ = f(we,mcplxe,ecmplx)
$MatOPC_E$ = ProtoElecMat%*$OPC_E$

Figure 19:
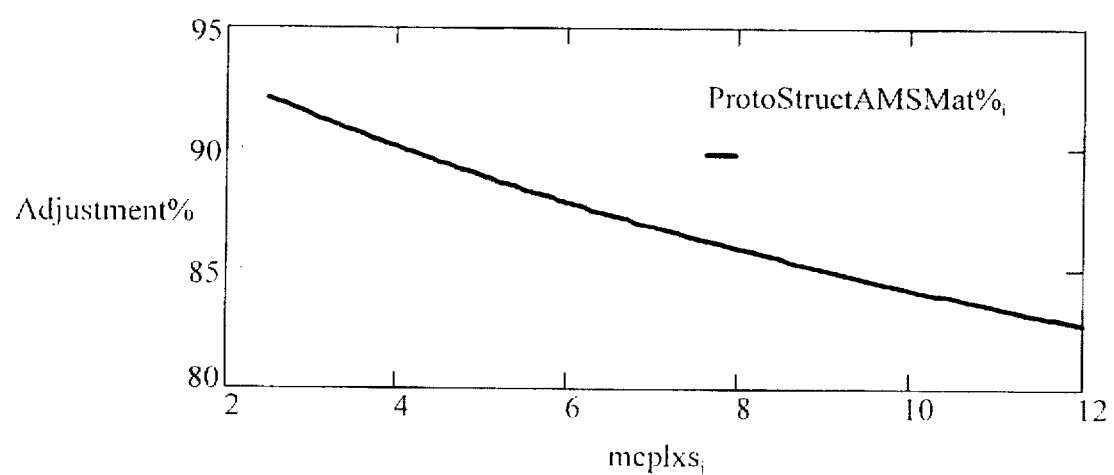
FIG. 19 is a Plot of ProtoStructAMSMat% v. MEPLXS.

1.3.1.5 Calculate ProtoStructAMSMat% i = 25 . . . 120 $\quad mcplxs_i := \dfrac{i}{10} \quad$ ProtoStructAMSMat%$_i := |1 - [.05 \cdot (mcplxs_i)^{.5}]| \cdot 100$ FIG. 19 is a graph illustrating the above.

1.3.1.6 Calculate ProtoStructOEMmat%

1. Calculate a baseline material% as a function of pltfm
2. Calculate a baseline value for MCPLXS as a function of pltfm
3. Calculate a baseline value for RATE as a function of pltfm
4. Calculate a baseline value for WS as a function of pltfm
5. Calculate a baseline value for QTY as a function of pltfm
6. Calculate an adjustment to the baseline material% as a function of MCPLXS
7. Calculate an adjustment to the baseline material% as a function of RATE
8. Calculate an adjustment to the baseline material% as a function of WS
9. Calculate an adjustment to the baseline material% as a function of QTY
10. Apply adjustments to baseline material%.

1.3.1.6.1 Calculate a baseline material% (structure) as a function of pltfm The following algorithms and equations are used to determine the percent of material in the structure portion of Prototypes.
The following equations establish the basic percentage of material in the prototype as a function of PLTFM.

low_%_mat$_i$ = (106.6667 − 33.3333pltfm$_i$) $\qquad$ if PLTFM <= 1.4
L_med_%_mat$_i$ = (130 − 50·pltfm$_i$) $\qquad$ if 1.4 < PLTFM <= 1.86
h_med_%_mat$_i$ = (302.05 − 142.5·pltfm$_i$) $\qquad$ if 1.86 < PLTFM <= 1.94
$\qquad\qquad\qquad\qquad\qquad\qquad$ if PLTFM > 1.94

%_mat$_i$ = if(pltfm$_i$>1.4,L_med_%_mat$_i$,low_%_mat$_i$) $\qquad$ The equations below establish high & low
%_mat$_i$ = if(pltfm$_i$>1.86,h_med_%_mat$_i$,%_mat$_i$) $\qquad$ limits of % material adjustment for each of
%_mat$_i$ = if(pltfm$_i$>1.94,hi_%_mat$_i$,%_mat$_i$) $\qquad$ the controlling parameters.

$$low\_limit_i = \frac{10 - \%\_mat_i}{4} \qquad hi\_limit_i = \frac{95 - \%\_mat_i}{4}$$

Figure 20:
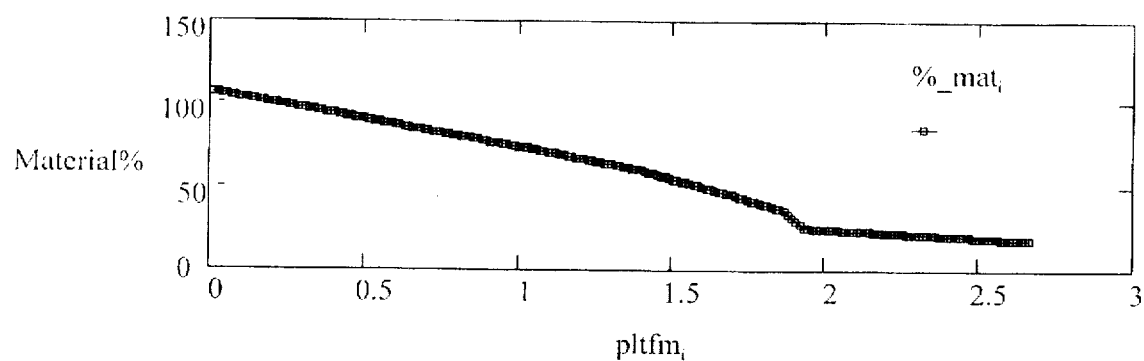
FIG. 20 is a Plot of Material% v. PLTFM.

FIG. 20 is a graph illustrating the above.

1.3.1.6.2 Calculate a baseline MCPLXS as a function of pltfm

The following equations establish the basic values of MCPLXS in the prototype as a function of PLTFM.

ref_mcplxs = 5.33 $\qquad$ This reference is based on an approximate average MCPLXS when PLTFM = 1.0
L_mcplxs$_i$ := ref_mcplxs·pltfm$_i$$^{.32}$ $\qquad$ If PLTFM < 1.86
m_mcplxs$_i$ = (.75·pltfm$_i$ − .395)·(pltfm$_i$)$^{.32}$·ref_mcplxs $\qquad$ If 1.86 < PLTFM <= 1.94
h_mcplxs$_i$ = 1.06·ref_mcplxs·(pltfm$_i$)$^{.32}$ $\qquad$ If PLTFM > 1.94
mcplxs$_i$ := if(pltfm$_i$<1.86,L_mcplxs$_i$,m_mcplxs$_i$)
mcplxs$_i$ := if(pltfm$_i$≦1.94,mcplxs$_i$,h_mcplxs$_i$)

Figure 21:
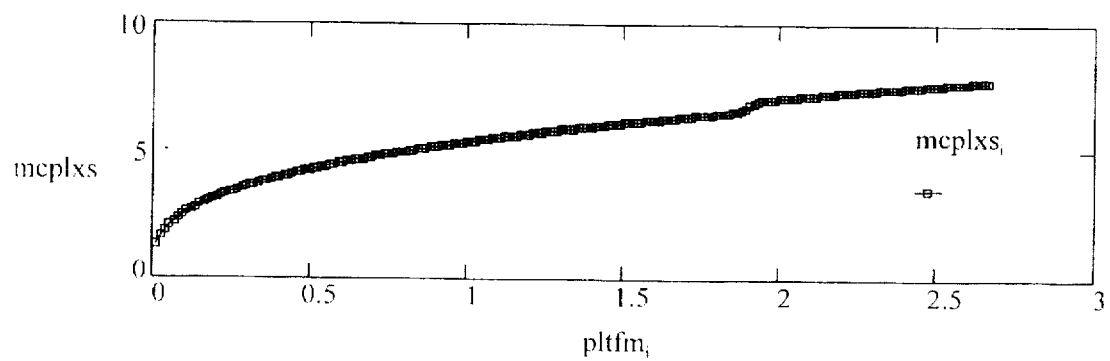
FIG. 21 is a Plot of MEPLXS v. PLTFM.

FIG. 21 is a graph illustrating the above.

Figure 22:
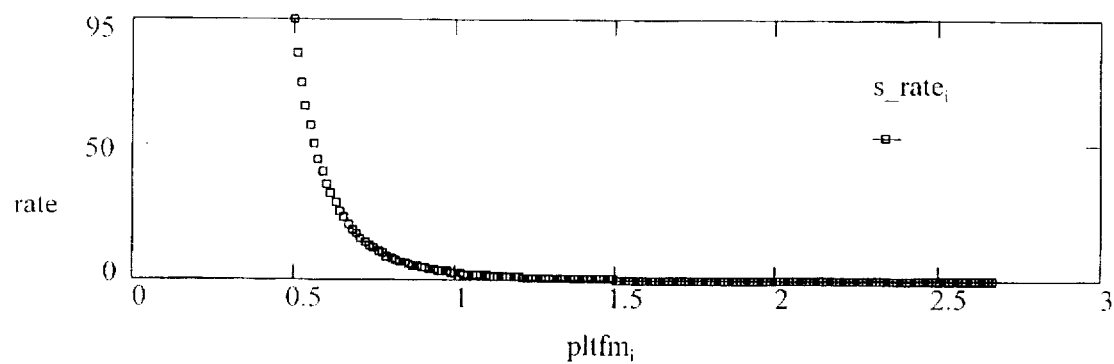
FIG. 22 is a Plot of SRate v. PLTFM.

1.3.1.6.3 Calculate a baseline value for RATE (structure) as a function of pltfm The following equation establishes the basic values of Structure Rate of the prototype as a function of PLTFM.
s_rate$_i$ = 2.631·(pltfm$_i$)$^{-5.076}$ $\qquad$ s_rate is the monthly production of prototype structure FIG. 22 is a graph illustrating the above.

1.3.1.6.4 Calculate a baseline value for WS as a function of pltfm

Figure 23:
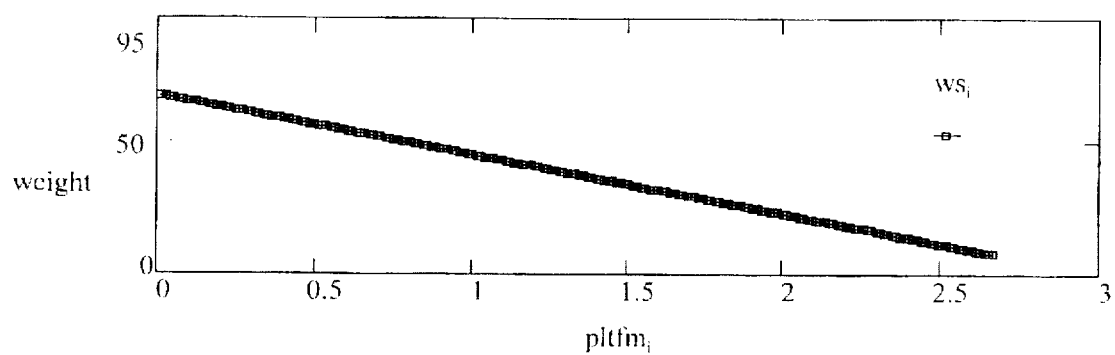
FIG. 23 is a Plot of WS v. PLTFM.

The following equation establishes the basic values of Structure Weight in the prototype as a function of PLTFM.
ws$_i$ = 67.01 − 22.26pltfm$_i$ FIG. 23 is a graph illustrating the above.

Figure 24:
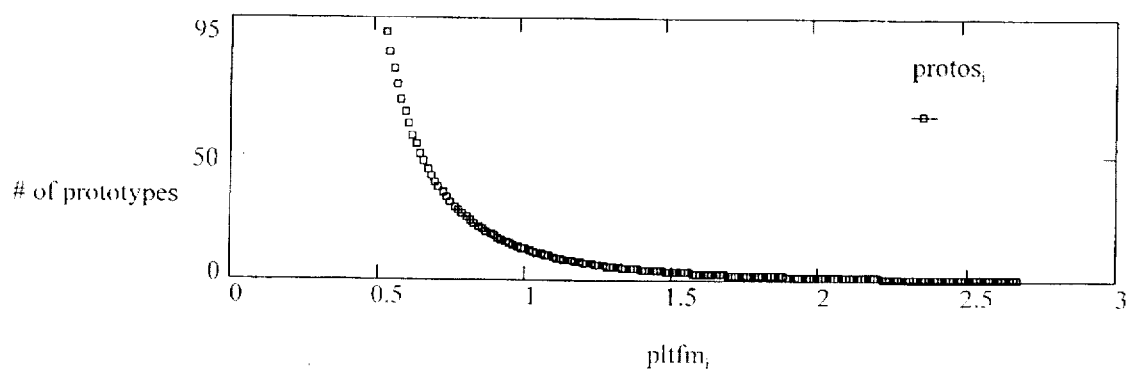
FIG. 24 is a Plot of PROTOS v. PLTFM.

1.3.1.6.5 Calculate a baseline value for PROTOS (structure) as a function of pltfm The following equation establishes the basic values of Prototypes as a function of PLTFM.
protos$_i$ := 12.24(pltfm$_i$)$^{-3.171}$ FIG. 24 is a graph illustrating the above.

1.3.1.6.6 Calculate adjustment to the baseline material% (structure) as a function of MCPLXS The following equations adjust the percentage of material in the structure portion of a prototype Below are high & low $\qquad\qquad\qquad\qquad$ Below are high & low
calibration values $\qquad\qquad\qquad\qquad\qquad$ calibration points
hi_mxs_cal$_i$ := mcplxs$_i$·1.2 $\qquad\qquad\qquad$ hi_%_mxs$_i$ := if(pltfm$_i$<1.94,−5,−3)
low_mxs_cal$_i$ := mcplxs$_i$·.8 $\qquad\qquad\qquad$ lo_%_mxs$_i$ = if(pltfm$_i$<1.1,2.5,5)

$$b\_mxs_i := \frac{\ln\left(\dfrac{\%\_mat_i}{\%\_mat_i - hi\_\%\_mxs_i}\right)}{\ln(mcplxs_i) - \ln(hi\_mxs\_cal_i)}$$

The parameters at left and below force the equations through the calibration points at the calibration values.

Figure 25:
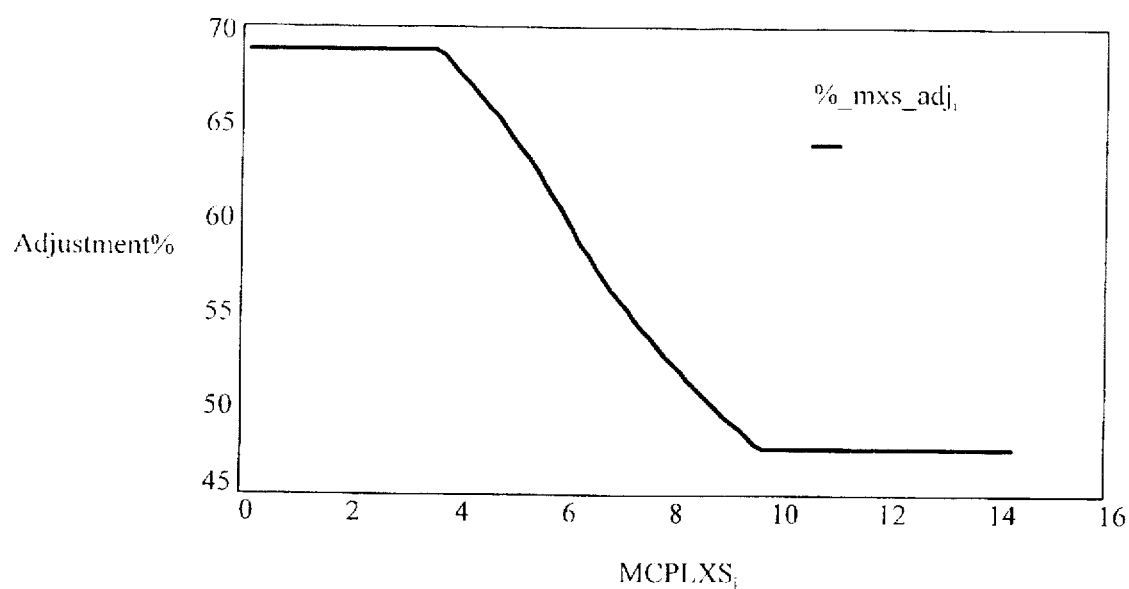
FIG. 25 is a Plot of %MXS.ADJ. v. MCPLXS.

-continued $$\text{low\_mxs}_i := \cfrac{\text{lo\_\%\_mxs}_i}{\left[\left[\cfrac{(|\text{mcplxs}_i - \text{low\_mxs\_cal}_i| + \text{mcplxs}_e)^{b\_mxs_i}}{(\text{mcplxs}_i)^{b\_mxs_i}} \cdot \%\_\text{mat}_i\right] - \%\_\text{mat}_i\right]}$$

$$\text{hi\_\%\_mxs\_adj}_i := \cfrac{\%\_\text{mat}_i \cdot (|\text{MCPLXS} - \text{mcplxs}_i| + \text{mcplxs}_i)^{b\_mxs_i}}{(\text{mcplxs}_i)^{b\_mxs_i}} - \%\_\text{mat}_i$$

low\_%\_mxs\_adj$_i$ = low\_mxs$_i$·hi\_%\_mxs\_adj$_i$
%\_mxs\_adj$_i$ := if(MCPLXS$_i$<mcplxs$_i$,low\_%\_mxs\_adj$_i$,hi\_%\_mxs\_adj$_i$)
%\_mxs\_adj$_i$ = if(%\_mxs\_adj$_i$>hi\_limit$_i$,hi\_limit$_i$,%\_mxs\_adj$_i$)
%\_mxs\_adj$_i$ = if(%\_mxs\_adj$_i$<low\_limit$_i$,low\_limit$_i$,%\_mxs\_adj$_i$) + %\_mat$_i$
FIG. 25 is a graph illustrating the above.
1.3.1.6.7 Calculate adjustment to the baseline material% (structure) as a function of RATE The following equations adjust the % of material in the structure portion of a prototype as a function of S\_RATE Below are high & low calibration values
hi\_s\_rate\_cal$_i$ := s\_rate$_i$·2
low\_s\_rate\_cal$_i$ := s\_rate$_i$·.2

Below are high & low calibration points
hi\_%\_s\_rate$_i$ := 4.382·(pltfm$_i$)$^{-.7303}$
lo\_%\_s\_rate := −5

$$\text{b\_s\_rate}_i := \cfrac{\ln\left(\cfrac{\%\_\text{mat}_i - \text{hi\_\%\_s\_rate}_i}{\%\_\text{mat}_i}\right)}{\ln(\text{hi\_s\_rate\_cal}_i) - \ln(\text{s\_rate}_i)}$$

Figure 26:
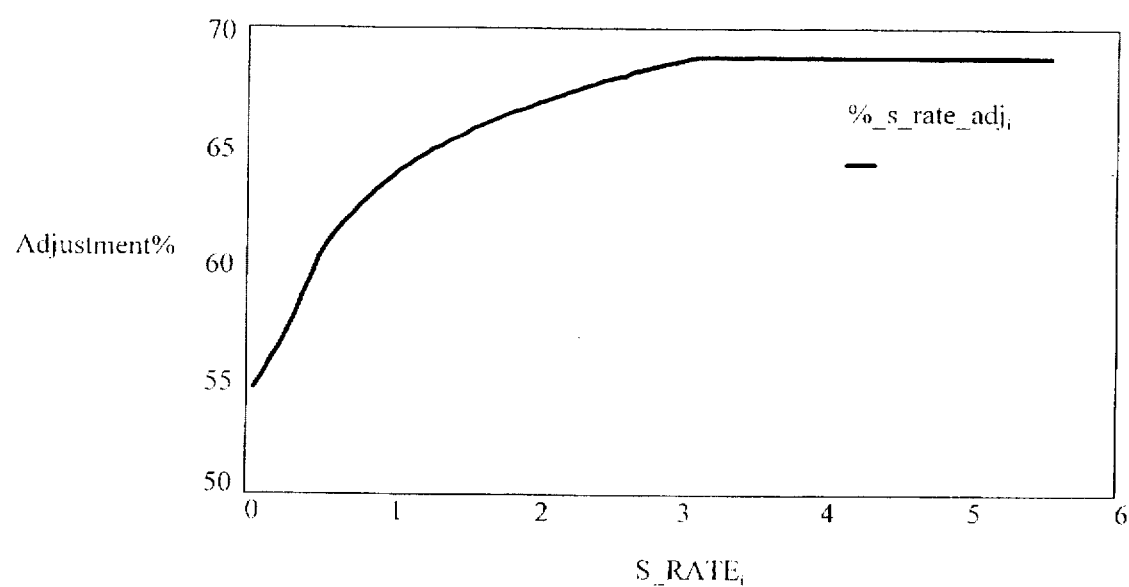
FIG. 26 is a Plot of %SRateAdj v. SRate.

The parameters at left and below force the equations through the calibration points at the calibration values.

$$\text{low\_s\_rate}_i := \cfrac{\text{lo\_\%\_s\_rate}}{\left[\%\_\text{mat}_i - \left[\%\_\text{mat}_i \cdot \cfrac{(|\text{s\_rate}_i - \text{low\_s\_rate\_cal}_i| + \text{s\_rate}_i)^{b\_s\_rate_i}}{(\text{s\_rate}_i)^{b\_s\_rate_i}}\right]\right]}$$

$$\text{hi\_\%\_s\_rate\_adj}_i := \%\_\text{mat}_i - \cfrac{\%\_\text{mat}_i \cdot (|\text{S\_RATE}_i - \text{s\_rate}_i| - \text{s\_rate}_i)^{b\_s\_rate_i}}{(\text{s\_rate}_i)^{b\_s\_rate_i}}$$

low\_%\_s\_rate\_adj$_i$ := low\_s\_rate$_i$·hi\_%\_s\_rate\_adj$_i$
%\_s\_rate\_adj$_i$ := if(S\_RATE$_i$<s\_rate$_i$,low\_%\_s\_rate\_adj$_i$,hi\_%\_s\_rate\_adj$_i$)
%\_s\_rate\_adj$_i$ = if(%\_s\_rate\_adj$_i$>hi\_limit$_i$,hi\_limit$_i$,%\_s\_rate\_adj$_i$)
%\_s\_rate\_adj$_i$ = if(%\_s\_rate\_adj$_i$<low\_limit$_i$,low\_limit$_i$,%\_s\_rate\_adj$_i$) + %\_mat$_i$
FIG. 26 is a graph illustrating the above.
1.3.1.6.8 Calculate adjustment to the baseline material% (structure) as a function of WS The following equations adjust the percentage of material in the structure portion of a prototype Below are high & low calibration values
hi\_ws\_cal$_i$ := ws$_i$·2
low\_ws\_cal$_i$ := ws$_i$·.5

Below are high & low calibration points
hi\_%\_ws$_i$ := 3.3333+ .83333pltfm$_i$
lo\_%\_ws$_i$ :=−3.3333− .83333pltfm$_i$ $$\text{b\_ws}_i := \cfrac{\ln\left(\cfrac{\%\_\text{mat}_i - \text{hi\_\%\_ws}_i}{\%\_\text{mat}_i}\right)}{\ln(\text{hi\_ws\_cal}_i) - \ln(\text{ws}_i)}$$

Figure 27:
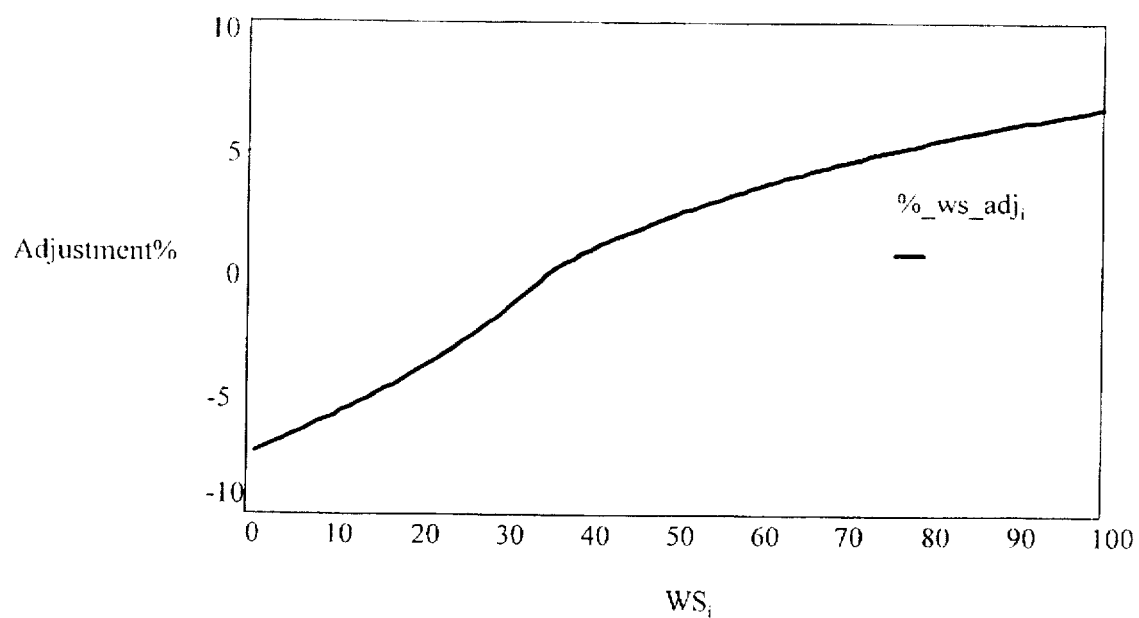
FIG. 27 is a Plot of Material% v. WS.

The parameters at left and below force the equations through the calibration points at the calibration values.

$$\text{low\_ws}_i := \cfrac{\text{lo\_\%\_ws}_i}{\left[\%\_\text{mat}_i - \left[\%\_\text{mat}_i \cdot \cfrac{(|\text{ws}_i - \text{low\_ws\_cal}_i| + \text{ws}_i)^{b\_ws_i}}{(\text{ws}_i)^{b\_ws_i}}\right]\right]}$$

$$\text{hi\_\%\_ws\_adj}_i := \%\_\text{mat}_i - \cfrac{\%\_\text{mat}_i \cdot (|\text{WS}_i - \text{ws}_i| + \text{ws}_i)^{b\_ws_i}}{(\text{ws}_i)^{b\_ws_i}}$$

low\_%\_ws\_adj$_i$ = low\_ws$_i$·hi\_%\_ws\_adj$_i$
%\_ws\_adj$_i$ = if(WS$_i$<ws$_i$,low\_%\_ws\_adj$_i$,hi\_%\_ws\_adj$_i$)
%\_ws\_adj$_i$ := if(%\_ws\_adj$_i$>hi\_limit$_i$,hi\_limit$_i$,%\_ws\_adj$_i$)
%\_ws\_adj$_i$ = if(%\_ws\_adj$_i$<low\_limit$_i$,low\_limit$_i$,%\_ws\_adj$_i$)
FIG. 27 is a graph illustrating the above.
1.3.1.6.9 Calculate adjustment to the baseline material% (structure) as a function of PROTOS The following equations adjust the percentage of material in the structure portion of a prototype Below are high & low calibration values
hi\_protos\_cal$_i$ := protos$_i$·2
low\_protos\_cal$_i$ = protos$_i$·.5

Below are high & low calibration points
hi\_%\_protos$_i$ = 4.704− .88235pltfm$_i$
lo\_%\_protos$_i$ = −4.4412− 1.17647pltfm$_i$ $$\text{b\_protos}_i := \cfrac{\ln\left(\cfrac{\%\_\text{mat}_i - \text{hi\_\%\_protos}_i}{\%\_\text{mat}_i}\right)}{\ln(\text{hi\_protos\_cal}_i) - \ln(\text{protos}_i)}$$

Figure 28:
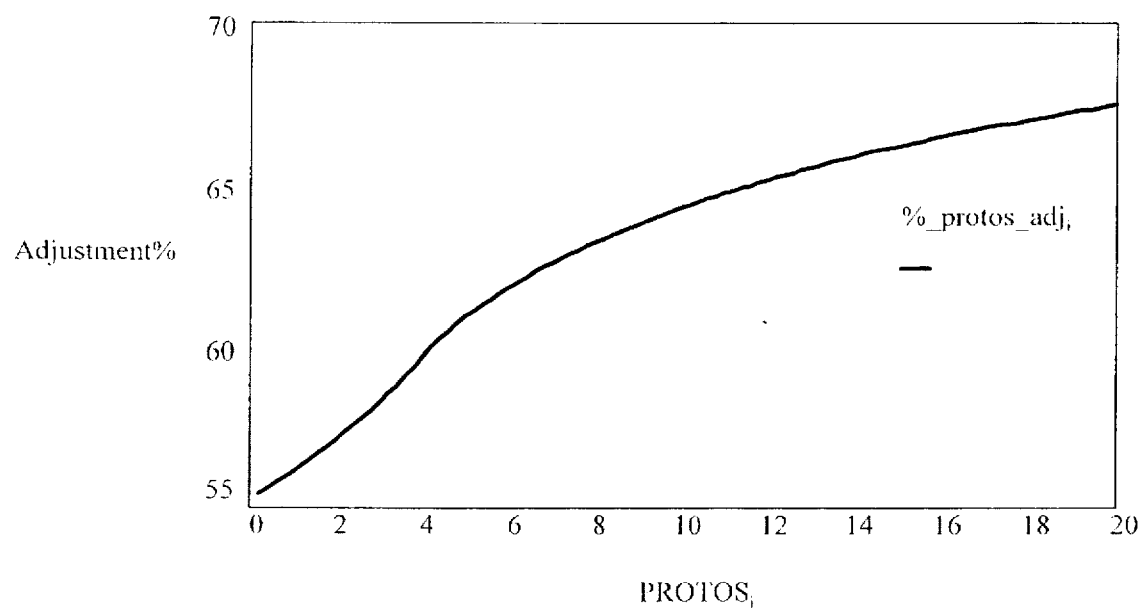
FIG. 28 is a Plot of Material% v. PROTOS.

The parameters at left and below force the equations through the calibration points at the calibration values.

$$\text{low\_protos}_i := \frac{\text{lo\_\%\_protos}_i}{\left[ \%\_\text{mat}_i - \left[ \%\_\text{mat}_i \cdot \frac{(\text{lprotos}_i - \text{low\_protos\_cal}_i - \text{protos}_i)^{b\_protos_i}}{(\text{protos}_i)^{b\_protos_i}} \right] \right]}$$

$$\text{hi\_\%\_protos\_adj}_i := \%\_\text{mat}_i - \frac{\%\_\text{mat}_i \cdot (\text{lPROTOS}_i - \text{protos}_i - \text{protos}_i)^{b\_protos_i}}{(\text{protos}_i)^{b\_protos_i}}$$

low\_%\_protos\_adj$_i$ = low\_protos$_i$·hi\_%\_protos\_adj$_i$
%\_protos\_adj$_i$ = if(PROTOS$_i$<protos$_i$,low\_%\_protos\_adj$_i$,hi\_%\_protos\_adj$_i$)
%\_protos\_adj$_i$ = if(%\_protos\_adj$_i$>hi\_limit$_i$,hi\_limit$_i$,%\_protos\_adj$_i$)
%\_protos\_adj$_i$ = if(%\_protos\_adj$_i$<low\_limit$_i$,low\_limit$_i$,%\_protos\_adj$_i$) + %\_mat$_i$
FIG. 28 is a graph illustrating the above.
1.3.1.6.10 Apply adjustments to baseline material% (structure).

protoStructOEMMat% = basicMat% + mcplxsAdj + rateAdj + wsAdj + protosAdj
1.3.1.7 Calculate ProtoStructMat% using OEM% from LM Sheet $$\text{ProtoStructMat\%} = \left( \text{ProtoStructOEMMat\%} * \frac{\text{OEM\%}}{100} \right) + \left( \left( 1 - \frac{\text{OEM\%}}{100} \right) * \text{ProtoStructAMSMat\%} \right)$$

1.3.1.8 Calculate OPC$_S$ & MatOPC$_S$ using ProtoStructMat%

OPC$_S$ = f(ws,mcplxs,ecmplx)
MatOPC$_s$ = ProtoStructMat%*OPC$_S$
1.3.1.9 Calculate ProtoMat%

$$\text{protoMat\%} = \frac{\text{MatOPC}_E + \text{MatOPE}_S}{\text{OPC}_E + \text{OPE}_S}$$

1.3.2 Detail of prototype manufacturing material% (ProtoMat%) calculation for mode 5

Figure 29:
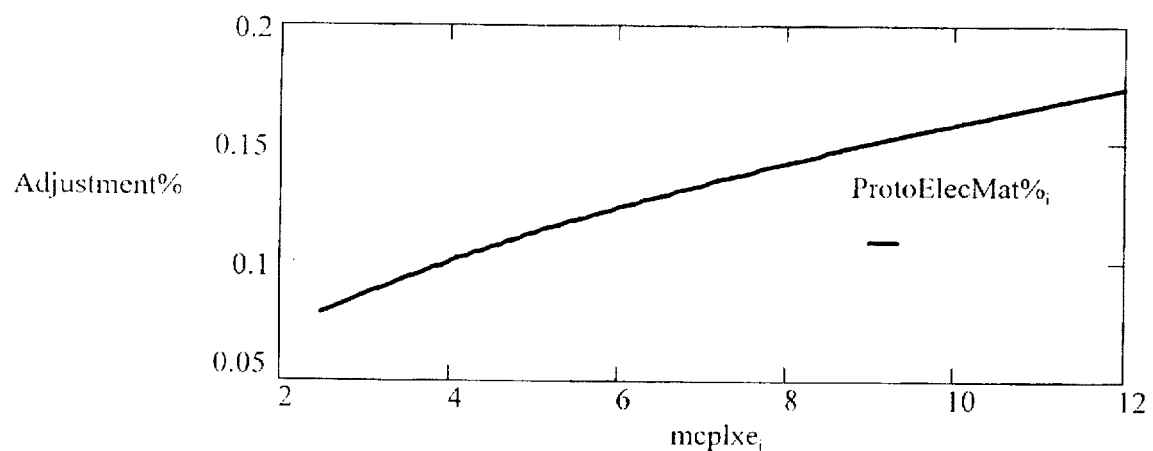
FIG. 29 is a Plot of ProtoElecIdat% v. MEPLXE.

1.3.2.1 Calculate ProtoElecMat% i = 25 . . . 120      $\text{mcplxe}_i := \frac{i}{10}$      $\text{ProtoElecMat\%}_i := .05 \cdot (\text{mcplxe}_i)^{.5}$ FIG. 29 is a graph illustrating the above.
1.3.2.2 Calculate OPC$_E$ & MatOPC$_E$ using ProtoElecMat%

Figure 30:
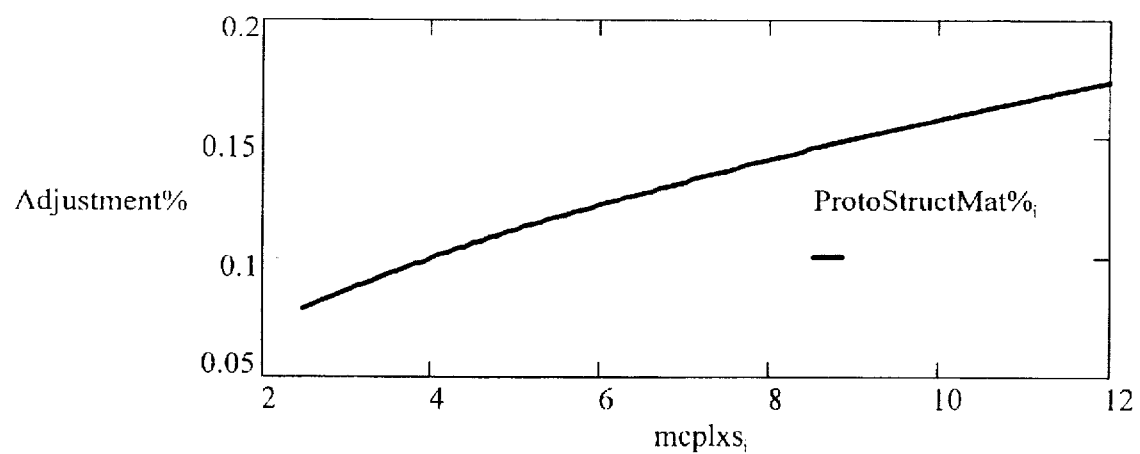
FIG. 30 is a Plot of ProtbStructMat% v. MEPLXS.

OPC$_E$ = f(we,mcplxe,ecmplx)
MatOPC$_E$ = ProtoElecMat%*OPC$_E$
1.3.2.3 Calculate ProtoStructMat% i = 25 . . . 120      $\text{mcplxs}_i := \frac{i}{10}$      $\text{ProtoStructMat\%}_i := .05 \cdot (\text{mcplxs}_i)^{.5}$ FIG. 30 is a graph illustrating the above.
1.3.2.4 Calculate OPC$_S$ & MatOPC$_S$ using ProtoStructMat%

OPC$_S$ = f(ws,mcplxs,ecmplx)
MatOPC$_S$ = ProtoStructMat%*OPC$_S$
1.3.2.5 Calculate ProtoMat%

$$\text{protoMat\%} = \frac{\text{MatOPC}_E + \text{MatOPE}_S}{\text{OPC}_E + \text{OPE}_S}$$

1.3.3 Detail of prototype manufacturing material% (ProtoMat%) calculation for H-modules The basis of the ProtoMat% is the material percent calculated for production production (ProdMat%). As the ratio of prototypes to production units increases the material percentage in the prototype increases. Crossover occurs when the number of prototypes is equal to the number of production units. QTY=0 is handled as a special case: ProtMat%=5
i = 1 . . . 200      ProdMat% = 50      qty = 100      protos$_i$ = i $$\text{ProtMat\%}_i := \text{ProdMat\%} - {}^{[(\frac{\text{protos}_i}{\text{qty}})]^1}$$

Figure 31:
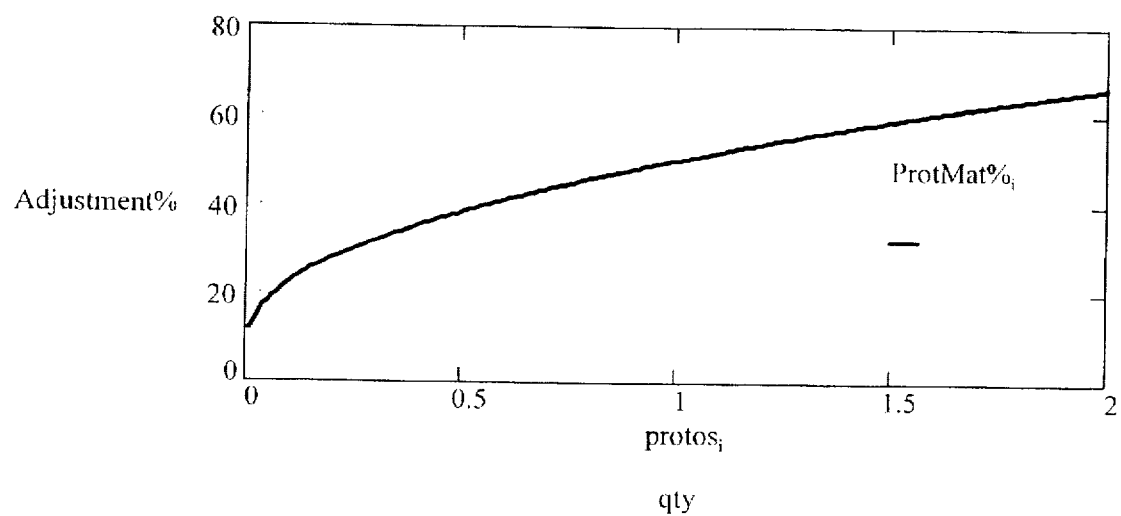
FIG. 31 is a Plot of ProtoMat% v. PROTOS.

FIG. 31 is a graph illustrating the above.

| 1.4 Phase: Development, Category: Tooling & Test Equip., Mat% Calculation | | |
|---|---|---|
| Type | Mode | Calculation |
| Electronic & electro/mechanical | 1 | DevTTEMat%$_i$ = oem%[.6 − (.048log(protos$_i$))] − (100− oem%)·[.6 − (.025·log(protos$_i$))] |
| Mechanical | 2 | #1 |
| Purchased | 3 | 0 |
| Furnished | 4 | 0 |

| | | |
|---|---|---|
| Integration & Test | 5 | #1 |
| Modified | 6 | #1 |
| Calibration | 7 | #1 |
| Thruput | 8 | |
| Multiple lot | 9 | 0 |
| Detailed Purchased | 33 | #1 |
| Design Integration | 51 | #1 |
| HW/SW Integration & Test | 52 | #11 |
| H Module | HMOD | #1 |

Figure 32:
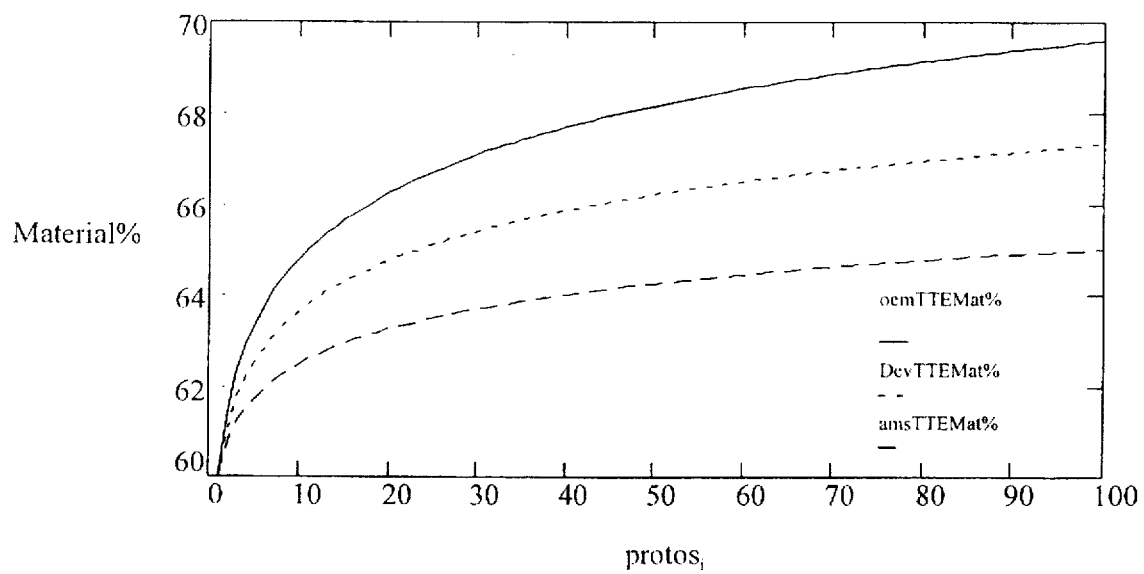
FIG. 32 is a Plot of TTEMat% v. PROTOS.

$i = 1 \ldots 100 \quad oem\% := 50$ $protos_i = i$ $oemTTEMat\%_i := [.6 + (.04 \& \log(protos_i))] \cdot 100$ $amsTTEMat\%_i := [.6 + (.025 \cdot \log(protos_i))] \cdot 100$ $DevTTEMat\%_i = oem\% \cdot [.6 - (.04 \& \log(protos_i))] + (100 - oem\%) \cdot [.6 + (.025 \cdot \log(protos_i))]$ FIG. 32 is a graph illustrating the above.

1.5 Phase: Production, Category: Project Management, ODC% Calculation

| Type | Mode | Calculation |
|---|---|---|
| Electronic & electro/mechanical | 1 | $ProdPrjMgtMat\%_i := \left[ oem\% \cdot \left( \frac{.12}{pltfm_i} \right) \right] + \left[ (100 - oem\%) \cdot \left( \frac{.18}{pltfm_i} \right) \right]$ |
| Mechanical | 2 | #1 |
| Purchased | 3 | 0 |
| Furnished | 4 | 0 |
| Integration & Test | 5 | #1 |
| Modified | 6 | #1 |
| Calibration | 7 | #1 |
| Thruput | 8 | 0 |
| Multiple lot | 9 | #1 |
| Detailed Purchased | 33 | #1 |
| Design Integration | 51 | 0 |
| HW/SW Integration & Test | 52 | 0 |
| H Module | HMOD | #1 |

Figure 33:
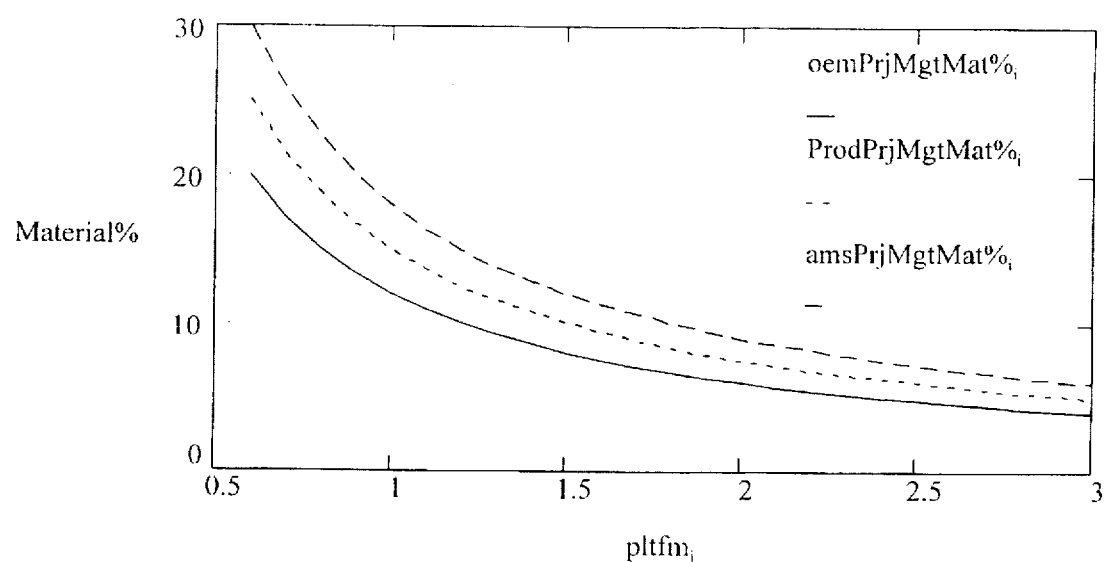
FIG. 33 is a Plot of PrjMgtMat% v. PLTFM.

$i = 6 \ldots 30$ $pltfm_i := \frac{i}{10} \quad oemPrjMgtMat\%_i := \frac{.12}{pltfm_i} \cdot 100 \quad amsPrjMgtMat\%_i := \frac{.18}{pltfm_i} \cdot 100$ $oem\% = 50$ $ProdPrjMgtMat\%_i := \left[ oem\% \cdot \left( \frac{.12}{pltfm_i} \right) \right] + \left[ (100 - oem\%) \cdot \left( \frac{.18}{pltfm_i} \right) \right]$ FIG. 33 is a graph illustrating the above.

1.6 Phase: Production, Category: Data, Mat% Calculation

| Type | Mode | Calculation |
|---|---|---|
| Electronic & electro/mechanical | 1 | $ProdDataMat\%_i := \left[ oem\% \cdot \left( \frac{.48}{pltfm_i} \right) \right] + \left[ (100 - oem\%) \cdot \left( \frac{.24}{pltfm_i} \right) \right]$ |
| Mechanical | 2 | #1 |
| Purchased | 3 | 0 |
| Furnished | 4 | 0 |
| Integration & Test | 5 | #1 |
| Modified | 6 | #1 |
| Calibration | 7 | #1 |
| Thruput | 8 | 0 |
| Multiple lot | 9 | #1 |
| Detailed Purchased | 33 | #1 |
| Design Integration | 51 | 0 |
| HW/SW Integration & Test | 52 | 0 |
| H Module | HMOD | #1 |

Figure 34:
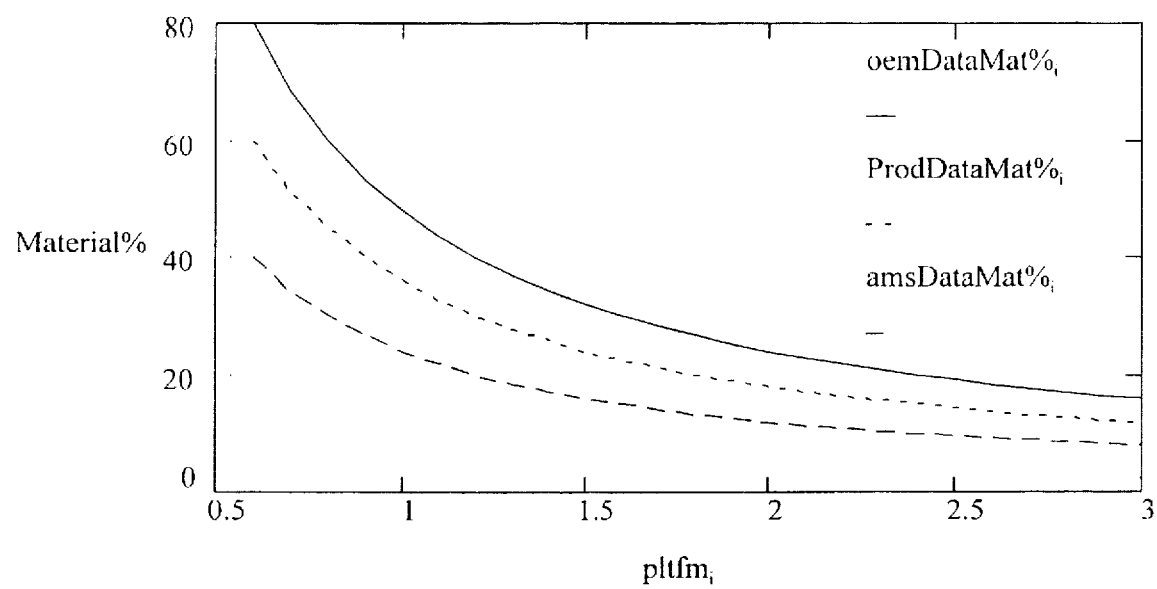
FIG. 34 is a Plot of DataMat% v. PLTFM.

$i = 6 \ldots 30$ $pltfm_i := \frac{i}{10} \quad oemDataMat\%_i := \frac{.48}{pltfm_i} \cdot 100 \quad amsDataMat\%_i := \frac{.24}{pltfm_i} \cdot 100$ $oem\% = 50$ $ProdDataMat\%_i := \left[ oem\% \cdot \left( \frac{.48}{pltfm_i} \right) \right] + \left[ (100 - oem\%) \cdot \left( \frac{.24}{pltfm_i} \right) \right]$ FIG. 34 is a graph illustrating the above.

1.7 Phase: Production, Category: Production, Mat% Calculation

| Type | Mode# | Calculation |
|---|---|---|
| Electronic & electro/mechanical | 1 | See 2.3.1 below |
| Mechanical | 2 | #1 |
| Purchased | 3 | 0 |
| Furnished | 4 | 0 |
| Integration & Test | 5 | See 2.3.2 below |
| Modified | 6 | #1 |

| | | |
|---|---|---|
| Calibration | 7 | #1; (mcplxe, mcplxs values from current trial) |
| Thruput | 8 | 0 |
| Multiple lot | 9 | #1; (weights and complexities from parent) |
| Detailed Purchased | 33 | #1 |
| Design Integration | 51 | 0 |
| HW/SW Integration & Test | 52 | 0 |
| H Module | HMOD | See 2.3.3 below |

1.7.1 Detail of production production material% (ProdMat%) calculation for modes 1, 2, 6, 7, 9, & 33

1. Calculate ProdElecAMSMat%
2. Calculate ProdElecOEMMat%
3. Calculate ProdElecMat% by combining #1 & #2, using OEM%
4. Calculate $OPC_E$ & $MatOPC_E$ using ProdElecMat%
5. Calculate ProdStructAMSMat%
6. Calculate ProdStructOEMMat%
7. Calculate ProdStructMat% by combining #5 & #6, using OEM%
8. Calculate $OPC_S$ & $MatOPC_S$ using ProdStructMat%
9. Calculate ProdMat% from ratio $(MatOPC_E + MatOPC_S)/(OPC_E + OPC_S)$ 1.7.1.1 Calculate ProdElecAMSMat%

Figure 35:
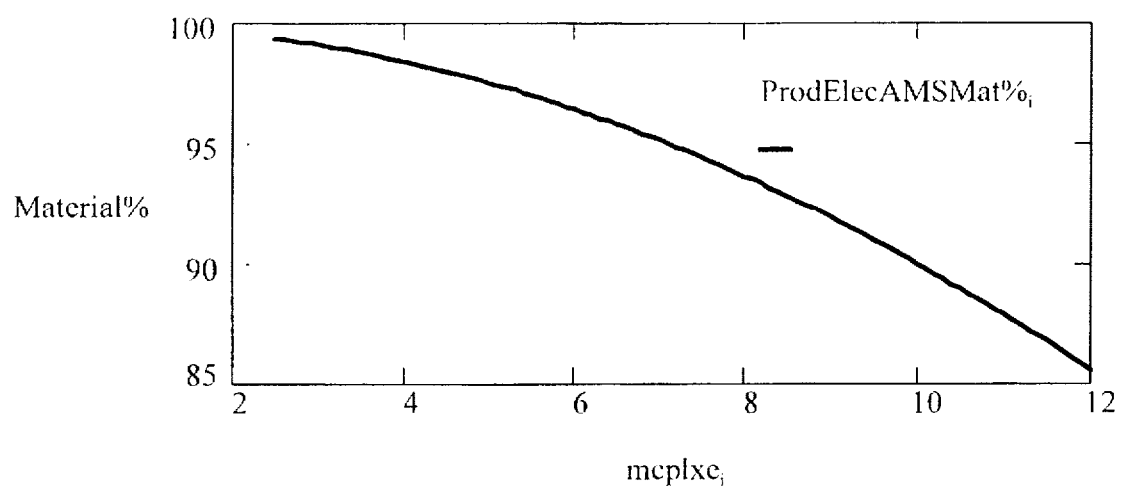
FIG. 35 is a Plot of ProdElecAMSMat% v. MEPLXE.

$i = 25 \ldots 120$ $\quad mcplxe_i = \frac{i}{10} \quad$ $ProdElecAMSMat\%_i = [1 - [.001 \cdot (mcplxe_i)^2]] \cdot 100$ FIG. 35 is a graph illustrating the above.

1.7.1.2 Calculate ProdElecOEMMat%

1. Calculate a baseline material% as a function of pltfm
2. Calculate a baseline value for MCPLXE as a function of pltfm
3. Calculate a baseline value for RATE as a function of pltfm
4. Calculate a baseline value for WE as a function of pltfm
5. Calculate a baseline value for QTY as a function of pltfm
6. Calculate an adjustment to the baseline material% as a function of MCPLXE
7. Calculate an adjustment to the baseline material% as a function of RATE
8. Calculate an adjustment to the baseline material% as a function of WE
9. Calculate an adjustment to the baseline material% as a function of QTY
10. Apply adjustments to baseline material%.

1.7.1.2.1 Calculate a baseline material% (electronics) as a function of pltfm

The following equations establish the basic percentage of material in the prototype as a function of PLTFM.

$i = 1 \ldots 250$ $\quad MCPLXE_i := 5.82 \quad E\_RATE_i := 87 \quad WE_i := 11 \quad QTY_i := i \quad pltfm_i := \frac{i}{100}$ $low\_\%\_mat_i = (110 - 25 \cdot pltfm_i)$      if PLTFM <= 1.0
$1l\_med\_\%\_mat_i := 147.5 - 62.5 \cdot pltfm_i$      if PLTFM <= 1.4
$l\_med\_\%\_mat_i = (130 - 50 \cdot pltfm_i)$      if 1.4 < PLTFM <= 1.86
$h\_med\_\%\_mat_i = (302.05 - 142.5 \cdot pltfm_i)$      if 1.86 < PLTFM <= 1.94
$hi\_\%\_mat_i = (45 - 10 \cdot pltfm_i)$      if 1.94 < PLTFM
$\%\_mat_i = if(pltfm_i > 1.0, 1l\_med\_\%\_mat_i, low\_\%\_mat_i)$
$\%\_mat_i = if(pltfm_i > 1.4, l\_med\_\%\_mat_i, \%\_mat_i)$
$\%\_mat_i = if(pltfm_i > 1.86, h\_med\_\%\_mat_i, \%\_mat_i)$      The equations below establish high & low
$\%\_mat_i = if(pltfm_i > 1.94, hi\_\%\_mat_i, \%\_mat_i)$      limits of % material adjustment for each of
$\%\_mat_i = if(\%\_mat_i > 95.95, \%\_mat_i)$      the controlling parameters.

Figure 36:
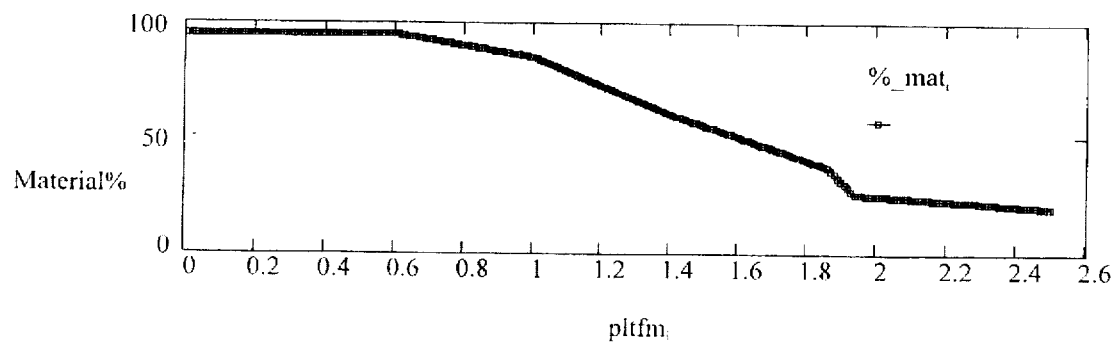
FIG. 36 is a Plot of Mat%(Elect) v. PLTFM.

$\%\_mat_i = if(\%\_mat_i < 17.17, \%\_mat_i)$      $low\_limit_i = \frac{10 - \%\_mat_i}{4}$    $hi\_limit_i = \frac{98 - \%\_mat_i}{4}$ FIG. 36 is a graph illustrating the above.

1.7.1.2.2 Calculate a baseline MCPLXE as a function of pltfm

Figure 37:
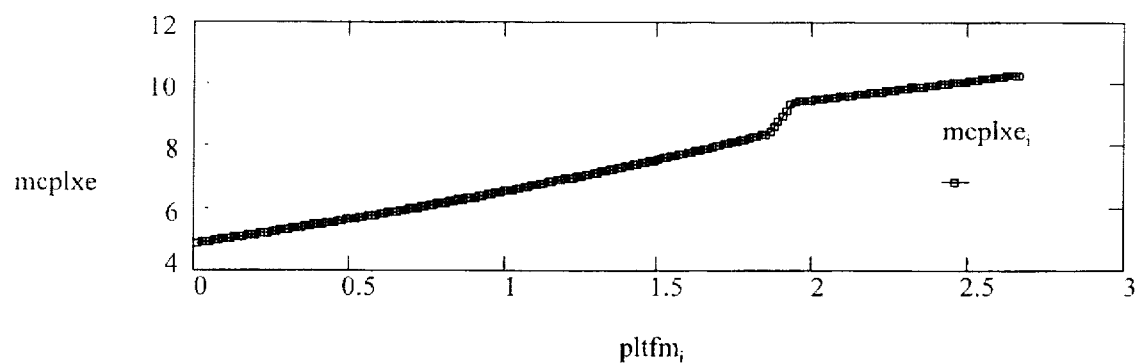
FIG. 37 is a Plot of MCPLXE v. PLTFM.

The following equations establish the basic values of MCPLXE in the prototype as a function of PLTFM.
This reference is based on an approximate average MCPLXE when PLTFM = 1.0
$l\_mcplxe_i = ref\_mcplxe \exp(-.288081 - .288081 \cdot pltfm_i)$      If PLTFM < 1.86
$m\_mcplxe_i = ref\_mcplxe \exp(-2.4604242 - 1.45600753 \cdot pltfm_i)$      If 1.86 <= PLTFM < 1.94
$h\_mcplxe_i = ref\_mcplxe \exp(.1185221 - .126647 \cdot pltfm_i)$      If PLTFM > 1.94
$mcplxe_i = if(pltfm_i < 1.86, l\_mcplxe_i, mcplxe_i)$
$mcplxe_i = if(pltfm_i \geq 1.94, mcplxe_i, h\_mcplxe_i)$ FIG. 37 is a graph illustrating the above.

Figure 38:
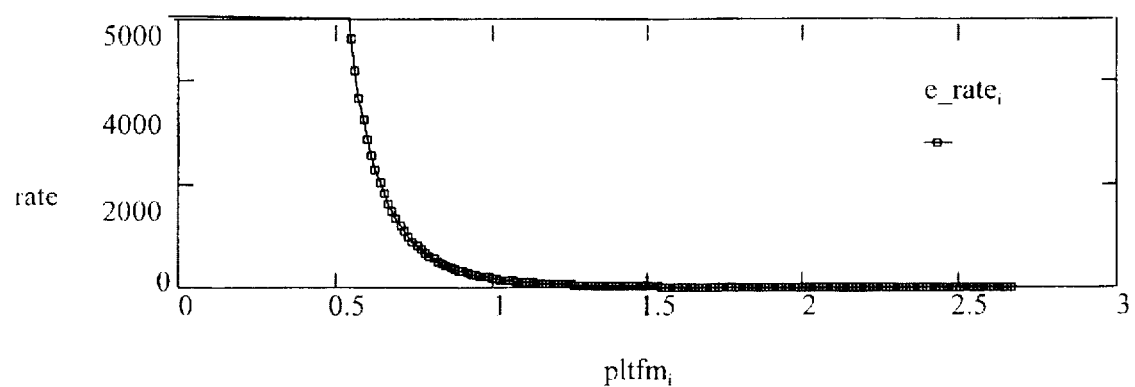
FIG. 38 is a Plot of ERate v. PLTFM.

1.7.1.2.3 Calculate a baseline value for RATE (electronics) as a function of pltfm The following equation establishes the basic values of Elect Rate of the prototype as a function of PLTFM.
$e\_rate_i := 177.94 \cdot pltfm_i^{-5.43531}$      e_rate is the monthly production of prototype electronics FIG. 38 is a graph illustrating the above.

1.7.1.2.4 Calculate a baseline value for WE as a function of pltfm

Figure 39:
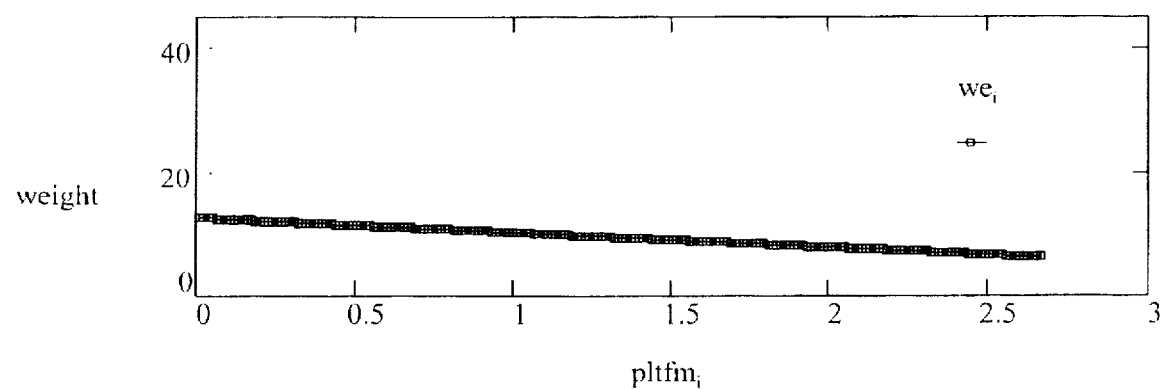
FIG. 39 is a Plot of WE v. P:LTFM.

The following equation establishes the basic values of Elect Weight in the prototype as a function of PLTFM.
$we_i := 12.4210526 - 2.36842 \cdot pltfm_i$ FIG. 39 is a graph illustrating the above.

1.7.1.2.5 Calculate a baseline value for QTY (electronics) as a function of pltfm The following equation establishes the basic values of Quantity as a function of PLTFM.

Figure 40:
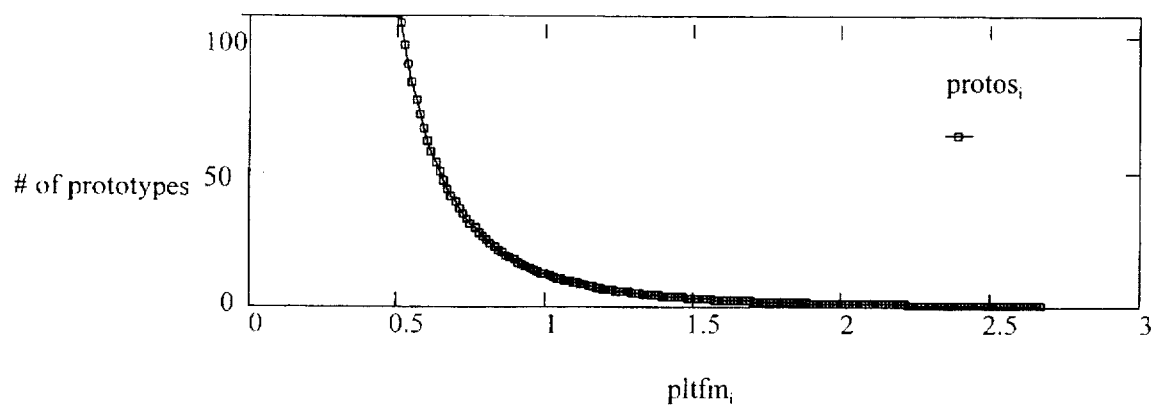
FIG. 40 is a Plot of QTY v. PLTFM.

-continued low_qty$_i$ = 3088.57(pltfm$_i$)$^{-4.79292}$   If PLTFM <= 1.1
med_qty$_i$ = 3123.11(pltfm$_i$)$^{-4.902797}$   If 1.1 < PLTFM <= 1.86
m_hi_qty$_i$ = 2277.036− pltfm$_i$·1144.1   If 1.86 < PLTFM <= 1.94
hi_qty$_i$ = 1194.59(pltfm$_i$)$^{-4.57845}$   If 1.94 < PLTFM
qty$_i$ = if(pltfm$_i$>1.1,med_qty$_i$,low_qty$_i$)
qty$_i$ = if(pltfm$_i$>1.86,m_hi_qty$_i$,qty$_i$)
qty$_i$ = if(pltfm$_i$>1.94,hi_qty$_i$,qty$_i$)
FIG. 40 is a graph illustrating the above.

1.7.1.2.6 Calculate adjustment to the baseline material% (electronics) as a function of MCPLXE The following equations adjust the percentage of material in the electronics portion of the prod prod cost element Below are high & low calibration values
hi_mxe_cal$_i$ := mcplxe$_i$·1.15
low_mxe_cal$_i$ = mcplxe$_i$·.85

Below are high & low calibration points
hi_%_mxe$_i$ = if(pltfm$_i$<1.94,−5,−3)
lo_%_mxe$_i$ = if(pltfm$_i$<1.1,1.5,5)

$$b\_mxe_i := \frac{\ln\left(\frac{\%\_mat_i}{\%\_mat_i - hi\_\%\_mxe_i}\right)}{\ln(mcplxe_i) - \ln(hi\_mxe\_cal_i)}$$

Figure 41:
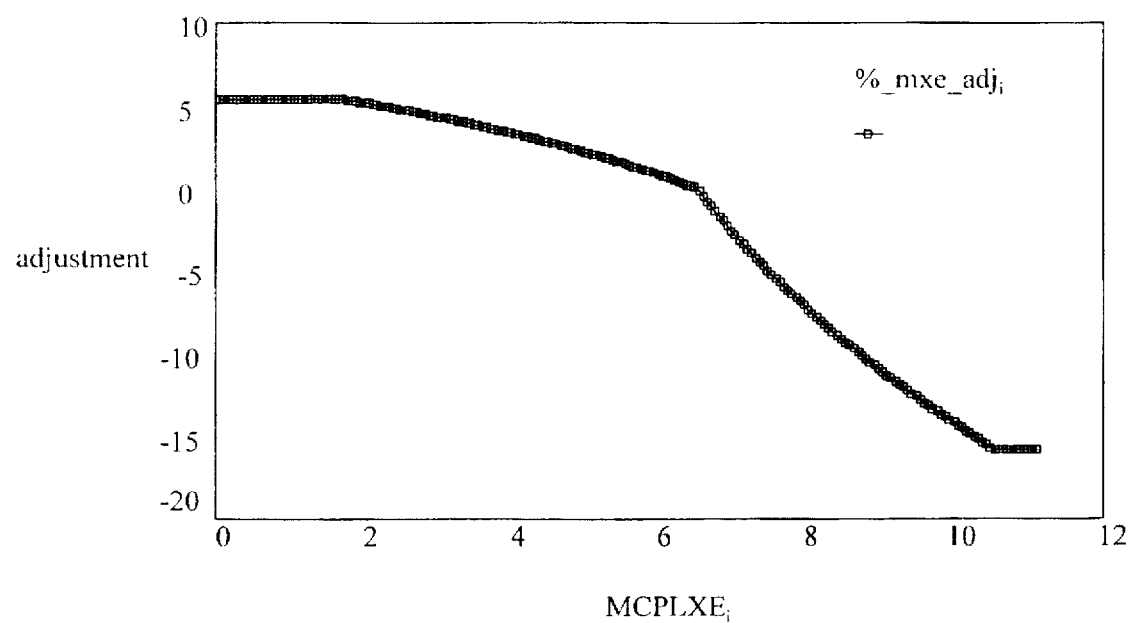
FIG. 41 is a Plot of Mat%Adj v. MCPLXE.

The parameters at left and below force the equations through the calibration points at the calibration values.

$$low\_mxe_i := \frac{lo\_\%\_mxe_i}{\left[\left[\frac{(lmcplxe_i - low\_mxe\_cal_i + mcplxe_i)^{b\_mxe_i}}{(mcplxe_i)^{b\_mxe_i}} \cdot \%\_mat_i\right] - \%\_mat_i\right]}$$

$$hi\_\%\_mxe\_adj_i := \frac{\%\_mat_i \cdot (IMCPLXE_i - mcplxe_i| + mcplxe_i)^{b\_mxe_i}}{(mcplxe_i)^{b\_mxe_i}} - \%\_mat_i$$

low_%_mxe_adj$_i$ = low_mxe$_i$·hi_%_mxe_adj$_i$
%_mxe_adj$_i$ := if(MCPLXE$_i$<mcplxe$_i$,low_%_mxe_adj$_i$,hi_%_mxe_adj$_i$)
%_mxe_adj$_i$ = if(%_mxe_adj$_i$>hi_limit$_i$,hi_limit$_i$,%_mxe_adj$_i$)
%_mxe_adj$_i$ = if(%_mxe_adj$_i$<low_limit$_i$,low_limit$_i$,%_mxe_adj$_i$)
FIG. 41 is a graph illustrating the above.

1.7.1.2.7 Calculate adjustment to the baseline material% (electronics) as a function of RATE The following equations adjust the % of material in the electronics portion of a production unit as a function of E_RATE Below are high & low calibration values
hi_e_rate_cal$_i$ = e_rate$_i$·2
low_e_rate_cal$_i$ = e_rate$_i$·2

Below are high calibration points
ll_hi_%_e_rate$_i$ = 4.45536(pltfm$_i$)$^{-2.0594}$
l_hi_%_e_rate$_i$ = 3.3575(pltfm$_i$)$^{-2.166}$
m_hi_%_e_rate$_i$ = 4.9185− 2.046pltfm$_i$
h_hi_%_e_rate$_i$ = 2.97713(pltfm$_i$)$^{-2.505}$
hi_%_e_rate$_i$ = if(pltfm$_i$≦1.1,ll_hi_%_e_rate$_i$,l_hi_%_e_rate$_i$)
hi_%_e_rate$_i$ = if(pltfm$_i$≦1.55,hi_%_e_rate$_i$,m_hi_%_e_rate$_i$)
hi_%_e_rate$_i$ = if(pltfm$_i$≦1.9,hi_%_e_rate$_i$,h_hi_%_e_rate$_i$)

Equations below provide CAPS on calculations
ll_hi_%_e_rate$_i$ = if(ll_hi_%_e_rate$_i$>4.4,4.4,ll_hi_%_e_rate$_i$)
l_hi_%_e_rate$_i$ = if(l_hi_%_e_rate$_i$>3.3,3.3,l_hi_%_e_rate$_i$)
m_hi_%_e_rate$_i$ = if(m_hi_%_e_rate$_i$>4.4,4.4,m_hi_%_e_rate$_i$)
h_hi_%_e_rate$_i$ = if(h_hi_%_e_rate$_i$>1.4,1.4,h_hi_%_e_rate$_i$)

Below are low calibration points
ll_lo_%_e_rate$_i$ =−13.29577exp·1.5186pltfm$_i$)
l_lo_%_e_rate$_i$ =−2.92144(pltfm$_i$)$^{-2.1017}$
m_lo_%_e_rate$_i$ =−4.225− 1.763pltfm$_i$
h_lo_%_e_rate$_i$ =−2.8025(pltfm$_i$)$^{-2.5466}$
lo_%_e_rate$_i$ = if(pltfm$_i$≦.9,ll_lo_%_e_rate$_i$,l_lo_%_e_rate$_i$)
lo_%_e_rate$_i$ = if(pltfm$_i$≦1.55,lo_%_e_rate$_i$,m_lo_%_e_rate$_i$)
lo_%_e_rate$_i$ = if(pltfm$_i$≦1.9,lo_%_e_rate$_i$,h_lo_%_e_rate$_i$)

Equations below provide CAPS on calculations
ll_lo_%_e_rate$_i$ := if(ll_lo_%_e_rate$_i$<−3.8,−3.8,ll_lo_%_e_rate$_i$)
l_lo_%_e_rate$_i$ = if(l_lo_%_e_rate$_i$<−2.9,−2.9,l_lo_%_e_rate$_i$)
m_lo_%_e_rate$_i$ = if(m_lo_%_e_rate$_i$<−3.8,−3.8,m_lo_%_e_rate$_i$)
h_lo_%_e_rate$_i$ := if(h_lo_%_e_rate$_i$<−1.3,−1.3,h_lo_%_e_rate$_i$)

$$b\_e\_rate_i := \frac{\ln\left(\frac{\%\_mat_i - hi\_\%\_e\_rate_i}{\%\_mat_i}\right)}{\ln(hi\_e\_rate\_cal_i) - \ln(e\_rate_i)}$$

Figure 42:
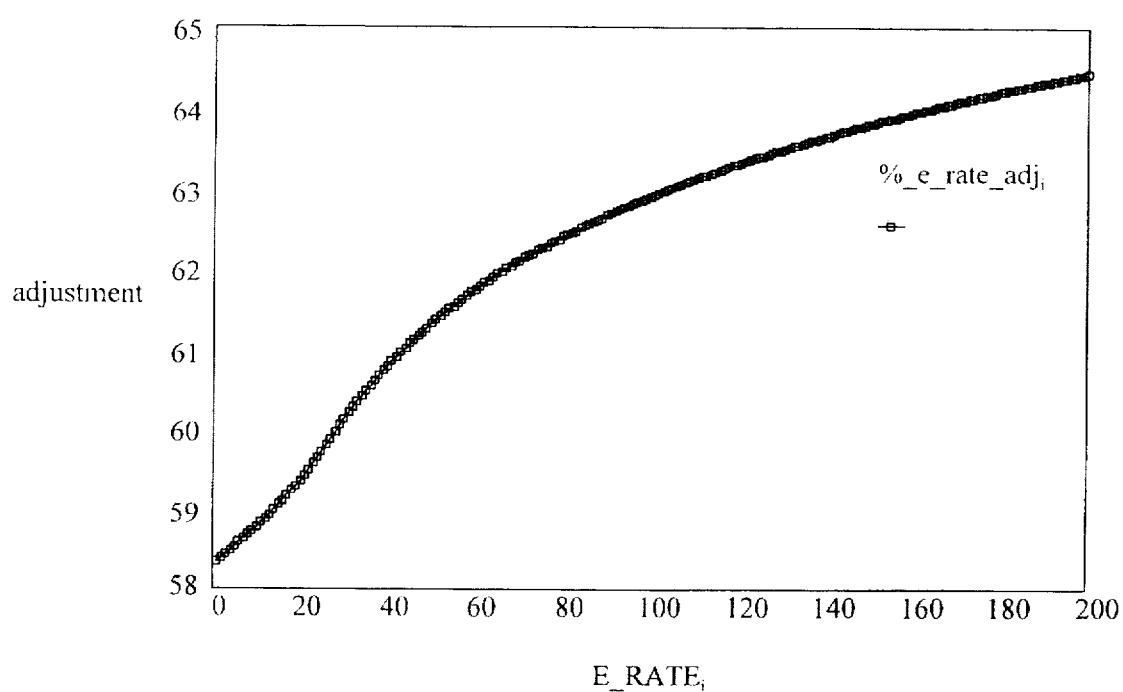
FIG. 42 is a Plot of Mat% v. RATE.

The parameters at left and below force the equations through the calibration points at the calibration values.

$$low\_e\_rate_i := \frac{lo\_\%\_e\_rate}{\left[\%\_mat_i - \left[\%\_mat_i \cdot \frac{(le\_rate_i - low\_e\_rate\_cal_i + e\_rate_i)^{b\_e\_rate_i}}{(e\_rate_i)^{b\_e\_rate_i}}\right]\right]}$$

$$hi\_\%\_e\_rate\_adj_i := \%\_mat_i - \frac{\%\_mat_i \cdot (IE\_RATE_i - e\_rate_i| - e\_rate_i)^{b\_e\_rate_i}}{(e\_rate_i)^{b\_e\_rate_i}}$$

low_%_e_rate_adj$_i$ = low_e_rate$_i$·hi_%_e_rate_adj$_i$
%_e_rate_adj$_i$ = if(E_RATE$_i$<e_rate$_i$,low_%_e_rate_adj$_i$,hi_%_e_rate_adj$_i$)
%_e_rate_adj$_i$ = if(%_e_rate_adj$_i$>hi_limit$_i$,hi_limit$_i$,%_e_rate_adj$_i$)
%_e_rate_adj$_i$ = if(%_e_rate_adj$_i$<low_limit$_i$,low_limit$_i$,%_e_rate_adj$_i$)−%_mat$_i$
FIG. 42 is a graph illustrating the above.

-continued

Labor & Material Model: Process Specification 1.7.1.2.8 Calculate adjustment to the baseline material% (electronics) as a function of WE The following equations adjust the percentage of material in the electronic portion of a prototype as a function of WE Below are high & low calibration values
$hi\_we\_cal_i = we_i \cdot 2$
$low\_we\_cal_i := we_i \cdot .5$ Below are high & low calibration points
$hi\_\%\_we_i := 1.5 - 1.62^{pltfm_i}$
$lo\_\%\_we_i = -6.67 \& .6174^{pltfm_i}$ $$b\_we_i := \frac{\ln\left(\frac{\%\_mat_i - hi\_\%\_we_i}{\%\_mat_i}\right)}{\ln(hi\_we\_cal_i) - \ln(we_i)}$$

The parameters at left and below force the equations through the calibration points at the calibration values.

$$low\_we_i := \frac{lo\_\%\_we_i}{\left[\%\_mat_i - \left[\%\_mat_i \cdot \frac{(|we_i - low\_we\_cal_i| + we_i)^{b\_we_i}}{(we_i)^{b\_we_i}}\right]\right]}$$

$$hi\_\%\_we\_adj_i := \%\_mat_i - \frac{\%\_mat_i \cdot (|WE_i - we_i| + we_i)^{b\_we_i}}{(we_i)^{b\_we_i}}$$

Figure 43:
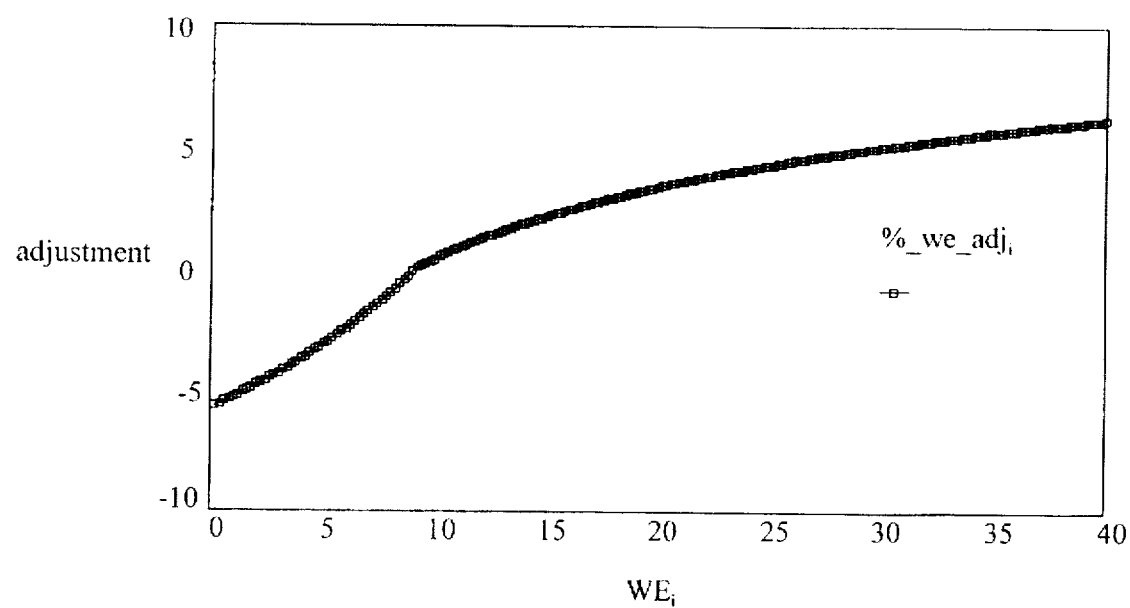
FIG. 43 is a Plot of Mat% v. WE.

$low\_\%\_we\_adj_i = low\_we_i \cdot hi\_\%\_we\_adj_i$
$\%\_we\_adj_i = if(WE_i < we_i, low\_\%\_we\_adj_i, hi\_\%\_we\_adj_i)$
$\%\_we\_adj_i := if(\%\_we\_adj_i > hi\_limit_i, hi\_limit_i, \%\_we\_adj_i)$
$\%\_mxs\_adj_i = if(\%\_we\_adj_i < low\_limit_i, low\_limit_i, \%\_we\_adj_i)$
FIG. 43 is a graph illustrating the above.

1.7.1.2.9 Calculate adjustment to the baseline material% (electronics) as a function of QTY The following equations adjust the percentage of material in the electronics portion of a production unit as a function of QTY.

Below are high & low calibration values
$hi\_qty\_cal_i = qty_i \cdot 2$
$low\_qty\_cal_i := qty_i \cdot .5$ Below are high & low calibration points
$hi\_\%\_qty_i := 4.407 - .88235 \cdot pltfm_i$
$lo\_\%\_qty_i = -4.4412 - 1.17647 \cdot pltfm_i$ $$b\_qty_i := \frac{\ln\left(\frac{\%\_mat_i - hi\_\%\_qty_i}{\%\_mat_i}\right)}{\ln(hi\_qty\_cal_i) - \ln(qty_i)}$$

The parameters at left and below force the equations through the calibration points at the calibration values.

$$low\_qty_i := \frac{lo\_\%\_qty_i}{\left[\%\_mat_i - \left[\%\_mat_i \cdot \frac{(|qty_i - low\_qty\_cal_i| - qty_i)^{b\_qty_i}}{(qty_i)^{b\_qty_i}}\right]\right]}$$

$$hi\_\%\_qty\_adj_i := \%\_mat_i - \frac{\%\_mat_i \cdot (|QTY_i - qty_i| + qty_i)^{b\_qty_i}}{(qty_i)^{b\_qty_i}}$$

Figure 44:
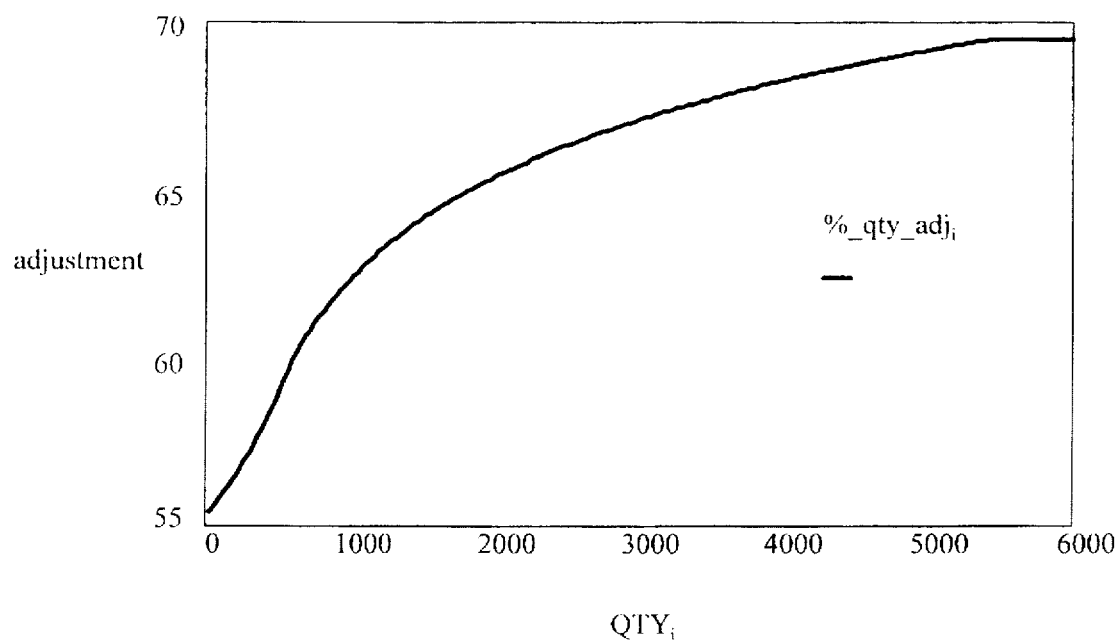
FIG. 44 is a Plot of %QTYAdj v. QTY.

$low\_\%\_qty\_adj_i = low\_qty_i \cdot hi\_\%\_qty\_adj_i$
$\%\_qty\_adj_i = if(QTY_i < qty_i, low\_\%\_qty\_adj_i, hi\_\%\_qty\_adj_i)$
$\%\_qty\_adj_i := if(\%\_qty\_adj_i > hi\_limit_i, hi\_limit_i, \%\_qty\_adj_i)$
$\%\_qty\_adj_i = if(\%\_qty\_adj_i < low\_limit_i, low\_limit_i, \%\_qty\_adj_i) - \%\_mat_i$
FIG. 44 is a graph illustrating the above.

1.7.1.2.10 Apply adjustments to baseline material% (electronics).

protoElecOEMMat% = basicMat% + mcplxeAdj + rateAdj + weAdj + qtyAdj 1.7.1.3 Calculate ProdElecMat%, using OEM% from LM Sheet $$\text{ProdElecMat\%} = \left(\text{ProdElecOEMMat\%} * \frac{\text{OEM\%}}{100}\right) + \left(\left(1 - \frac{\text{OEM\%}}{100}\right) * \text{ProdElecAMSMat\%}\right)$$

1.7.1.4 Calculate $OPC_B$ & $MatOPC_B$ using ProdElecMat%

$OPC_B = f(we, mcplxe)$
$MatOPC_B = \text{ProdElecMat\%} * OPC_B$ 1.7.1.5 Calculate ProdStructAMSmat%

Figure 45:
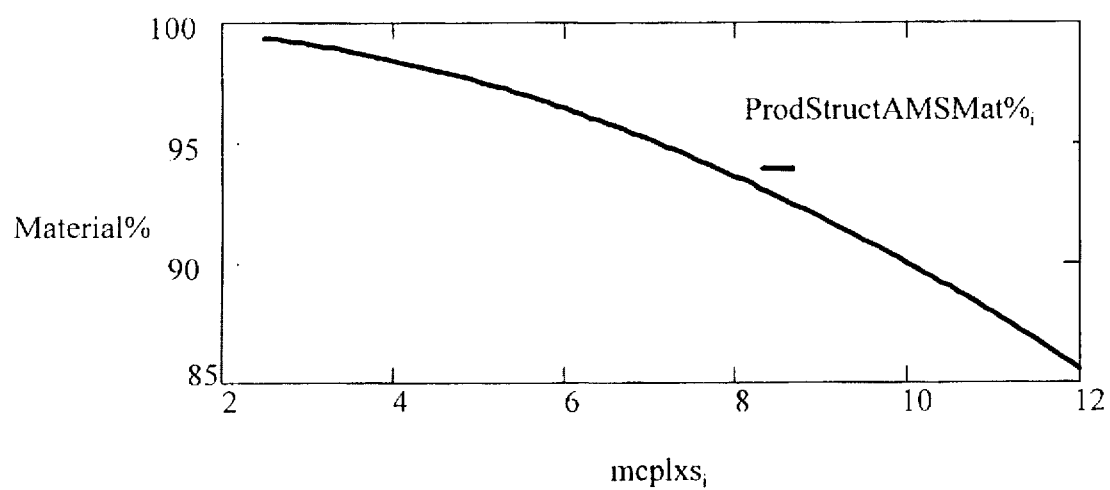
FIG. 45 is a Plot of ProdStructAMSMat% v. MEPLXS.

$i = 25 \ldots 120$ $\quad mcplxs_i := \frac{i}{10}$ $\quad \text{ProdStructAMSMat\%}_i := [1 - [.001 \cdot (mcplxs_i)^2]] \cdot 100$ FIG. 45 is a graph illustrating the above.

1.7.1.6 Calculate ProdStructOEMmat%

1. Calculate a baseline material% as a function of pltfm
2. Calculate a baseline value for MCPLXS as a function of pltfm
3. Calculate a baseline value for RATE as a function of pltfm
4. Calculate a baseline value for WS as a function of pltfm
5. Calculate a baseline value for QTY as a function of pltfm 6. Calculate an adjustment to the baseline material% as a function of MCPLXS
7. Calculate an adjustment to the baseline material% as a function of RATE
8. Calculate an adjustment to the baseline material% as a function of WS
9. Calculate an adjustment to the baseline material% as a function of QTY
10. Apply adjustments to baseline material%.
1.7.1.6.1 Calculate a baseline material% (structure) as a function of pltfm The following equations establish the basic percentage of material in the prototype as a function of PLTFM.
i = 1 ... 250

$MCPLXE_i := 5.82 \quad E\_RATE_i := 87 \quad WE_i := 11 \quad QTY_i := i \quad pltfm_i := \frac{i}{100}$ $low\_\%\_mat_i = (110 - 25 \cdot pltfm_i)$      if PLTFM <= 1.0
$ll\_med\_\%\_mat_i := 147.5 - 62.5 pltfm_i$      if PLTFM <= 1.4
$l\_med\_\%\_mat_i = (130 - 50 \cdot pltfm_i)$      if 1.4 < PLTFM <= 1.86
$h\_med\_\%\_mat_i = (302.05 - 142.5 pltfm_i)$      if 1.86 < PLTFM <= 1.94
$hi\_\%\_mat_i = (45 - 10 \cdot pltfm_i)$      if 1.94 < PLTFM
$\%\_mat_i = if(pltfm_i > 1.0, ll\_med\_\%\_mat_i, low\_\%\_mat_i)$
$\%\_mat_i = if(pltfm_i > 1.4, l\_med\_\%\_mat_i, \%\_mat_i)$
$\%\_mat_i = if(pltfm_i > 1.86, h\_med\_\%\_mat_i, \%\_mat_i)$      The equations below establish high & low
$\%\_mat_i = if(pltfm_i > 1.94, hi\_\%\_mat_i, \%\_mat_i)$      limits of % material adjustment for each of
$\%\_mat_i = if(\%\_mat_i > 95, 95, \%\_mat_i)$      the controlling parameters.

Figure 46:
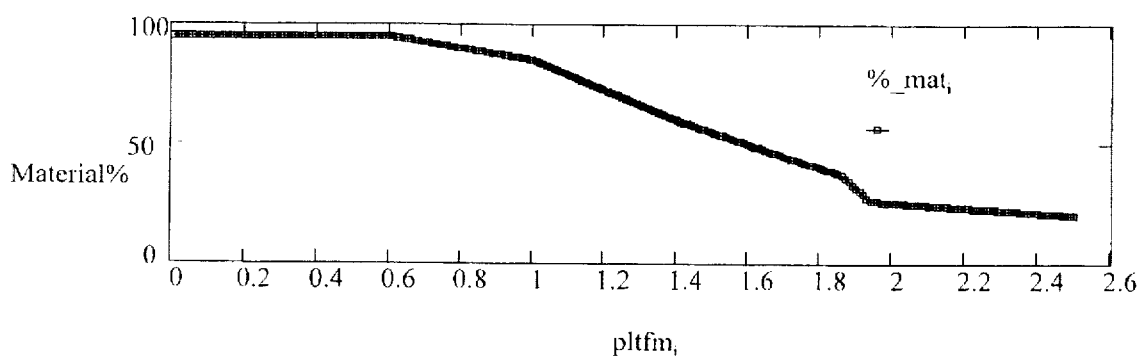
FIG. 46 is a Plot of Mat% v. PLTFM.
Figure 47:
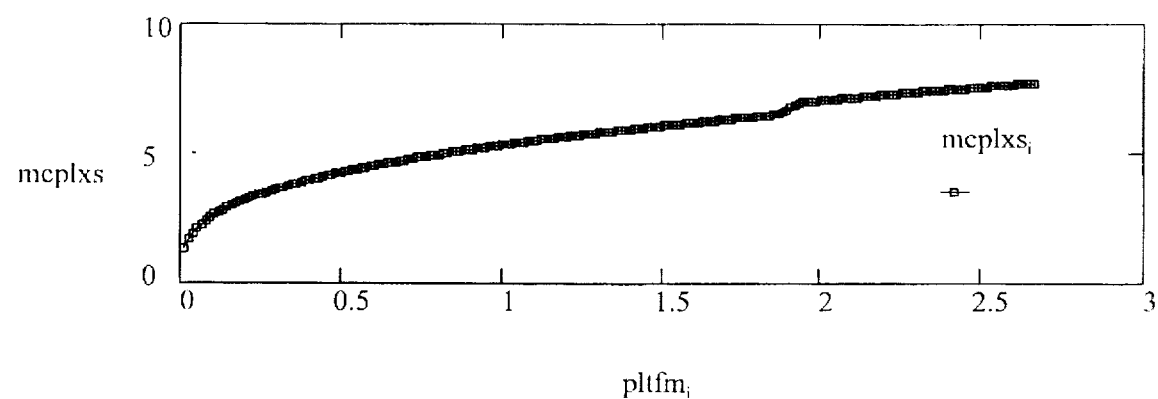
FIG. 47 is a Plot of MCPLXS v. PLTFM.
Figure 48:
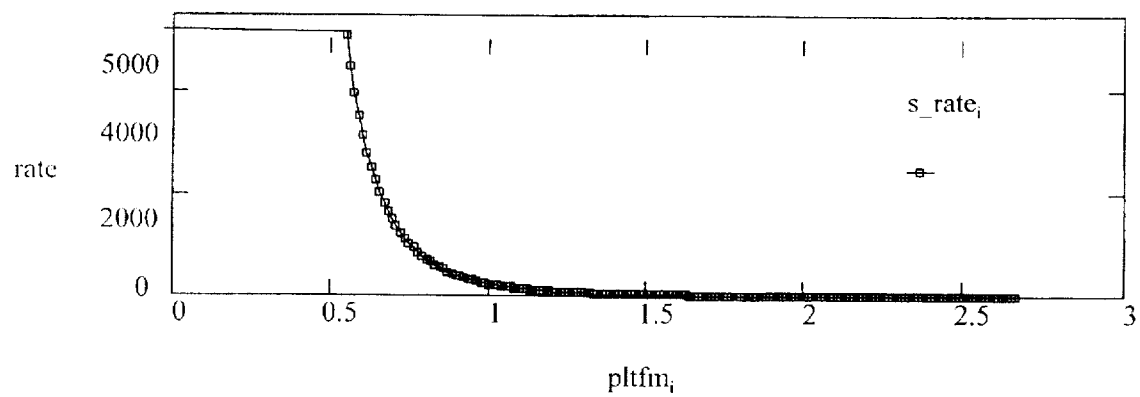
FIG. 48 is a Plot of SRate v. PLTFM.
Figure 49:
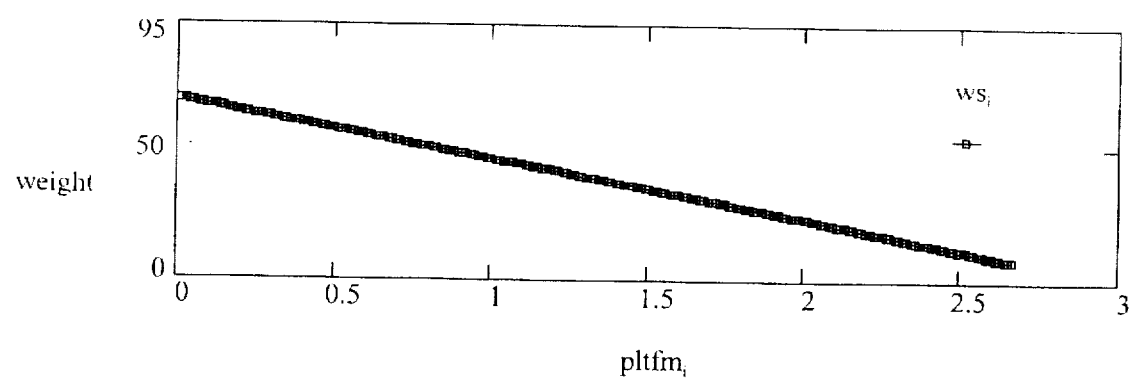
FIG. 49 is a Plot of WS v. PLTFM.
Figure 50:
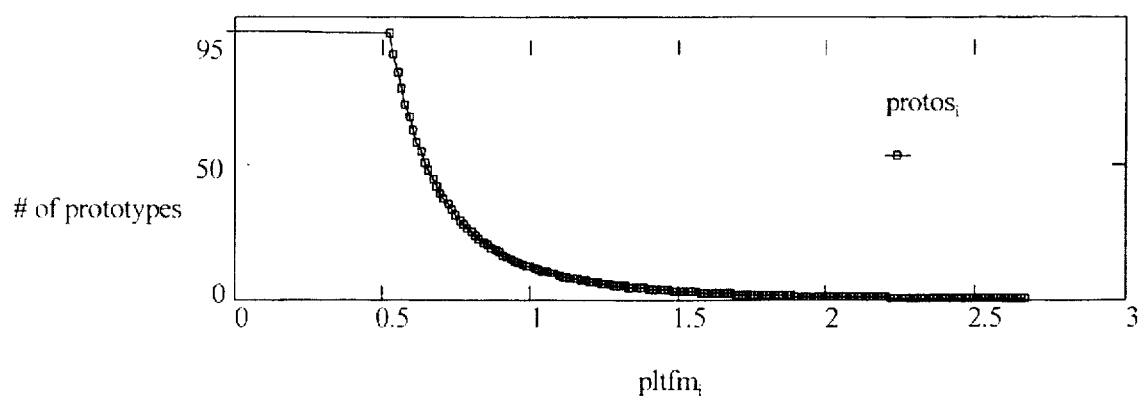
FIG. 50 is a Plot of QTY v. PLTFM.

$\%\_mat_i = if(\%\_mat_i < 17, 17, \%\_mat_i)$ $low\_limit_i := \frac{10 - \%\_mat_i}{4} \quad hi\_limit_i := \frac{98 - \%\_mat_i}{4}$ FIG. 46 is a graph illustrating the above.
1.7.1.6.2 Calculate a baseline MCPLXS as a function of pltfm The following equations establish the basic values of MCPLXS in the prototype as a function of PLTFM.
$ref\_mcplxs = 5.33$      This reference is based on an approximate average MCPLXS when PLTFM = 1.0
$l\_mcplxs_i = ref\_mcplxs \cdot (pltfm_i)^{.32}$      If PLTFM < 1.86
$m\_mcplxs_i = (.75 \cdot pltfm_i - .395) \cdot (pltfm_i)^{.32} \cdot ref\_mcplxs$      If 1.86 < PLTFM <= 1.94
$h\_mcplxs_i = 1.06 \cdot ref\_mcplxs \cdot (pltfm_i)^{.32}$      If PLTFM > 1.94
$mcplxs_i := if(pltfm_i < 1.86, l\_mcplxs_i, m\_mcpls_i)$
$mcplxs_i := if(pltfm_i \leq 1.94, mcplxs_i, h\_mcplxs_i)$
FIG. 47 is a graph illustrating the above.
1.7.1.6.3 Calculate a baseline value for RATE (structure) as a function of pltfm The following equation establishes the basic values of Structure Rate of the production as a function of PLTFM
$s\_rate_i = 222.59(pltfm_i)^{-5.17361}$      s_rate is the monthly production of production structure
FIG. 48 is a graph illustrating the above.
1.7.1.6.4 Calculate a baseline value for WS as a function of pltfm The following equation establishes the basic values of Structure Weight in the production as a function of PLTFM.
$ws_i = 67.01 - 22.26 pltfm_i$
FIG. 49 is a graph illustrating the above.
1.7.1.6.5 Calculate a baseline value for QTY (structure) as a function of pltfm The following equations establish the basic values of Quantity as a function of PLTFM.
$low\_qty_i = 3088.57(pltfm_i)^{-4.79292}$      If PLTFM <= 1.1
$med\_qty_i = 3123.11(pltfm_i)^{-4.902797}$      If 1.1 < PLTFM <= 1.86
$m\_hi\_qty_i = 2277.036 - pltfm_i \cdot 1144.1$      If 1.86 < PLTFM <= 1.94
$hi\_qty_i = 1194.59(pltfm_i)^{-4.57845}$      If 1.94 < PLTFM
$qty_i = if(pltfm_i > 1.1, med\_qty_i, low\_qty_i)$
$qty_i = if(pltfm_i > 1.86, m\_hi\_qty_i, qty_i)$
$qty_i = if(pltfm_i > 1.94, hi\_qty_i, qty_i)$
FIG. 50 is a graph illustrating the above.
1.7.1.6.6 Calculate adjustment to the baseline material% (structure) as a function of MCPLXS The following equations adjust the percentage of material in the structure portion of production units
Below are high & low      Below are high & low
calibration values      calibration points
$hi\_mxs\_cal_i = mcplxs_i \cdot 1.2$      $hi\_\%\_mxs_i = if(pltfm_i < 1.94, -5, -3)$
$low\_mxs\_cal_i = mcplxs_i \cdot .8$      $lo\_\%\_mxs_i = if(pltfm_i < 1.1, 1.5, 5)$ $b\_mxs_i := \dfrac{\ln\left(\dfrac{\%\_mat_i}{\%\_mat_i - hi\_\%\_mxs_i}\right)}{\ln(mcplxs_i) - \ln(hi\_mxs\_cal_i)}$      The parameters at left and below force the equations through the calibration points at the calibration values.

Figure 51:
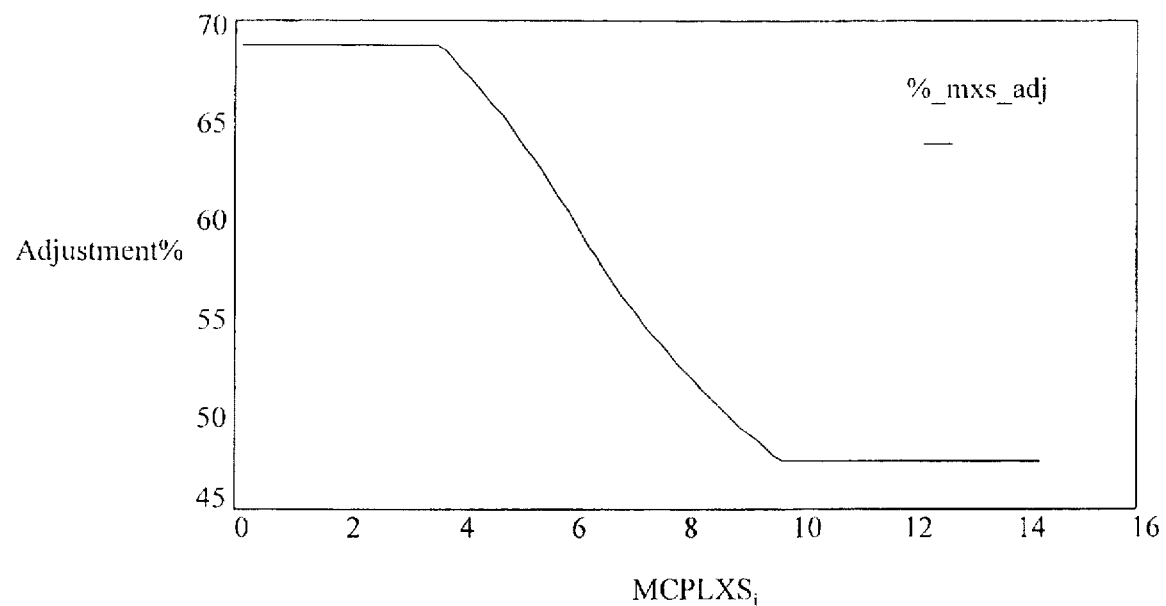
FIG. 51 is a Plot of Mat% v. M:CPLXS.

$low\_mxs_i := \dfrac{lo\_\%\_mxs_i}{\left[\left[\dfrac{(mcplxs_i - low\_mxs\_cal_i + mcplxs_i)^{b\_mxs_i}}{(mcplxs_i)^{b\_mxs_i}} \cdot \%\_mat_i\right] - \%\_mat_i\right]}$ $hi\_\%\_mxs\_adj_i := \dfrac{\%\_mat_i \cdot (MCPLXS_i - mcplxs_i + mcplxs_i)^{b\_mxs_i}}{(mcplxs_i)^{b\_mxs_i}} - \%\_mat_i$ $low\_\%\_mxs\_adj_i = low\_mxs_i \cdot hi\_\%\_mxs\_adj_i$
$\%\_mxs\_adj_i = if(MCPLXS_i < mcplxs_i, low\_\%\_mxs\_adj_i, hi\_\%\_mxs\_adj_i)$ $\%\_mxs\_adj_i = if(\%\_mxs\_adj_i > hi\_limit_i, hi\_limit_i, \%\_mxs\_adj_i)$
$\%\_mxs\_adj_i = if(\%\_mxs\_adj_i < low\_limit_i, low\_limit_i, \%\_mxs\_adj_i) - \%\_mat_i$ FIG. 51 is a graph illustrating the above.

1.7.1.6.7 Calculate adjustment to the baseline material% (structure) as a function of RATE The following equations adjust the % of material in the structure portion of a production unit as a function of S_RATE high & low calibration values
$hi\_s\_rate\_cal_i = s\_rate_i \cdot 2$
$low\_s\_rate\_cal_i = s\_rate_i \cdot 2$ Below are high calibration points
$1l\_hi\_\%\_s\_rate_i = 4.45536(pltfm_i)^{-2.0594}$
$l\_hi\_\%\_s\_rate_i = 3.358(pltfm_i)^{-2.1197}$
$m\_hi\_\%\_s\_rate_i = 4.7825 - 2 \cdot pltfm_i$
$h\_hi\_\%\_s\_rate_i = 2.9771(pltfm_i)^{-2.505}$
$hi\_\%\_s\_rate_i := if(pltfm_i \leq 1.1, 1l\_hi\_\%\_s\_rate_i, l\_hi\_\%\_s\_rate_i)$
$hi\_\%\_s\_rate_i = if(pltfm_i \leq 1.55, hi\_\%\_s\_rate_i, m\_hi\_\%\_s\_rate_i)$
$hi\_\%\_s\_rate_i = if(pltfm_i \leq 1.9, hi\_\%\_s\_rate_i, h\_hi\_\%\_s\_rate_i)$ Below are low calibration points
$1l\_lo\_\%\_s\_rate_i = -13.2958 exp(-1.5186 pltfm_i)$
$l\_lo\_\%\_s\_rate_i = -2.9667(pltfm_i)^{-2.1579}$
$m\_lo\_\%\_s\_rate_i = -4.6425 - 1.942 pltfm_i$
$h\_lo\_\%\_s\_rate_i = -2.8025(pltfm_i)^{-2.5466}$
$lo\_\%\_s\_rate_i = if(pltfm_i \leq .9, 1l\_lo\_\%\_s\_rate_i, l\_lo\_\%\_s\_rate_i)$
$lo\_\%\_s\_rate_i = if(pltfm_i \leq 1.55, lo\_\%\_s\_rate_i, m\_lo\_\%\_s\_rate_i)$
$lo\_\%\_s\_rate_i = if(pltfm_i \leq 1.9, lo\_\%\_s\_rate_i, h\_lo\_\%\_s\_rate_i)$ Equations below provide CAPS on calculations
$1l\_hi\_\%\_s\_rate_i = if(1l\_hi\_\%\_s\_rate_i > 4.4, 4.4, 1l\_hi\_\%\_s\_rate_i)$
$l\_hi\_\%\_s\_rate_i = if(l\_hi\_\%\_s\_rate_i > 3.3, 3.3, l\_hi\_\%\_s\_rate_i)$
$m\_hi\_\%\_s\_rate_i = if(m\_hi\_\%\_s\_rate_i > 4.3, 4.3, m\_hi\_\%\_s\_rate_i)$
$h\_hi\_\%\_s\_rate_i = if(h\_hi\_\%\_s\_rate_i > 1.4, 1.4, h\_hi\_\%\_s\_rate_i)$ Equations below provide CAPS on calculations
$1l\_lo\_\%\_s\_rate_i := if(1l\_lo\_\%\_s\_rate_i < -3.8, -3.8, 1l\_lo\_\%\_s\_rate_i)$
$l\_lo\_\%\_s\_rate_i = if(l\_lo\_\%\_s\_rate_i < -2.9, -2.9, l\_lo\_\%\_s\_rate_i)$
$m\_lo\_\%\_s\_rate_i = if(m\_lo\_\%\_s\_rate_i < -4.2, -4.2, m\_lo\_\%\_s\_rate_i)$
$h\_lo\_\%\_s\_rate_i := if(h\_lo\_\%\_s\_rate_i < -1.3, -1.3, h\_lo\_\%\_s\_rate_i)$ $$b\_s\_rate_i := \frac{\ln\left(\frac{\%\_mat_i - hi\_\%\_s\_rate_i}{\%\_mat_i}\right)}{\ln(hi\_s\_rate\_cal_i) - \ln(s\_rate_i)}$$

The parameters at left and below force the equations through the calibration points at the calibration values.

$$low\_s\_rate_i := \frac{lo\_\%\_s\_rate}{\left[\%\_mat_i - \left[\%\_mat_i \cdot \frac{(|s\_rate_i - low\_s\_rate\_cal_i| + s\_rate_i)^{b\_s\_rate_i}}{(e\_rate_i)^{b\_s\_rate_i}}\right]\right]}$$

$$hi\_\%\_s\_rate\_adj_i := \%\_mat_i - \frac{\%\_mat_i \cdot (|S\_RATE_i - s\_rate_i| - s\_rate_i)^{b\_s\_rate_i}}{(s\_rate_i)^{b\_s\_rate_i}}$$

Figure 52:
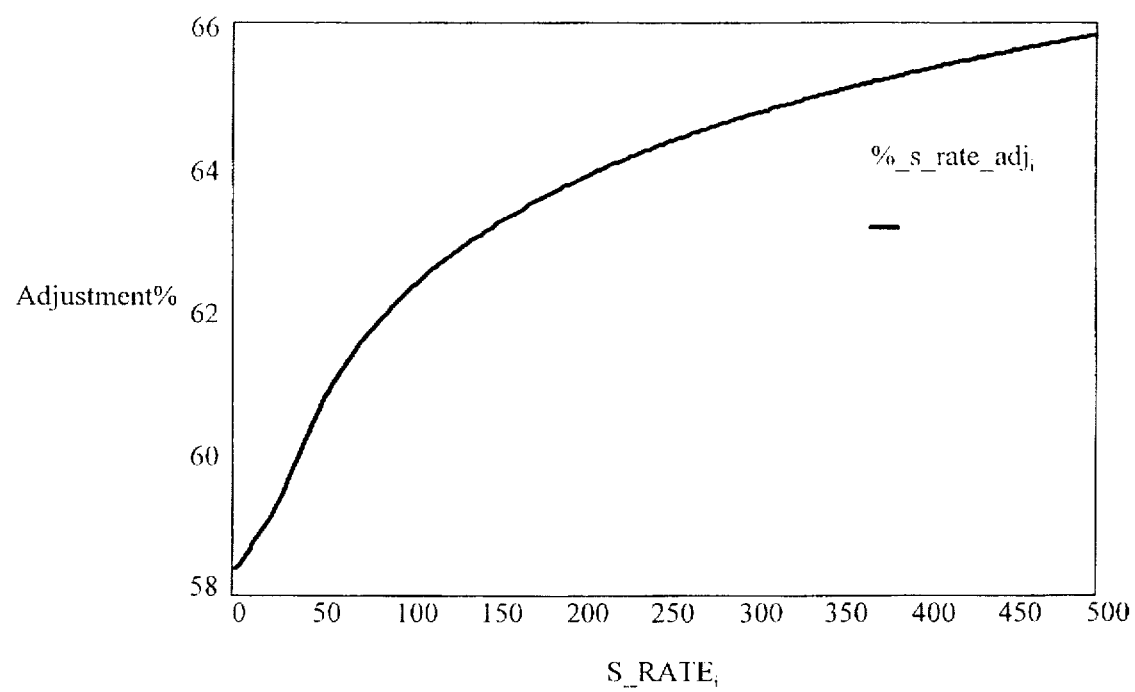
FIG. 52 is a Plot of Mat% v. RATE.

$low\_\%\_s\_rate\_adj_i = low\_s\_rate_i \cdot hi\_\%\_s\_rate\_adj_i$
$\%\_s\_rate\_adj_i := if(S\_RATE_i < s\_rate_i, low\_\%\_s\_rate\_adj_i, hi\_\%\_s\_rate\_adj_i)$
$\%\_s\_rate\_adj_i = if(\%\_s\_rate\_adj_i > hi\_limit_i, hi\_limit_i, \%\_s\_rate\_adj_i)$
$\%\_s\_rate\_adj_i = if(\%\_s\_rate\_adj_i < low\_limit_i, low\_limit_i, \%\_s\_rate\_adj_i) - \%\_mat_i$ FIG. 52 is a graph illustrating the above.

1.7.1.6.8 Calculate adjustment to the baseline material% (structure) as a function of WS The following equations adjust the percentage of material in the structure portion of production units Below are high & low calibration values
$hi\_ws\_cal_i = ws_i \cdot 2$
$low\_ws\_cal_i := ws_i \cdot .333$ Below are high & low calibration points
$hi\_\%\_ws_i = 1.5 - 1.62^{pltfm_i}$
$lo\_\%\_ws_i = -6.67 \& .6174^{pltfm_i}$ $$b\_ws_i := \frac{\ln\left(\frac{\%\_mat_i - hi\_\%\_ws_i}{\%\_mat_i}\right)}{\ln(hi\_ws\_cal_i) - \ln(ws_i)}$$

The parameters at left and below force the equations through the calibration points at the calibration values.

$$low\_ws_i := \frac{lo\_\%\_ws_i}{\left[\%\_mat_i - \left[\%\_mat_i \cdot \frac{(|ws_i - low\_ws\_cal_i| + ws_i)^{b\_ws_i}}{(ws_i)^{b\_ws_i}}\right]\right]}$$

$$hi\_\%\_ws\_adj_i := \%\_mat_i - \frac{\%\_mat_i \cdot (|WS_i - ws_i| + ws_i)^{b\_ws_i}}{(ws_i)^{b\_ws_i}}$$

Figure 53:
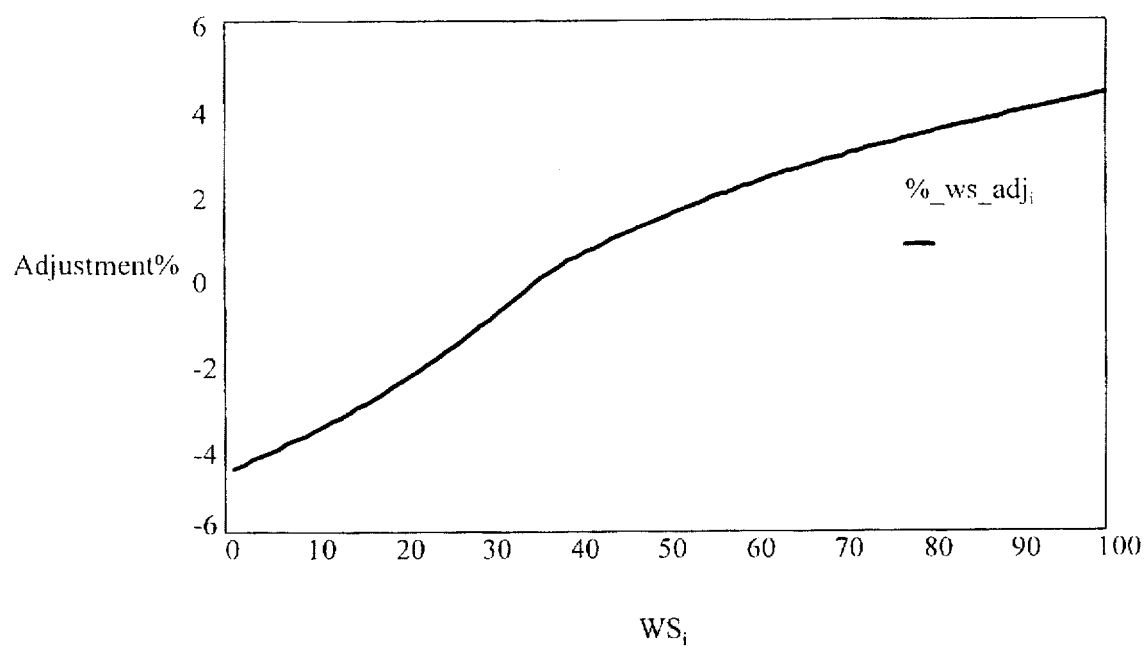
FIG. 53 is a Plot of Mat% v. WS.

$low\_\%\_ws\_adj_i = low\_ws_i \cdot hi\_\%\_ws\_adj_i$
$\%\_ws\_adj_i = if(WS_i < ws_i, low\_\%\_ws\_adj_i, hi\_\%\_ws\_adj_i)$
$\%\_ws\_adj_i = if(\%\_ws\_adj_i > hi\_limit_i, hi\_limit_i, \%\_ws\_adj_i)$
$\%\_ws\_adj_i = if(\%\_ws\_adj_i < low\_limit_i, low\_limit_i, \%\_ws\_adj_i)$ FIG. 53 is a graph illustrating the above.

1.7.1.6.9 Calculate adjustment to the baseline material% (structure) as a function of QTY The following equations adjust the percentage of material in the structure portion of a production unit as a function of QTY.

Below are high & low calibration values
$hi\_qty\_cal_i = qty_i \cdot 2$
$low\_qty\_cal_i = qty_i \cdot .5$ Below are high & low calibration points
$hi\_\%\_qty_i := 4.407 - .88235 \cdot pltfm_i$
$lo\_\%\_qty_i = -4.4412 - 1.17647 \cdot pltfm_i$ $$b\_qty_i := \frac{\ln\left(\frac{\%\_mat_i - hi\_\%\_qty_i}{\%\_mat_i}\right)}{\ln(hi\_qty\_cal_i) - \ln(qty_i)}$$

The parameters at left and below force the equations through the calibration points at the calibration values.

$$low\_qty_i := \frac{lo\_\%\_qty_i}{\left[\%\_mat_i - \left[\%\_mat_i \cdot \frac{(lqty_i - low\_qty\_cal_i + qty_i)^{b\_qty_i}}{(qty_i)^{b\_qty_i}}\right]\right]}$$

$$hi\_\%\_qty\_adj_i := \%\_mat_i - \frac{\%\_mat_i \cdot (IQTY_i - qty_i + qty_i)^{b\_qty_i}}{(qty_i)^{b\_qty_i}}$$

Figure 54:
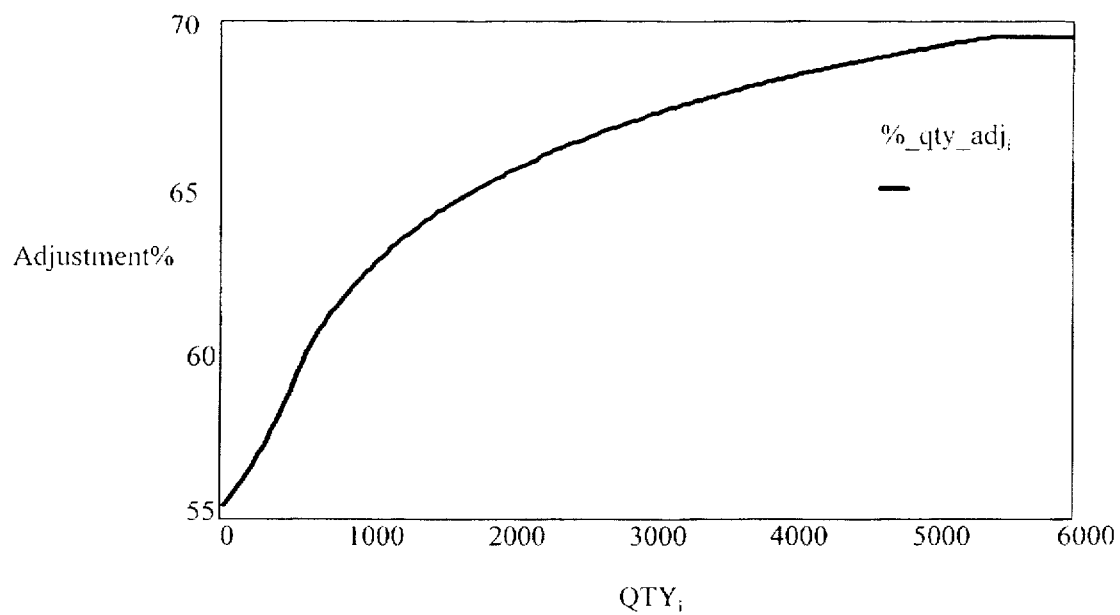
FIG. 54 is a Plot of Mat% v. QTY.

$low\_\%\_qty\_adj_i = low\_qty_i \cdot hi\_\%\_qty\_adj_i$
$\%\_qty\_adj_i = if(QTY_i < qty_i, low\_\%\_qty\_adj_i, hi\_\%\_qty\_adj_i)$
$\%\_qty\_adj_i = if(\%\_qty\_adj_i > hi\_limit_i, hi\_limit_i, \%\_qty\_adj_i)$
$\%\_qty\_adj_i = if(\%\_qty\_adj_i < low\_limit_i, low\_limit_i, \%\_qty\_adj_i) - \%\_mat_i$
FIG. 54 is a graph illustrating the above.
1.7.1.6.10 Apply adjustments to baseline material% (structure).

protoStructOEMMat% = basicMat% + mcplxsAdj + rateAdj + wsAdj + qtyAdj
1.7.1.7 Calculate ProdStructMat% using OEM% from LM Sheet $$ProdStructMat\% = \left(ProdStructOEMMat\% * \frac{OEM\%}{100}\right) + \left(\left(1 - \frac{OEM\%}{100}\right) * ProdStructAMSMat\%\right)$$

1.7.1.8 Calculate $OPC_S$ & $MatOPC_S$ using ProdStructMat%

$OPC_S = f(ws, mcplxs)$
$MatOPC_S = ProdStructMat\% * OPC_S$
1.7.1.9 Calculate ProdMat%

$$prodMat\% = \frac{MatOPC_E + MatOPE_S}{OPC_E + OPE_S}$$

1.7.2 Detail of production production material% (ProdMat%) calculation for mode 5

1.7.2.1 Calculate ProdElecMat%

Figure 55:
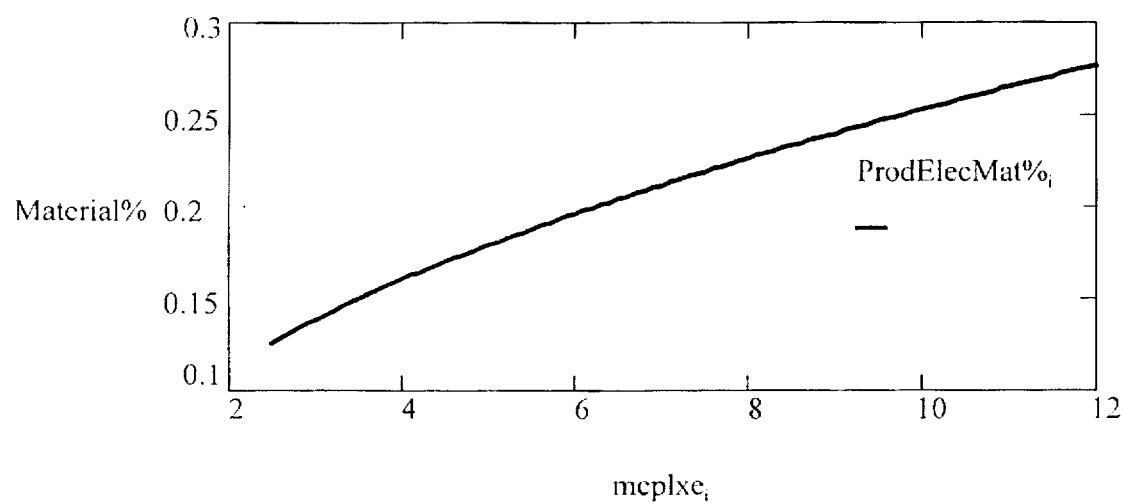
FIG. 55 is a Plot of ProdElecMat% v. MEPLXE.

$i = 25 \ldots 120$ $\qquad mcplxe_i = \frac{i}{10} \qquad ProdElecMat\%_i = .08 \cdot (mcplxe_i)^5$ FIG. 55 is a graph illustrating the above.
1.7.2.2 Calculate $OPC_E$ & $MatOPC_E$ using ProdElecMat%

$OPC_E = f(we, mcplxe)$
$MatOPC_E = ProdElecMat\% * OPC_E$
1.7.2.3 Calculate ProdStructMat%

Figure 56:
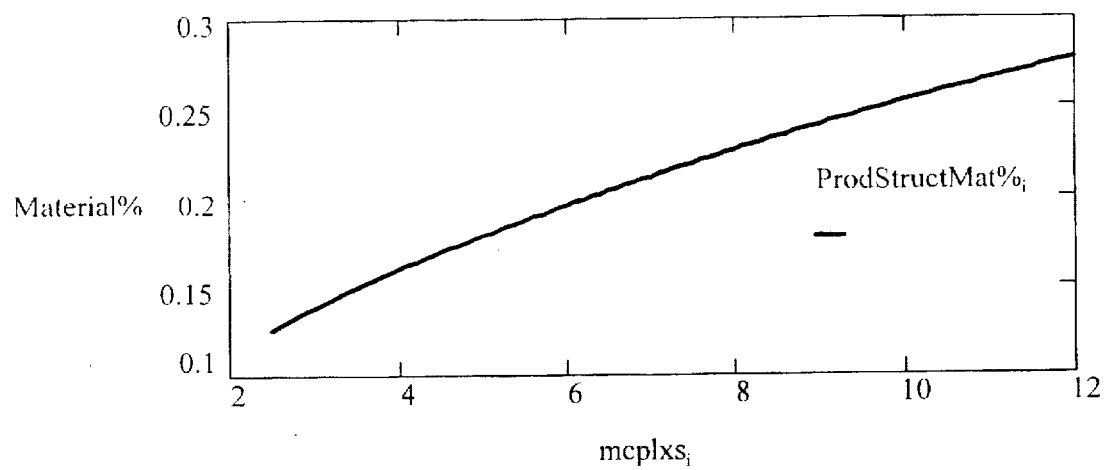
FIG. 56 is a Plot of ProdStructlat% v. MEPLXS.

$i = 25 \ldots 120$ $\qquad mcplxs_i = \frac{i}{10} \qquad ProdStructMat\%_i = .08 \cdot (mcplxs_i)^5$ FIG. 56 is a graph illustrating the above.
1.7.2.4 Calculate $OPC_S$ & $MatOPC_S$ using ProdStructMat%

$OPC_S = f(ws, mcplxs)$
$MatOPC_S = ProdStructMat\% * OPC_S$
1.7.2.5 Calculate ProdMat%

$$prodMat\% = \frac{MatOPC_E + MatOPE_S}{OPC_E + OPE_S}$$

1.7.3 Detail of production production material% (ProdMat%) calculation for H-modules The material percentage of a PRICE M module embedded in PRICE H (the so-called H-Module) is determined from PRICE M outputs.

$$ProdMat\% = \frac{ComponentCost - (.5 \cdot BoardCost) - PackageCost}{UPC}$$

-continued

Labor & Material Model: Process Specification 1.8 Phase: Production, Category: Tooling & Test Equip., Mat% Calculation

Figure 57:
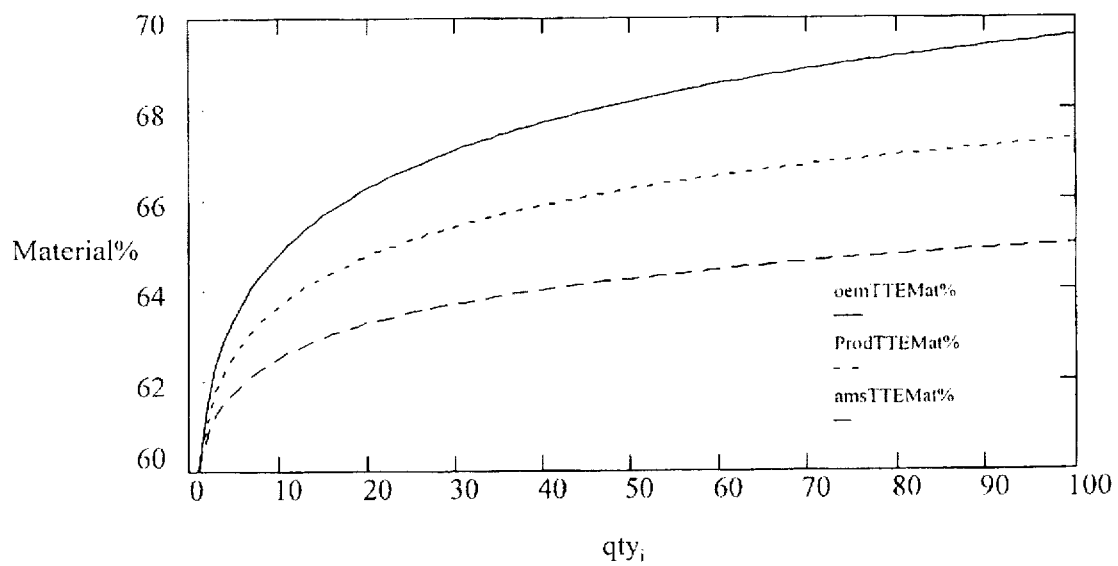
FIG. 57 is a Plot of TTEMat% v. QTY.

| Type | Mode | Calculation |
|---|---|---|
| Electronic & electro/mechanical | 1 | ProdTTEMat%$_i$ = oem%[.6 − (.048log(qty$_i$))] − (100− oem%)·[.6 − (.025·log(qty$_i$))] |
| Mechanical | 2 | #1 |
| Purchased | 3 | 0 |
| Furnished | 4 | 0 |
| Integration & Test | 5 | #1 |
| Modified | 6 | #1 |
| Calibration | 7 | #1 |
| Thruput | 8 | 0 |
| Multiple lot | 9 | #1 |
| Detailed Purchased | 33 | #1 |
| Design Integration | 51 | 0 |
| HW/SW Integration & Test | 52 | 0 |
| H Module | HMOD | #1 | i = 1 ... 100    oem% = 50
qty$_i$ := i
oemTTEMat%$_i$ := [.6 + (.04&log(qty$_i$))]·100
amsTTEMat%$_i$ := [.6 + (.025·log(qty$_i$))]·100
ProdTTEMat%$_i$ := oem%·[.6 − (.04&log(qty$_i$))]+(100− oem%)·[.6 + (.025·log(qty$_i$))]
FIG. 57 is a graph illustrating the above.
Calculation of production rate i = 1 ... 300    qty$_i$ := i    pstart = 1    pfad := 7    pend := 13

$$\text{rateNew}_i := \frac{\text{qty}_i}{((\text{pend} - \text{pfad}) + ((\text{pfad} - \text{pstart})\cdot.6))} \qquad \text{rateOld}_i = \frac{\text{qty}_i - 1}{\text{pend} - \text{pfad}}$$

Figure 58:
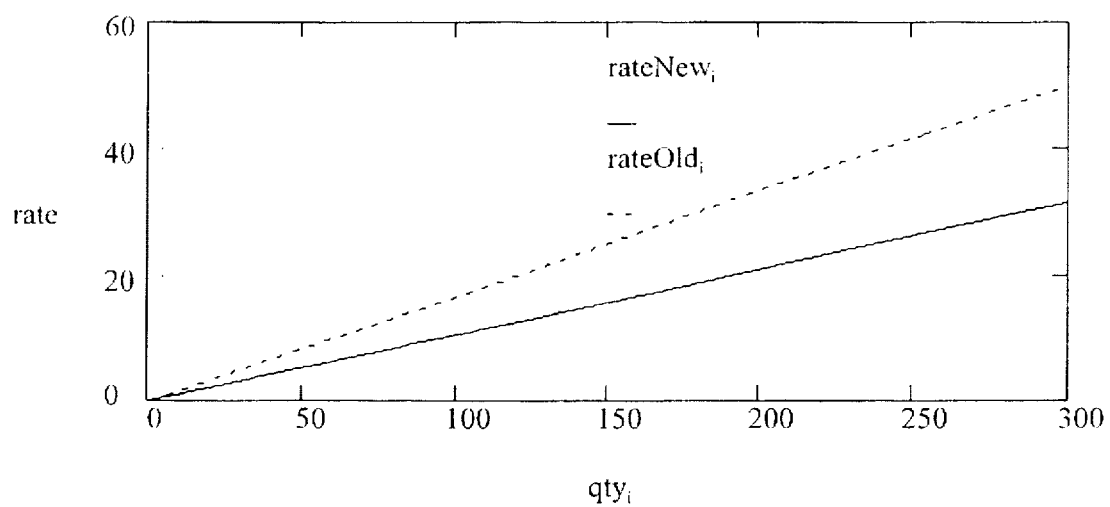
FIG. 58 is a Plot of ProdRate v. QTY.

FIG. 58 is a graph illustrating the above.
Auto-calculate LC from production rate Calculate Unit Learning Curve as a function of yearly production rate
rate__yr$_i$ = i·7.5
ULC__l$_i$ = .729228(rate__yr$_i$)$^{.0368905}$
ULC__h$_i$ = .85000164(rate__yr$_i$)$^{.0100208}$
ULC$_i$ := if(rate__yr$_i$<300,ULC__l$_i$,ULC h.)
ULC$_i$ := if(ULC$_i$≧1,1,ULC$_i$)
FIG. 59 is a graph illustrating the above.

While the above process has been disclosed in conjunction with use of a particular form of a parametric modeling system, the PRICE-H System, it will be understood that the invention is not so limited. Other parametric modeling systems could be used without departing from the spirit and scope of the present invention. One of skill in the art will understand from a review of the above set of equations how that set of equations could be used with other parametric modeling systems.

From the foregoing, it will be observed that numerous variations and modifications may be effected without departing from the spirit and scope of the invention. It is to be understood that no limitation with respect to the specific apparatus illustrated herein in tended or should be inferred. It is, of course, intended to cover by the appended claims all such modifications as fall within the scope of the claims.

We claim:

1. An estimating system for providing a user estimates of labor costs and material costs needed to implement a predetermined, unbuilt project in the absence of information of a type needed to create bills of materials, the method comprising:

storage means;

means for entering at least one unit labor cost value, at least one overhead parameter value and at least one material cost parameter value and for writing said entered values into said storage means;

means, coupled to said storage means, for processing said entered values and for providing total estimated cost as well as separate percentage estimates of project labor and material.

2. A system as in claim 1 wherein at least said means for entering includes a keyboard.

3. A system as in claim 1 wherein said processing means includes a digital processor and wherein said storage means includes a parametric cost estimating engine stored in the form of executable instructions.

4. A system as in claim 1 which includes a display and means for presenting on said display said separate estimated percentages of project labor and material.

5. A system as in claim 1 which includes further means for combining said percentage estimate of material with a local labor cost rate so as to produce an estimated updated labor cost.

6. A system as in claim 5 which includes means for establishing a material cost.

7. A method of cost estimating comprising:

providing a selected set of parameter values exclusive of a bill of materials or labor hour estimates;

providing a parametric-type cost estimating engine;

providing a total output cost using the engine;

providing a software element for establishing a breakout of labor and material costs wherein the element, using the total cost information establishes at least one material percent parameter and at least one labor percent parameter.

8. A method as in claim 7 which includes converting the percent of material parameter to a currency based material cost.

9. A method as in claim 8 which includes converting the percent of material to a currency based labor cost.

10. A method as in claim 9 which includes providing a selected labor rate and determining a corresponding labor cost.

11. A method as in claim 10 which includes determining project management direct costs.

12. A method as in claim 10 which includes entering actual unit labor costs and making an updated labor cost determination based thereon.

13. A cost estimating apparatus comprising:

a parametric cost estimating element;

an input device coupled to said element; and means for producing a material and a labor breakout in response to an estimated total project cost from the element in the absence of labor hour estimates.

14. An apparatus as in claim 13 wherein said element includes a software based cost estimating engine.

15. An apparatus as in claim 13 which includes a programmable processor coupled to said input device.

16. An apparatus as in claim 13 which includes means for storing entered, actual labor rates and for storing default labor rates.

17. An apparatus as in claim 13 wherein said producing means includes software for establishing a percent of material as an output.

18. An apparatus as in claim 17 wherein said software provides a cost of material as an output.

19. An apparatus as in claim 18 wherein said software provides a percent of labor as an output.

20. An apparatus as in claim 19 wherein said software provides a cost of labor as an output.

21. A method of estimating labor and material costs for a new project without using either bill of material-type information or estimated hours of labor, the method comprising:

providing project input information, including operating environment, manufacturing complexity, production quantity parameters exclusive of bill of material-type information and labor hour estimates, carrying out a parametric cost estimating project to estimate product cost;

establishing a material percent parameter for the project using project cost estimates and the input information;

establishing a labor percent parameter for the project using the estimated cost information and the material percent parameter.

22. A method as in claim 21 wherein the value of the material percent parameter is reduced by an increasing value of the operating environment parameter.

23. An apparatus for estimating labor and material costs for a project in the absence of detailed manufacturing-type information comprising:

circuitry for storing project specifying parameters including type of environment, manufacturing complexity, labor rates and overhead expense;

a first processing element coupled to the storing circuitry for generating a total cost estimate for the project in response to the stored parameters;

a further processing element, coupled to the storing circuitry, for generating a percent of labor parameter in response to at least the environmental parameter and the total cost estimate.

24. A control element for estimating labor costs for a selected project based on parametric information and in the absence of total labor hour estimates, the element comprising:

a first plurality of commands for enabling a user to enter at least an environmental specification parameter and a labor rate parameter;

pre-established relationship information defining a relationship between percent of total cost of the project associated with project material as a function, at least in part, of the entered environmental parameter;

a second plurality of commands coupled to the first plurality and the relationship information for forming an estimate of total project cost using entered project parameters in the absence of project labor hour estimates;

a third plurality of commands, coupled to the second plurality for determining a percent of total cost for material for the project in response to at least total cost and the relationship information; and a fourth plurality of commands for establishing a percent of total cost for labor for the project in response to at least the percent of material cost.

25. An element as in claim 24 wherein the pluralities of commands and the relationship information can be stored on a movable medium.

26. An element as in claim 24 which includes additional commands for estimating total labor hours as a function of the estimated total cost, the labor rate parameter and the percent of labor cost for the project.

27. An element as in claim 26 which includes further commands enabling a user to adjust the labor rate parameter and to generate updated estimated total cost and total labor hours in response thereto.

* * * * *